(12) United States Patent
Agrawal et al.

(10) Patent No.: US 12,503,293 B2
(45) Date of Patent: Dec. 23, 2025

(54) FOOD CONTAINER AND METHOD AND SYSTEM FOR MAKING AND USING THE SAME

(71) Applicant: Prima Chefs, Inc., Sarasota, FL (US)

(72) Inventors: Balkishan Agrawal, Sarasota, FL (US); Donald Matthew Baskin, Dover, MA (US); Venkat Koduru, Chappaqua, NY (US)

(73) Assignee: PRIMA CHEFS, INC., Sarasota, FL (US)

( * ) Notice: Subject to any disclaimer, the term of this patent is extended or adjusted under 35 U.S.C. 154(b) by 0 days.

(21) Appl. No.: 19/197,127

(22) Filed: May 2, 2025

(65) Prior Publication Data
US 2025/0263220 A1 Aug. 21, 2025

Related U.S. Application Data

(63) Continuation of application No. 18/814,360, filed on Aug. 23, 2024.

(Continued)

(51) Int. Cl.
*B65D 81/34* (2006.01)
*A47J 36/24* (2006.01)
(Continued)

(52) U.S. Cl.
CPC ...... *B65D 81/3484* (2013.01); *A47J 36/2494* (2013.01); *B65D 51/24* (2013.01);
(Continued)

(58) Field of Classification Search
CPC ...... B65D 81/20; B65D 81/2007; B65D 3/22; B65D 90/06; B65D 81/38; B65D 81/3484;
(Continued)

(56) References Cited

U.S. PATENT DOCUMENTS 3,016,129 A * 1/1962 King, III ............ B65D 81/3834
220/592.2
3,799,386 A * 3/1974 Madalin ............ B65D 81/3834
206/564

(Continued)

FOREIGN PATENT DOCUMENTS

| EP | 1894504 A2 | 3/2008 |
| WO | 9735942 A1 | 10/1997 |
| WO | 2008107657 A1 | 9/2008 |

OTHER PUBLICATIONS

International Search Report and Written Opinion in PCT/US2024/043751, mailed Dec. 4, 2024, 12 pages.

*Primary Examiner* — Kareen K Thomas
(74) *Attorney, Agent, or Firm* — Orrick, Herrington & Sutcliffe LLP

(57) ABSTRACT

Containers for food, and methods and systems for making and using the same. An exemplary container for food can include an insulated tray including one or more sub-units and one or more heat sink units configured to store the food and fit in the tray. An alternative container can include a container base and a receptacle fitting in the container base, the container base including one or more thermal function pieces therein for maintaining a temperature of the receptacle. An alternative container can include a serving base defining one or more slots for holding the food items, respectively, and a cover configured to cooperate with the serving base, wherein at least the serving base, or at least the cover, includes a thermal function piece, the thermal function piece including a phase-change material. An exemplary method for using the container includes treating the phase-change material to an initial temperature.

19 Claims, 44 Drawing Sheets

Related U.S. Application Data

(60) Provisional application No. 63/578,640, filed on Aug. 24, 2023.

(51) Int. Cl.
 *B65D 51/24* (2006.01)
 *B65D 81/26* (2006.01)
 *B65D 81/38* (2006.01)

(52) U.S. Cl.
 CPC ....... *B65D 81/264* (2013.01); *B65D 81/3818* (2013.01); *B65D 2581/3401* (2013.01)

(58) Field of Classification Search
 CPC .. B65D 51/24; B65D 81/264; B65D 81/3818; B65D 2581/3401; A47J 36/2494
 See application file for complete search history.

(56) References Cited

U.S. PATENT DOCUMENTS

| | | | | |
|---|---|---|---|---|
| 4,653,685 A | * | 3/1987 | Leary | B65D 1/36 426/115 |
| 5,353,985 A | * | 10/1994 | Nageli | B65D 1/36 229/123.1 |
| 5,950,834 A | * | 9/1999 | Woodnorth | B65D 43/162 206/541 |
| 6,144,016 A | * | 11/2000 | Garvin | F24C 7/10 220/523 |
| 6,920,980 B2 | * | 7/2005 | Hwang | G06F 1/1628 206/470 |
| 7,240,513 B1 | * | 7/2007 | Conforti | A45C 13/02 62/457.2 |
| 8,328,034 B2 | * | 12/2012 | Miros | B65B 7/16 220/23.88 |
| 8,695,373 B1 | | 4/2014 | Patton | |
| D814,246 S | | 4/2018 | Brattoli | |
| 10,451,335 B2 | | 10/2019 | Owens et al. | |
| 10,546,266 B1 | | 1/2020 | Bose | |
| 11,001,434 B1 | | 5/2021 | Jordan | |
| 2004/0026430 A1 | * | 2/2004 | Baker | B65D 43/162 220/4.23 |
| 2005/0109776 A1 | * | 5/2005 | Camp | A45C 11/20 220/23.86 |
| 2005/0259894 A1 | | 11/2005 | Swartz et al. | |
| 2006/0196497 A1 | | 9/2006 | Dean | |
| 2006/0201950 A1 | * | 9/2006 | Liu | B65D 1/36 220/521 |
| 2011/0248038 A1 | * | 10/2011 | Mayer | F25D 3/06 220/592.2 |
| 2015/0017287 A1 | | 1/2015 | Sevim | |
| 2016/0122115 A1 | | 5/2016 | Peppou et al. | |
| 2019/0359411 A1 | | 11/2019 | Fallgren | |
| 2020/0317423 A1 | | 10/2020 | Knight | |
| 2020/0340677 A1 | * | 10/2020 | Thakkar | F24C 7/087 |
| 2020/0408453 A1 | | 12/2020 | Martino | |
| 2021/0024270 A1 | | 1/2021 | Mirzaee Kakhki | |

* cited by examiner

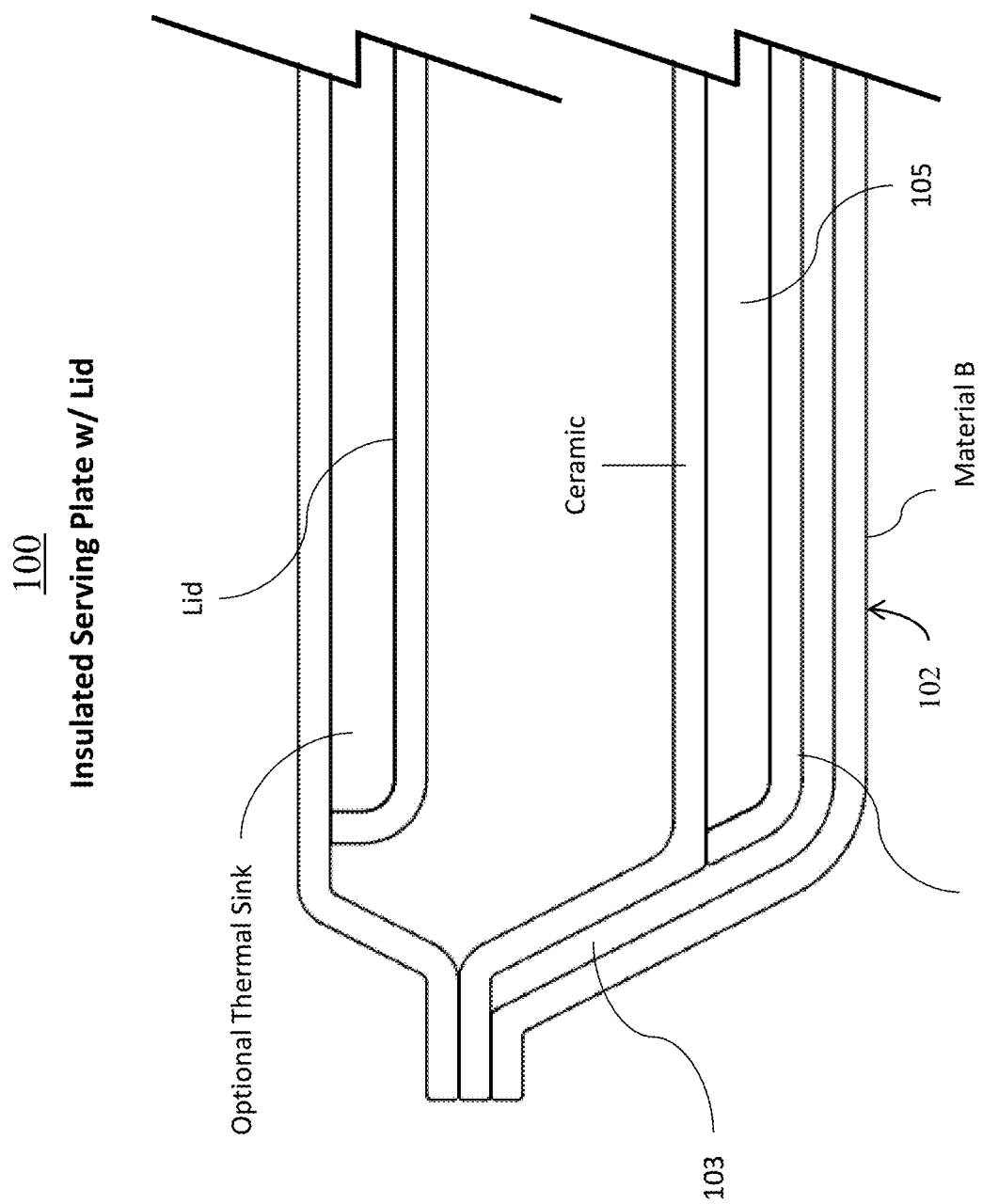

760

| TuCena Material | Density (g/cm³) | Thermal Conductivity (W/m*K) | Specific Heat (kJ/kg*K) | Latent Heat Capacity (kJ/kg) |
|---|---|---|---|---|
| 316 Stainless Steel | 8.0 | 16.3 | 0.5 | 260 |
| Grade 2 Titanium | 4.5 | 16.4 | 0.52 | 325 |
| 3003 Aluminum | 2.7 | 193 | 0.89 | 400 |
| Copper | 8.9 | 385 | 0.385 | 205 |
| Zirconia | 5.68 | 1.68 | 0.40 | - |
| Alumina | 3.9 | 25 | 0.88 | - |
| Yttria Stabilized Zirconia | 5.86-6.10 | 2-2.5 | 0.40 | - |
| Phase Change Materials | 0.77-0.88 | 0.2 | 2 | 260 |

| PCMs | Melting Temperature (°C) | Latent Heat Capacity [J/g] | Specific Heat Capacity [kJ/(kg*k)] | Density Solid [kg/l] | Density Liquid [kg/l] |
|---|---|---|---|---|---|
| 1 | 40 | 260 | 2 | 0.88 | 0.76 |
| 2 | 44 | 250 | 2 | 0.8 | 0.7 |
| 3 | 46 | 250 | 2 | 0.88 | 0.77 |
| 4 | 50 | 190 | 2 | 0.88 | 0.77 |
| 5 | 54 | 260 | 2 | 0.88 | 0.8 |
| 6 | 55 | 115 | 2 | 0.88 | 0.77 |
| 7 | 60 | 260 | 2 | 0.88 | 0.77 |
| 8 | 63 | 225 | 2 | 0.88 | 0.8 |
| 9 | 64 | 265 | 2 | 0.85 | 0.76 |
| 10 | 65 | 190 | 2 | 0.88 | 0.8 |
| 11 | 68 | 260 | 2 | 0.88 | 0.8 |
| 12 | 70 | 260 | 2 | 0.88 | 0.77 |
| 13 | 76 | 260 | 2 | 0.88 | 0.8 |
| 14 | 82 | 170 | 2 | 0.88 | 0.77 |
| 15 | 88 | 260 | 2 | 0.88 | 0.8 |
| 16 | 100 | 190 | 2 | 0.88 | 0.77 |

102

FOOD CONTAINER AND METHOD AND SYSTEM FOR MAKING AND USING THE SAME

CROSS-REFERENCE TO RELATED APPLICATIONS

This application is a continuation of application Ser. No. 18/814,360 filed Aug. 23, 2024, which claims priority to U.S. provisional patent application, Ser. No. 63/578,640, filed on Aug. 24, 2023. Priority to the prior applications is expressly claimed, and the contents of the applications are incorporated herein by reference in their entirety and for all purposes.

FIELD

The disclosed embodiments relate generally to food service and, more particularly, but not exclusively, to food containers and methods and systems for making and using the same.

BACKGROUND

The ability to deliver high quality, freshly prepared hot, cold, or frozen food to a customer has been challenging. Although delivery services have become more effective, one of the common complaints about delivery is the food temperature.

With conventional packaging technology and delivery systems, prepared food is packed in cardboard, paper, or single-use plastic containers, with some recent advances with the use of bamboo, and other biodegradable materials. Even the easiest-to-transport food (e.g., pizza or burgers) can get cold, soggy, and/or slosh around in the container as delivery workers may drive or bike for 15-45 minutes before arriving at the destination. Hot foods become cold, while chilled salad and cold desserts get warm. Plastic condiment containers open, contaminate the bags, and make the delivery difficult to handle. Non-biodegradable packaging, such as small condiment packages, waste resources and, after a brief use, end up in landfills. U.S. restaurants and food services use nearly 1 trillion pieces (or 10-20 million tons) of disposable food service ware and packaging annually, according to Upstream, a reuse advocacy organization. Most solid waste goes in landfills. And it creates 40 million tons of $CO_2$ in the atmosphere each year. Conventional solutions also do not prevent delivery drivers from opening the package and tampering with the food.

In view of the foregoing, there is a need for an improved food container, system and method that overcome the drawbacks of existing solutions for delivery and food and beverage service.

BRIEF DESCRIPTION OF THE DRAWINGS

FIG. 11 is a table comparing properties of various materials for the container of FIG. 10.

FIG. 17 shows a table comparing various organic phase change materials.

Figure 1:
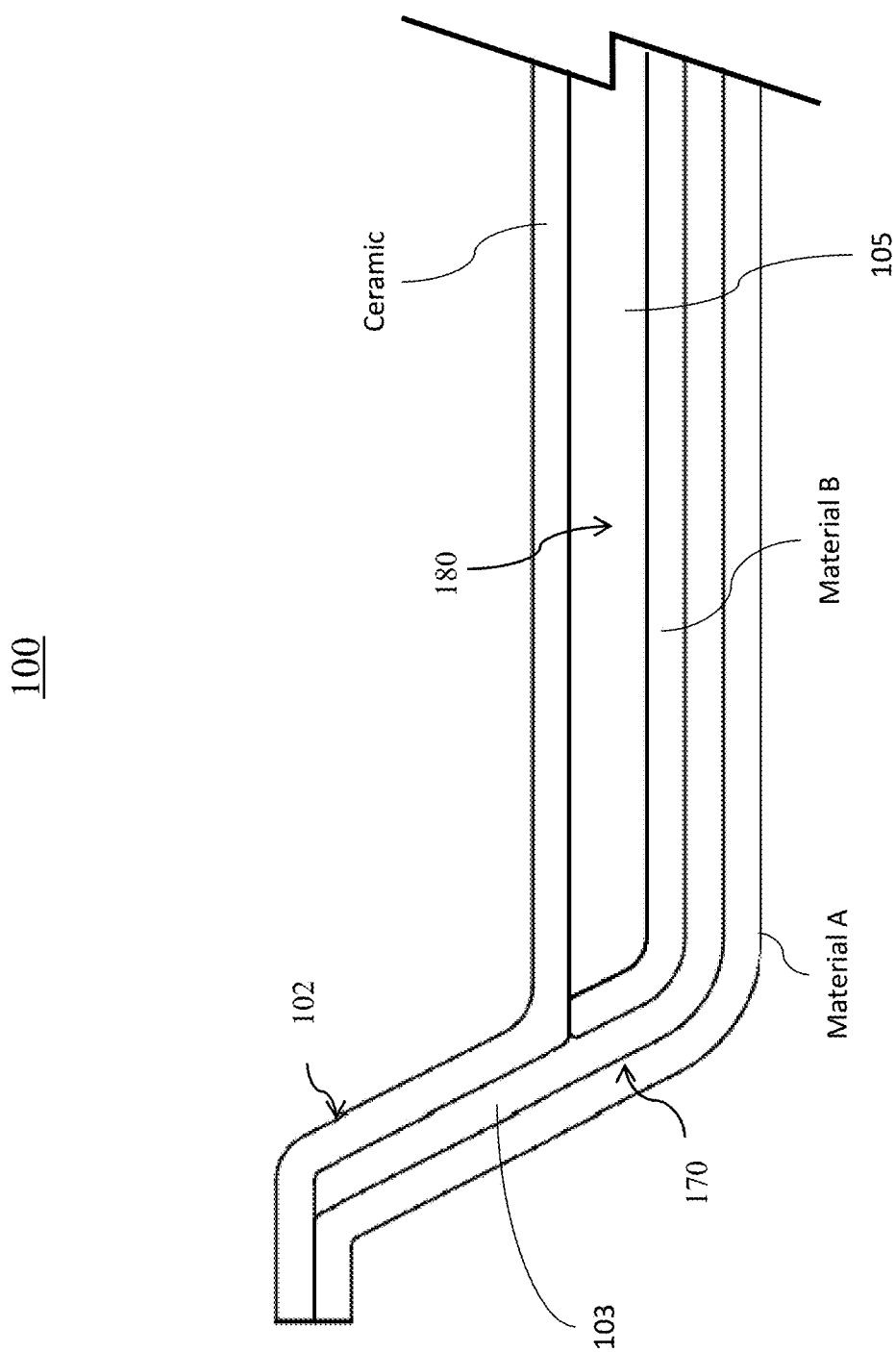
FIGS. 1-5 are exemplary diagrams illustrating embodiments of a container.

The figures are not drawn to scale and that elements of similar structures or functions are generally represented by like reference numerals for illustrative purposes throughout the figures. As such, the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Because of the limitations in existing food packaging technology and delivery systems, delivery of prepared food is a convenience rather than an experience. Despite the problems set forth above, consumers continue to order food using conventional systems because cooking at home takes time and skill. Consumers like the convenience and ease of eating at home without having to dress up, go out to a restaurant, wait to order, eat, and pay. However, the restaurant experience is still—and will continue to be—popular for the social aspects it offers to consumers.

To provide a better, restaurant-like experience at home requires a novel solution to food packaging combined with kitchen operations, and/or delivery cycle/systems. The present disclosure leverages the use of innovative and advanced materials, insulation, heat transfer, coatings, sealing, autonomous delivery from modern kitchens, and/or robotic dish washing systems to advance the food industry. In various embodiments, long-lasting multi-use containers provide an advantageous solution to minimize packaging waste and related $CO_2$ emissions, several factors (e.g., kitchen, menu, delivery, and packaging waste, and/or any other aspects involved from food ordering to cleaning up after food consumption) may need to be integrated with improved food packaging to create a robust solution.

An ideal restaurant dining experience caters to each of the senses: touch (e.g., the feel of the utensil and/or silverware), aesthetics (or look, because the food is supposed to appear appetizing), smell, taste, texture, and temperature. For example, a full dining experience includes smelling the food and/or feeling the warmth of the dish. The level of aroma often fades away as the food gets cold when delivered. In other words, food should be aesthetically appealing (e.g., presentation/packaging), easy to consume, and properly temperature/texture controlled for consumption. For example, food can be delivered in porcelain, ceramic, and/or stone dishes while being maintained at a proper temperature and texture at the time of delivery. The prepared food should be packaged for ease of transport without spilling or tampering.

Along with the dining experience, the disclosed systems and methods can alleviate solid waste disposal and the pollution of oceans, as well as secondary impact on $CO_2$ emissions.

Maintaining Desired Temperatures

In various embodiments, the disclosed system and method advantageously keeps food at the right temperature until it is delivered to the customer. FIGS. 1-8 each show an exemplary container 100 in accordance with various embodiments. In various embodiments, the container 100 can include an integrated delivery unit (IDU). The container 100 can include highly engineered packaging (HEP).

Because food generally has a larger surface area and lower specific heat (calories per gram, etc.) than liquid (e.g., coffee and tea), it is much harder to keep the food, such as fish or chicken, warm in a container. The disclosed systems and methods combine insulation and added thermal mass (ATM) to maintain the desired properties of the prepared food. A combination of the lid (or cover) and/or plate may include ATM and insulation.

The ATM can be pre-heated and brought to a temperature to allow food placed in the container 100 to stay warm at, and/or close to, a desirable temperature. One way to provide ATM is to use a phase-change material (PCM) that has enough ATM to hold the food at the desired temperature. A PCM can include a substance with a high latent heat that can store and release large amounts of energy at a certain temperature. To preheat the container 100 from outside so that ATM is heated to the loading temperature (or initial temperature) can be an issue when the container 100 is insulated on the outside. Hence, internally generated heat through induction (induction from above or heat from above, and/or to an upside-down container 100 (or a part of the container 100 that is upside-down, or the cover with ATM)) can provide a unique and novel combination of ATM, heating with induction, insulation on the outside and desired surface coating that hold the food in an appealing container to accomplish the following features:

allow prep of the container to attain a desired initial temperature;

added thermal mass to the container with ATM;

insulation to allow the heat in the food and from the ATM (and/or thermal mass) to be conserved such that the overall heat loss from the container 100 is minimized (stated somewhat differently, insulation for maintaining temperature and not letting the thermal energy dissipate into the air from the top of the container 100); and a coating that touches the food and is visually appealing.

In some embodiments, the cover of the container 100 holds ATM, is insulated, and can be heated internally within the container 100 to provide additional heat to the ATM. The insulation (e.g., vacuum or other insulating materials) can prevent heat from escaping. Advantageously, the food can be placed in a simple dish and covered with a cover resembling the appearance of "a cloche" to provide a more appetizing appearance.

Figure 2A:
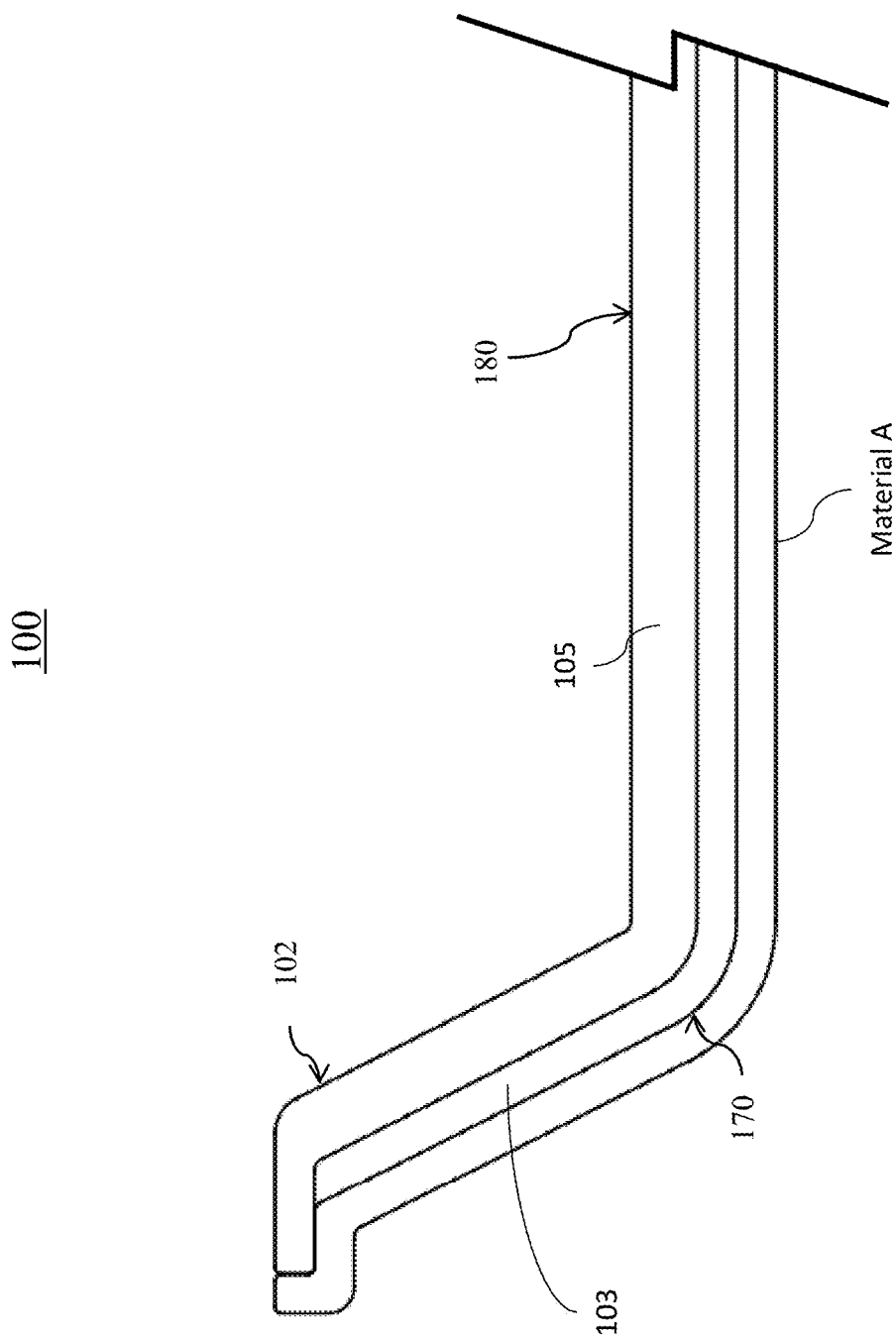
Figure 2B:
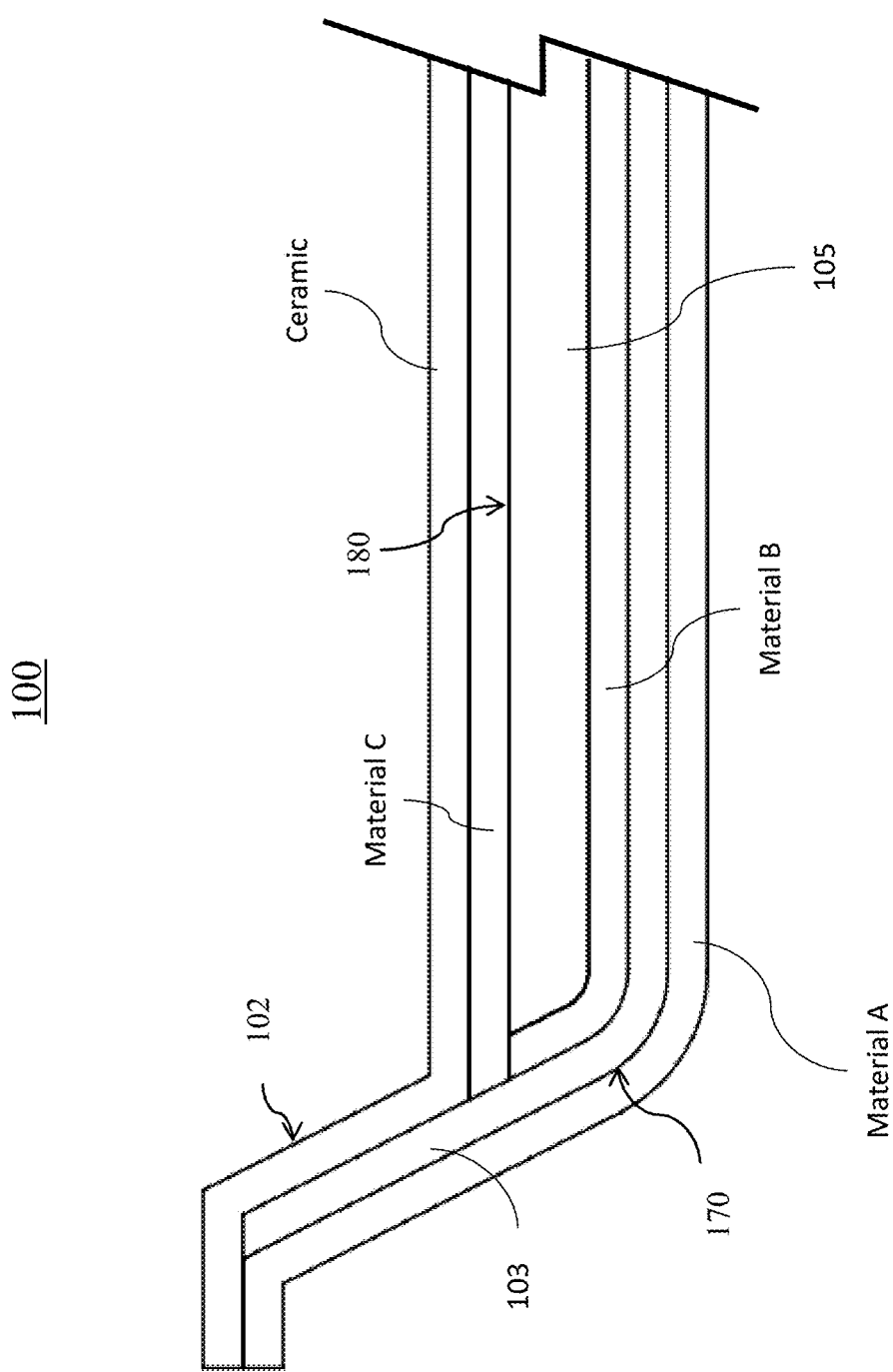
Figure 3:
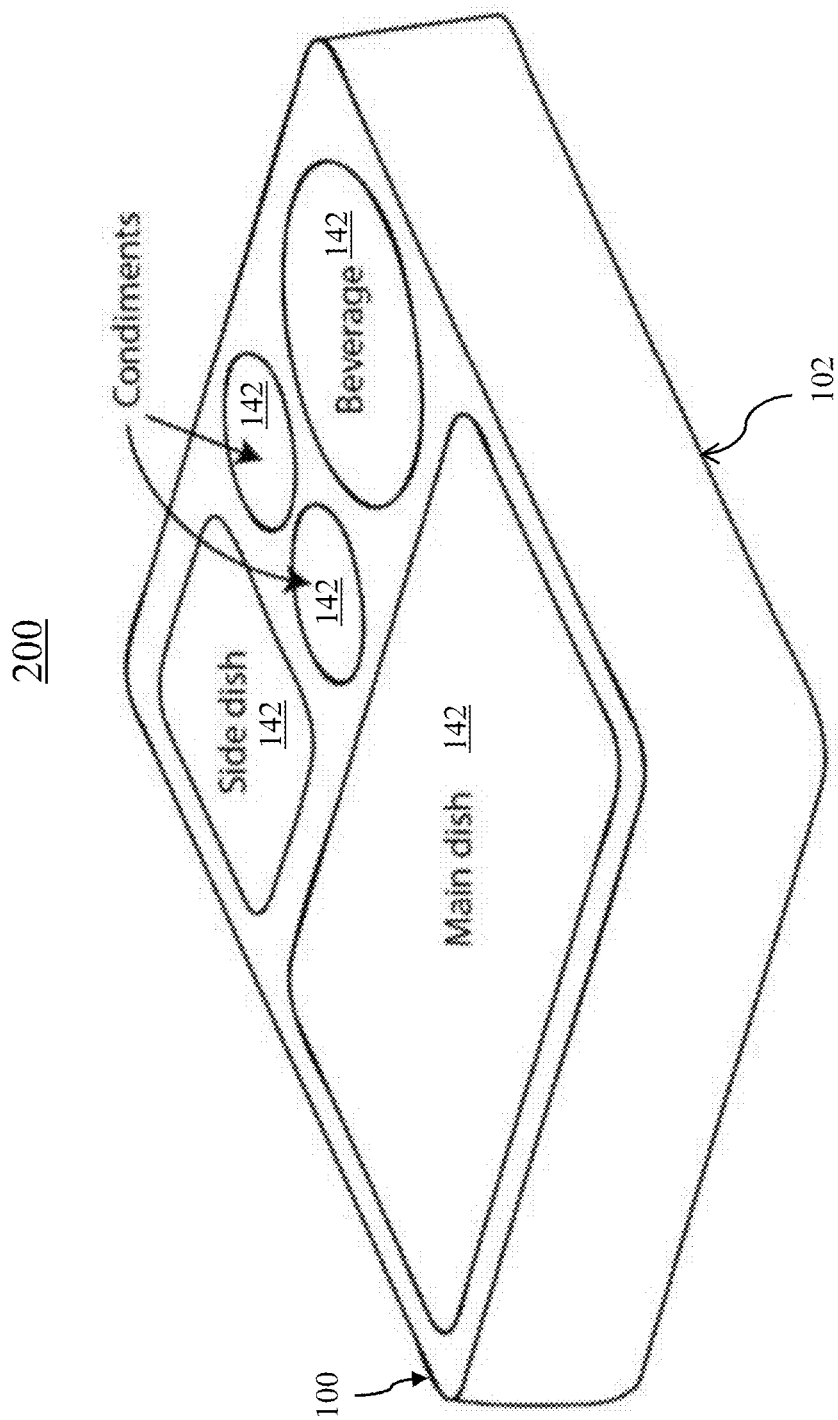

In one embodiment, such as shown in FIG. 2B, the container 100 can include a thermal (or heat) sink 105, vacuum insulation 103, and a material B to separate the thermal sink 105 from the vacuum insulation 103. Although will be shown and described as vacuum insulation 103, in alternate embodiments, other insulation can be used within the scope of this disclosure. For example, the insulation can be in the form of a double-walled vacuum sealed layer and/or synthetic and/or fiber materials.

Although double-wall vacuum-insulated mugs and flasks are conventionally used for keeping liquids warm and/or cold, vacuum insulation is not easy to implement in flat plates or bowls that have large flat surface areas. For example, double walls (or double layers of parallel surfaces) in use as a plate, with a typical material thickness used in vacuum flasks, can collapse on each other under vacuum in a furnace during treatment. Therefore, in some embodiments of the disclosed system and method, to create and maintain vacuum insulation without collapsing, a vacuum support structure (not shown) can be used to provide rigid support between the double walls. For example, the vacuum support structure can include a mesh, fiber, and/or honeycomb structure of insulating material between the two layers of plates. The two layers are then subject to vacuum so that the two plate surfaces do not collapse on each other.

Such mesh is preferably made of low thermal conducting material. Hard materials with low thermal conductivity (e.g., ceramic balls and/or mesh) can be placed between the layers of the two plates to provide rigid support and prevent collapsing. Placement of the hard material is dictated by the particular structure of the container 100, for example, to support the flat areas of the plate and/or the IDU.

As an alternative to added mesh or material, ridges, ribs, dimples, and self-balancing stress management shapes can also be used in the design to avoid two flat surfaces collapsing over each other. Due to stress and forces created during treatment, a small curvature or dome shape can be formed in the two parallel plates to compensate for the effect of vacuum forces.

Although thicker stainless plates and/or hard materials can be used to make sure the parallel plates do not collapse under vacuum, they make the container heavy and less useful for transporting. Therefore, in preferred embodiments, titanium is used. Stainless sheet thicknesses of more than 0.7 mm can have significant weight. Even thicker plates of 0.7-2 mm can be used for chaffing dishes of 40-70 cm diameter. The use of titanium can lower the weight by half and less than 1.5 kg compared to other hard materials. In a preferred embodiment, the outer most layers holding the vacuum insulation are thinner and made of titanium while the inner layer, closest to the added thermal mass (ATM), is stainless and thicker to provide a heat sink. The layer closest to ATM can form a part of the thermal sink 105.

Figure 4B:
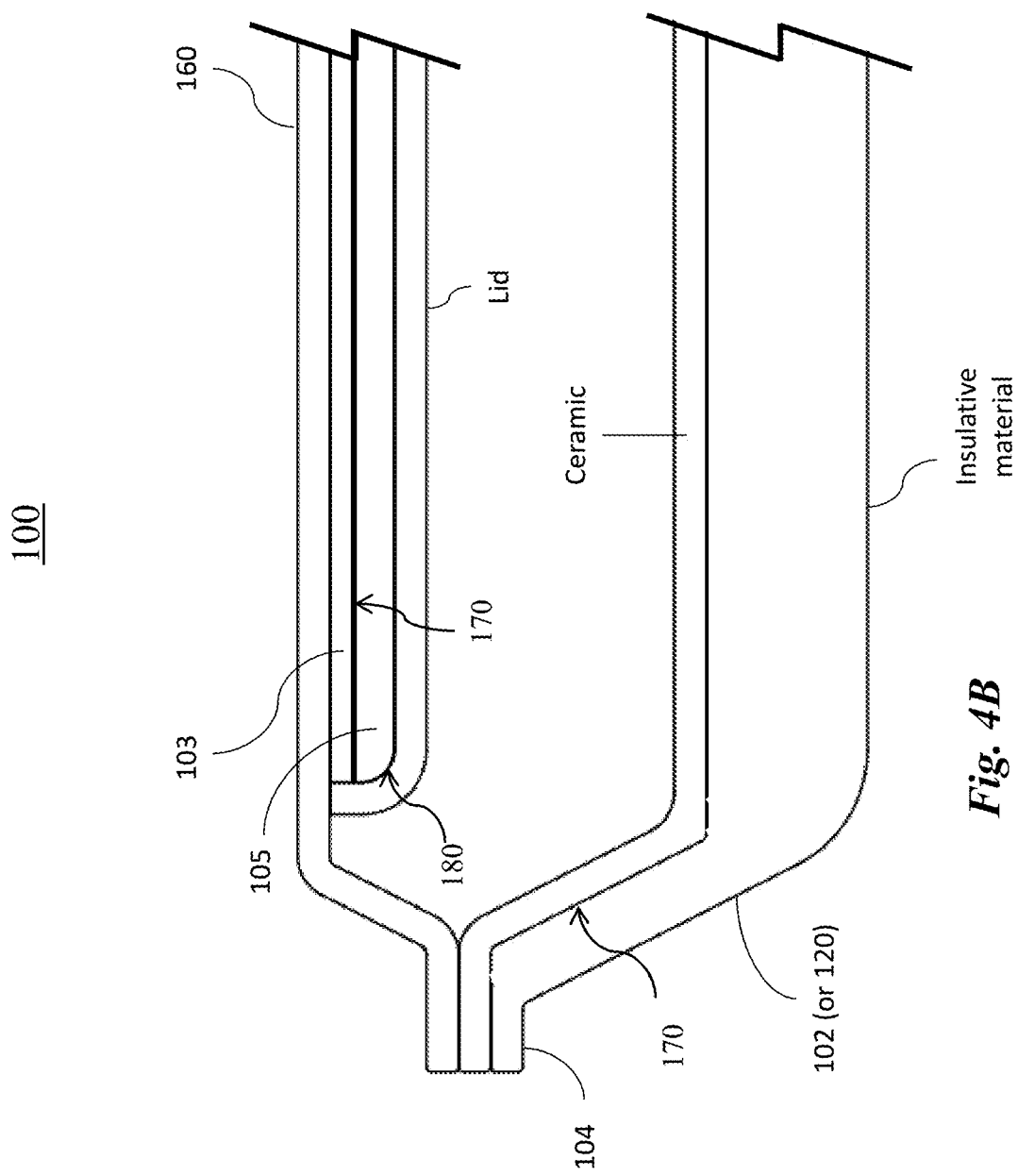

In some preferred embodiments, the thermal sink 105, the vacuum insulation 103, and other materials can reside completely in the cover so that the container 100 advantageously can cooperate with a conventional plate, such as a ceramic plate. Turning to FIG. 4B, the container 100 can include a bottom plate without vacuum insulation in favor of a top cover to provide the vacuum insulation 103.

In some embodiments, the container 100 can include a serving base (or bottom portion) 102 and/or a container base 120. The serving base 102 can be used for serving and presenting the food. In some embodiments, the serving base 102 can include the container base 120 (shown in FIG. 8, for example) and the receptacle 140 (shown in FIG. 8, for example). The container 100 can include a cover 160 configured to at least partially cover the serving base 102 or the container base 120. In some embodiments, the cover 160 can fully conceal the serving base 102. The cover 160 can cooperate with the serving base 102. Stated somewhat differently, the cover 160 can fit, mate with, and/or attach to the serving base 102 in any suitable manner such that the food can be secured in the container 100.

In one embodiment, the container 100 shown in FIG. 4B can be configured such that the serving base 102 and the cover 160 at least partially overlap. The serving base 102 and the cover 160 can each include insulation and/or heat sink such that an overlapping portion 104 can provide double layer of insulation and/or double layer of heat sink. Such overlap can be telescopic to be more effective. Stated somewhat differently, the layer of insulation and/or the layer of heat sink of the serving base 102 and/or the cover 160 can extend into the overlapping portion 104. In some embodiments, both the serving base 102 and the cover 160 can include heat sink, insulation, and coatings. These heat sinks, insulation, and/or coating can be optimized to provide the best environment for the food tray at the desired conditions for temperature, texture, taste, and aroma.

This cocoon of almost adiabatic environment can hold flavor, texture, temperature, and seal for transport for 30-60 minutes or more, thus achieving the following advantages:
- substantially reducing the time sensitiveness of delivery process;
- lowering delivery cost through added delivery route optimization;
- bringing an improvement in the off-premises dining experience; and
- reducing the solid waste from plastic, paper, and associated $CO_2$.

The heat source can include one or more of a flame and/or radiant electric heating from above or inside the container 100, induction, or an ATM inserted in the container 100.

In various embodiments, the IDU can include some combination of vessels, put together to allow easy management of hot and cold food, condiments, garnishes, sauces, and drinks. Such IDUs allow easy management of foods in the kitchen, packaging, delivery and use by the consumer. Because IDUs or parts of them are reusable, they need to be simple to track, wash, and reassemble.

Advantageously, in some embodiments a prep station (or preparation station) is structured to accommodate and heat a sub-unit of the IDU comprising the ATM and leaving other portions of the IDU unheated. Such targeted heating can be implemented with specifically configured induction coils. Alternatively, the structure of the IDU can be configured such that the ATM (or other portions of the IDU desired to be heated) comprise a ferrous metal (or other induction responsive material) that will be heated by induction while other portions of the IDU do not contain induction responsive materials and are not heated.

While induction heating is particularly advantageous, in other embodiments, heating by other means such as flame and/or radiant sources can be used. For example, a prep station can have a kind of burner similar to gas stoves configured to selectively heat the ATM and/or other portions of the IDU desired to be heated.

The ATM can be a solid and/or liquid. Metal and porcelain vessels are often used by the restaurants to provide ATM, for example, such as a casserole for macaroni and cheese or a cast iron pan for fajitas. Such cookware naturally provides ATM while the food is consumed. Often, a restaurant will have a plate warmer or put the serving plate on a burner for a short period of time before serving food to the consumer. Chaffing dishes use hot water and disposable wax burners as ATM to keep the food warm for hours.

Since the system as set forth in the present disclosure can allow transport with bikes, cars, and/or on foot for delivery, having the container 100 tethered to electricity is not desired. There are delivery carrying bags with heaters and batteries, as well as single unit food containers with rechargeable batteries to keep the food hot or to reheat when consumed. Rechargeable battery bag malfunctions and human error of not charging the batteries or not turning the heat on can happen. If the bag is heated, it becomes detrimental in the delivery process when both hot and cold foods are put in the same delivery bag. The disclosed system and method can free delivery and consuming from external sources of energy or heat and are thus simpler, robust, and more error-free.

Customizing Temperature Performance And Compartmentalization

With restaurants and chefs being particular about what and how they cook and present, the restaurants and chefs are often concerned about what happens to the food once it leaves their kitchen and is picked up by delivery workers (often by third parties). A major portion of high-end restaurants do not participate in delivery-based consumer service due to such issues. Embodiments of the present disclosure resolve this issue.

A dedicated ATM for each sub-unit in IDU and keeping sub-units insulated from outside and from each other, provides flexibility for how food is preserved during transport and protected. Solid ATMs can be copper, cast-iron, or other materials that have a high specific heat (or heat capacity per unit volume) such that the unit is compact. But solid ATMs can also be heavy.

Phase change materials (PCMs) can provide unique and innovative solutions for achieving better performance per unit mass and/or volume. In exemplary embodiments, a PCM is engineered for the optimum using materials with phase change at a temperature in a range of 100-250 degrees F., for warm and/or hot food. Heat is available to the food, as ATM cools to the phase change temperature and the phase change will cause the temperature to hold at the phase change temperature until the phase change is complete. In various embodiments, the material of the PCM can be selected to advantageously have a phase change temperature that matches the desired temperature range for the food. In various embodiments, the phase change temperatures of PCMs ranging from −30 to 130 degrees C., and/or from −20 to 100 degrees C., are suitable for meeting most of the food (including food ranging from hot to frozen) desired by consumer. In various embodiments, the specific latent heat capacity of the PCM can be sufficiently high, for example, greater than 10 calories/gram, greater than 15 calories/gram, greater than 20 calories/gram, greater than 30 calories/gram, greater than 40 calories/gram, greater than 70 calories/gram, greater than 100 calories/gram, and/or greater than 150 calories/gram.

Phase change materials are not very good conductors of heat. Their heat transfer characteristics can be improved by embedding them with highly conducting materials, such as copper and/or aluminum micro balls and/or nanoparticles. To avoid the micro balls from aggregating in one area of the sub-unit and creating uneven heat transfer, a mesh may be used to provide uniformity of heat transfer from the prep heat source to PCM as well as back from PCM to food, and heat loss, in the sub-unit.

The PCMs can expand and shrink at the phase change. Hence, the sub-unit can be built with headspace and/or sealed well to accept the impact of the phase change and associated expansion as well as pressure.

Ceramic Coatings

Additionally and/or alternatively, a ceramic and/or porcelain coating on the food-holding side surface of the sub-unit can provide a certain degree of freedom to optimize for ATM. The coating can have some thermal value (or ATM), and thickness of the coating can be chosen to optimize that characteristic. When induction heat is used (e.g., eddy current or magnetic disc induction), a disc or coil can be placed such that both the PCM and the ceramic and/or porcelain coating can get most of the heat. In some embodiments, the ceramic and/or porcelain coating can get the heat directly through a metal layer below the coating, and/or through the PCM when using ceramics that do not couple with induction to create heat.

The porcelain coating can create an issue of chipping or fatigue from thermal cycles. Accordingly, the optimum coating of porcelain can be less than ⅛ inch (or 3 millimeters) thick to prevent chipping and/or fatigue. In one embodiment, as an enhancement to the ATM container and/or the ceramic coating, integrated coating where one material is merged and/or diffused at the interface to another material, with a diffusion layer in between, can be desired.

The ATM encasing plate materials can be metal and/or even composites. Composites can have more flexibility and durability than some metals.

Composite materials, such as carbon fiber composites, can be molded in a manner to create sub-units with connecting members to make the IDU. Kevlar and/or nylon fabrics used in various rugged applications can be good alternatives. Kevlar and/or nylon fabrics can provide flexibility and are lightweight. Such an IDU without the sub-units or vessels can be very light and thin, about half a pound (or 226 grams), or 200 grams, 250 grams, and with a metal or composite frame, like a tennis racket, or luggage, in which the sub-units are embedded. Additionally, and/or alternatively, the sub-units can float and stay in place in the frame with magnets underneath. Kevlar is durable, heat resistant, flexible, and washable. It also provides flexible support to sub-units, like mini shock absorbers to prevent food from randomly bouncing around, as well as flex when eating so the experience is like a padded tablecloth. The surface presented to the consumer feels like a placemat and can be branded to show a source of the food and/or provide instructions for the user.

The connecting members of IDU do not necessarily need to have ATM, because the connecting members do not contain food. The aesthetics and functions are such that each sub-unit can have its own seal, thus avoiding mixing and/or sloshing around of food in the container. The seals can be disposable aluminum foils, reusable lids, shrink fit lids, snap on lids, etc., based on the food in the sub-unit. The benefit of individually sealing sub-units is that the seals can deter tampering, allow the consumer to open one sub-unit in the IDU, and to consume the food in the desired sub-units while keeping others sealed. The contents of the sub-unit can, preferably, be labeled on the sub-unit.

Lids

For embodiments with reusable lids, the lid can be made the same way as the sub-unit and/or in a different way to provide added flexibility. For example, for foods that need substantial ATM, the lid can be configured with various levels of ATM, which for example can keep foods that may be consumed after more than an hour sufficient thermal performance to keep at or near the desired serving temperature. Such flexibility can continue to provide the food at desirable temperatures for longer periods.

In a snap-in and snap-out sub-unit model of the IDU, a sub-unit can be removed, heated, or chilled and/or stored for later consumption.

For each sub-unit, the seal and/or the edge of the ceramic coating of sub-units can be configured to provide a surface where the seal edge mates with the sub-unit.

The lids for sub-units can also be screw top to allow for easy opening. In some embodiments, the screw-top type units can have no more than two rounds of full thread to ease the opening of the sub-unit for food that may be hot and saucy. Advantageously, for the reuse purpose, the lid can be placed back quickly and be able to be opened by human and/or robotic washing without much complexity for cleaning.

The lid can have a window that allows consumers to see in the sub-unit.

Vents

There can be lids that have vents so that food can breathe. Such vents can help keep fried food crisp for longer periods. For example, when French fries and fried chicken tenders are placed in sealed plastic containers, they get soggy in a few minutes. Such vented space can also be used advantageously for baked bread, roti, bakery items, and bagels, etc. Additionally and/or alternatively, the sub-units can include an absorbent and can have a lid to which a moisture-absorbent material pouch can be anchored. The ventilation can also be provided by holes at the bottom of the sub-unit, side of the sub-unit, and/or an interface between the sub-unit and the lid. In some embodiments, a wire mesh in the sub-unit would be adequate to provide the air flow for moisture-sensitive foods. Because such sub-units may cool at a faster rate, proper ATM can be used to keep the fried food not only crispy but also hot. A sub-unit with vent, insulation and/or ATM can provide a preferred environment for crisp and/or hot fried food to stay with proper texture, temperature, and flavor for longer time than existing processes. In contrast, the disclosed method can maintain food quality for longer without sacrificing the content of the food.

Cold ACS

By providing an added chill sink (ACS) to a sub-unit, cold foods such as dessert, salads, etc., can be kept at an optimal temperature. This can be embodied by reusable icepack placed in the sub-unit as a simple solution. However, such an icepack may need to be placed for 5-15 minutes in the sub-unit to get significant ACS. A mixture of ice and water (or salted ice-water) can cool sub-unit containers faster than ice or chilled packs at freezer temperatures of zero degrees F. Hence, in the prep station, adding and removing ice-water from the sub-unit can be desirable. Additionally and/or alternatively, the ACS can be sprayed or quenched in liquid $CO_2$, air, or nitrogen to quickly achieve sufficient cooling (for example, by spraying for 10-30 seconds). Additionally and/or alternatively, at the IDU prep station where induction heat can be provided to ATM, refrigerant coils (RC) can be temporarily placed in the sub-unit needing ACS. Such RC's can bring the temperature of the ACS to below the freezing temperature of water. For frozen items (e.g., ice cream, cakes, etc.), cryo-spray can lower the temperature of ACS to below zero degrees F. and thus allow transport of ice cream in the same IDU and next to a hot entrée sub-unit.

In another variation, a cryo-spray can be done to the dessert and sub-unit together, prior to closing the lid. When there are specific sections or sub-containers which are always used for cold and/or frozen desserts, the container can have a PCM with phase change temperature of −10 to 50 degrees F., such that when the solid PCM melts, it keeps soaking in the heat form the environment, and keeps the food chilled.

Hot and Cold Together

An IDU prep station with heating and cooling capability can prepare the IDU such that any sub-unit can be heated and/or chilled to accommodate the right food type that will be placed in the sub-unit. If a consumer has ordered salad as the main dish, then the largest sub-unit, or one of the larger sub-units, can be chilled. If a side dish is macaroni and cheese, then a smaller sub-unit can be heated.

Any combination of sub-units can be done in an IDU. In a non-limiting example, for a single consumer delivery, a sub-unit with space for main entree (for example, 8-20 ounces (oz) space, 6-10 inches across, 1-2.5 inches deep including head space), space for two sides (for example, 6-10 oz, 5-7 inches across and 1-2.5 inches deep) and 2-3 condiments, sauce and/or garnishes (for example, 1-2 oz, about 2 inches across) would be desirable.

While not strictly necessary, the performance of mixed hot and cold subunits in one IDU is enhanced by insulation between the sub-units, which will extend the time during which the sub-units will maintain their desired temperatures. In various embodiments, the different temperatures can optionally be provided by separate containers, rather than a single IDU with different sub-units. Alternatively, a combination of separate containers and/or containers with sub-units at different temperatures can be used to package a meal.

Drink Containers

Drink containers can complicate the delivery process. Cold drinks can get warm and/or sweat. The sweating can make the paper bags soggy. Coffee can be hard to pack and keep upright in the typical coffee holders. The coffee trays may be sufficient when 2-4 coffees are ordered and there are bags and packaging available for such situations. But these conventional solutions increase solid waste and temperature change.

Individual vacuum insulated coffee and drink containers (CDC) can be very reliable for use. These CDCs are reused, hand washed, and function for extended periods of time. In some embodiments of the IDU, CDC can be integrated in the space.

Figure 5:
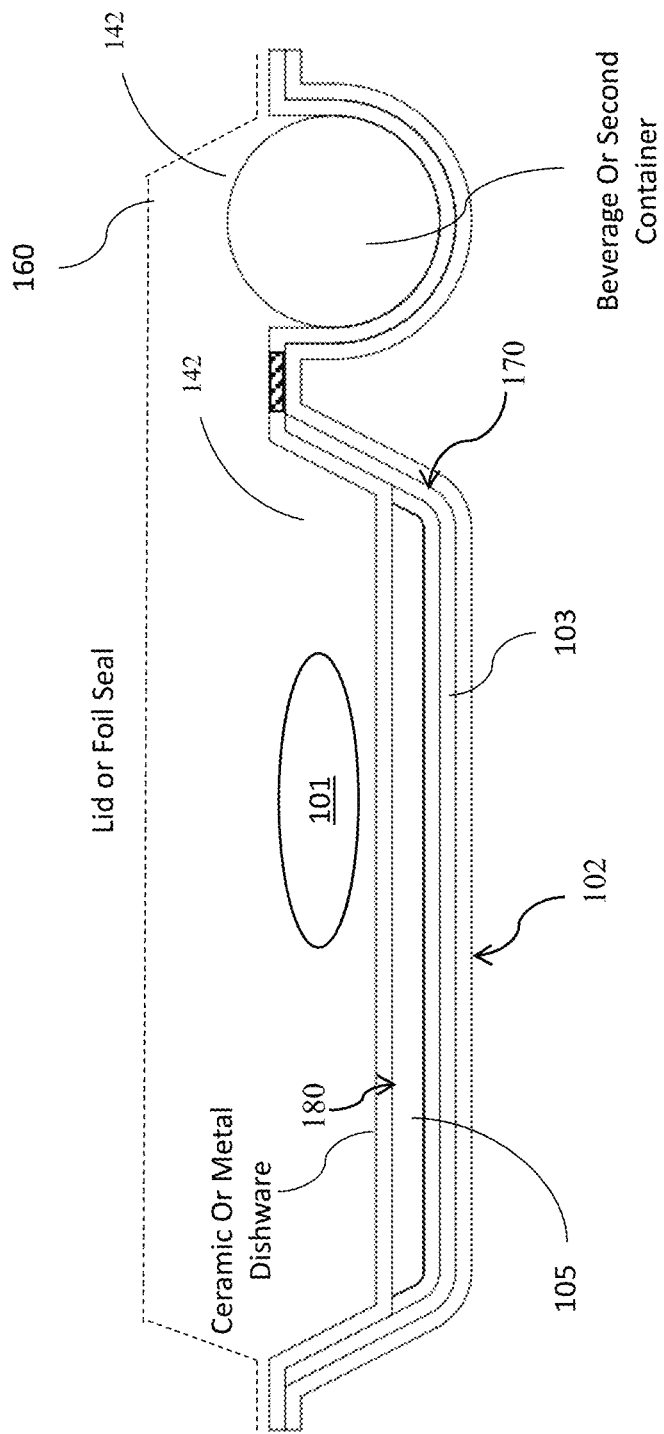

As one way to implement the CDC, a sub-unit can be reserved for a drink container. Stated somewhat differently, the drink container can be placed in a sub-unit in the same or similar way as food is placed in the sub-unit. An exemplary drink container can be 8-16 oz. The 8-16 oz drink containers can be hot or cold and have the same type of prep as the other sub-units. Exemplary drink containers for such situations can be aluminum and/or have slim lines. The drink can be soda, beer, wine, hard Selzer, cocktail, coffee and/or another off-the-shelf packaged drink. The drink containers can be disposable or recyclable but are not always useful for custom-made or restaurant-blended drinks, juices, and/or smoothies. FIG. 5 shows a diagram of an exemplary container 100 with a sub-unit that can be used for a beverage. Although FIG. 5 shows the beverage container, and the sub-unit, as having cross sections of a full circle or a partial circle for illustrative purposes only, the beverage container, and/or the sub-unit, can have any uniform and/or different shapes, dimensions, and/or sizes, without limitation. The beverage container can be placed in the sub-unit in any suitable orientation relative to the container 100, without limitation. In various embodiments, the ceramic dinnerware under the food does not extend (or continue) to be under the drink container. Stated somewhat differently, the drink container and the food can respectively be in contact with ceramic dinnerware layers that are not a continuous layer, or the drink container is not in contact with any ceramic dinnerware.

As an alternative way to implement the CDC, for hot or cold drinks, a double wall reusable, insulated tube container with removable lid would be preferred. Some of these containers have lids on both ends to allow even deeper cleaning, especially when a robotic cleaning system is used. Some of these are one twist opening type. To dedicate space for such drink sub-units is to make the entire IDU as a full meal service, low solid waste system.

In various embodiments, selected machines can seal standard slimline aluminum cans. The IDU prep area and/or bar may have such a machine to allow a custom beverage to be prepared, sealed, chilled, and put in the IDU. The app for ordering food can include each restaurant's unique wines, cocktails, juices, and/or soft drinks to be ordered with a meal.

Condiments

Condiments are ways for the consumer to customize food to their taste, and it is conventionally a second thought in the current delivery system, or one size fits all mindset in the food delivery process. For example, some food delivery workers throw in 10 packs of a condiment and 5 bags of tea, even if no one in the family drinks tea or uses the condiment. Families have drawers full of such packets, which eventually goes to solid waste landfills.

Limiting condiments to packaged and processed foods can further impact the taste and nutrition. Very few places will send fresh herbs, lemon, ginger, mint, or basil as condiments because it is not easy to offer, package, and ask the client's preferences. In upscale and fine dining, these condiments provide a unique experience to consumers. To provide true restaurant style experience and flexibility of fresh or packaged condiments, the IDU, in an advantageous embodiment, is configured to have a minimum of two, or preferably three, condiment sub-units of 1-2 oz size. In the menu offering, the consumer may choose traditional condiments such as ketchup, mustard, and mayo, or fresh condiments such as ginger, cilantro, lemon, lime, mint, or basil. It is preferable to allow the consumer to customize their food to their taste as well as keep the condiments texture and taste fresh. These condiment pods can be leakproof to allow salad dressing, olive oil, cheese, and butter to be placed therein. Small individual glass or metal containers or biodegradable containers can provide a preferred solution to avoid the single-use plastic. The sauce that needs to be kept warm can be put in the sub-unit that is closest to the entrée. Additionally, and/or alternatively, space for sauce can be defined such that the sauce can be the closest to the ATM of the entrée to keep the sauce warm.

IDU Sizing

In preferred embodiments, the whole IDU when presented is appealing. It has all the items a consumer may need, and can be placed on a bench, in a park, on a home dining table, next to a workstation, and/or used while sitting in a lounge chair. Hence it is preferably smaller than the size of a standard cafeteria tray. In one embodiment of the IDU, the IDU can have two layers, the first layer for main entrée and the second layer for all the rest of a meal.

IDUs are such that they may have a second overall lid (SOL), or second overall cover, that covers all the sub-units and provides an overall seal as well as a second seal to each sub-unit. The benefit of SOL is to avoid spilling, easy transport, stacking, and added insulation. The SOL can be banded to IDU with flex rubber latches, snap-on latches, compression fit, a simple twist, and/or reusable bands. The SOL also provides a cover for the IDU when each sub-unit seal is removed to consume the food, and the IDU needs to be returned with soiled sub-units. The return of IDU to a unit processing station can be achieved with SOL in place without spoilage and smell from a used IDU.

To allow stacking of IDU and further give stability in transport, the band and/or latches can go in either direction to seal the SOL or connect with another IDU. For example, 10-30 IDUs stacked together can make it easy for delivery of washed IDUs to the restaurant. Several IDUs stacked together can be carried easily to provide individualized meals for the whole family or a group. Such a stack further improves stability in transport. In some embodiments, up to six IDUs can be stacked together to give customized fresh, hot meals and restaurant type dining experience to friends and family. Most times a group would like to go out but often they don't want to dress up, wait, order, deal with noise, weather, traffic, and parking. The consumer does not have to reheat, bring out their own set of dishes, wash dishes, or have solid waste and clutter to manage. The consumer can get exactly what they want at the time when they want, and where they want.

Not all off-premises delivered foods can fit properly in a standardized IDU. There are various approaches to the IDU to allow flexibility. In some embodiments, the IDU can be a modular IDU, in which a variety of sizes can be placed to allow each food type. Such an approach is labor intensive and will cost more, thus suitable for higher end of delivered food price point, such as those marked by three- or four-dollar signs next to them in the delivery apps. In other embodiments, restaurants can make food in certain sizes and shapes to fit the sub-units. For example, naans don't have to be long or triangle-shaped, pancakes don't have to be large, toast doesn't have to be square, and Napoleon does not have to be rectangular to provide the same taste and texture. In yet other embodiments, these foods can be cooked, baked, and/or prepared in the shapes that fit the standard IDU. When they are modified to the sub-unit shapes, they become more appealing and have less sloshing around.

The IDU also creates an opportunity for a restaurant for meal structuring. To facilitate the consumers' ordering and choices, a preferred process is to design menus such that meal items fit sub-units. Then a consumer's food choices are structured to fill the available sub-units. For example, if a consumer has ordered two sides (or one appetizer and dessert) and there are no more side sub-units available in the IDU, the choices left and presented to the consumer to pick can be main entree, condiments, and drink. If one of the sides is a salad and needs a condiment pot for the dressing, then there is one less space for the condiments. While such a sequence can be constraining and limiting, it can provide most of the consumers with the flexibility and appeal.

Also, the kitchen and restaurant have an option to fill an unused (not ordered by consumer) sub-unit with a surprise item such as a cookie, appetizer, and/or condiment. During the order process, one (for example, the user interface of the app) can show visually the IDU to the consumer as it is filled with chosen items, and let the consumer select the next item from an application program (or software application, or application, or app). The IDU can have space for garnishes. Some garnishes can be crunchy, cold, and/or melt when put on hot food, and thus such garnishes can be placed just before consumption, but not placed on the food while packing the food. One or two of the condiment containers may be used for the garnishes. Studies have shown that consumers like to doctor-up the food. Thus, consumer engagement can be a part of the delivered-food experience with IDU.

The IDU (and/or SOL) can be returned to a processing facility. The processing facilities can be configured to clean, sanitize, pack, and/or deliver reusable units to the restaurants.

Reusing the Container 100

The disclosed system and method advantageously promotes the reduction of single use plastic and paper waste. In various embodiments, cleaning of the IDU after return can include four phases. The first phase is logging the collected IDU in the system to identify all the sub-components, if any. Additionally, and/or alternatively, the state of the IDU can be checked, and logged to charge the customer and/or the returning party for any damage.

The second phase can be to identify the level of soilage, and/or time the unit was in the dormant state, and soak in proportion to those variables, with each component being separated from the other. as the components can include lids, beverage containers, and/or seals. Un-opened units can be opened, and food can be discarded. Before placing the units in the soaking system, the salvaged food can be collected for compost and/or processed for animal feed. In some embodiments, the IDU can be soaked in a soaking tub for a few hours to 2-3 days.

In the third phrase, the IDUs can go into a washing system with robotic or hand washing systems.

Finally, once washed and dried, the IDUs can be inspected for quality in a fourth phase, including checking the IDUs for any residue and/or bacteria. All fully cleaned and inspected IDUs can be stacked and/or packed in units of 10-100, for example, and ready for reuse/delivery back to the kitchens.

Additional Applications and Uses of the Container 100

The IDUs, being configured for an individual consumer and consumption, can offer unique innovative opportunity to track nutrition data. As one loads the desired IDU for an individual, the individual can add his/her credentials to the system. In a hospital setting, the adding of the credentials can be automatic for each patient because the credentials and/or diet plan can be already in the system. For other institutions such as assisted living facilities, diet centers, sports clinics, sports camps, and/or anywhere nutrition becomes a crucial part of the regime, credentials and/or orders can be linked. There is no longer a need to guess and/or estimate what the individual ordered. When the IDU is returned and observed by a robotic system, the robotic system can estimate, based on selected algorithms, artificial intelligence (AI), and/or machine learning, the amount of each type of food consumed, and the nutritional value in each item, to estimate each meal intake, daily intake, and/or trend line. Additionally, and/or alternatively, the consumer can use the camera on the cell phone, and/or the app to log in the amount consumed. For example, logging of the amount consumed can be on a scale of 1-10, and/or high, medium, or low.

A consumer who is on a strict diet in a hospital, sports camps, at home due to health reasons, and/or on weight loss or other programs can track critical intake such as sodium, calcium, protein, sugar, and/or other nutrients in the food.

Based on the progress of the consumer toward a goal, the menu selection app can offer more nutritionally fitting choices to specific consumers. If the consumer puts in initial state and goals, the app can suggest the menu choices and present trend line when some of the goals can be achieved.

IDU Embodiments

In various embodiments, the IDU can be modular or one-unit with sections, easy to use, 2- to 5-sub-unit system and not 4 to 5 separate containers. In various embodiments, to keep hot food hot and cold food cold, the IDU can be an insulated unit with vacuum and/or insulating material in the IDU sub-units, between the sub-units, and between the units and the external environment.

A typical plate or bowl can weigh 100 to 500 grams, and when made with proper materials with moderate specific heat, it can act as a continuing source of heat. However, if the plate or bowl is not insulated, the plate or bowl can dissipate heat to the environment as well as to the food, defeating some of the objectives.

A good heat sink will be made of metal and/or ceramic material with high specific heat. But this heat sink may need to be placed in an insulated tray and/or bowl, such that the majority of heat and/or chill from the heat sink is provided to compensate for minor heat losses and not to other units (or other food items) in the IDU.

An IDU can thus consist of an insulated tray that holds sub-units, some of which can also be of the size and thickness to facilitate the function as ATM. Porcelain dishes make one good choice for the heat sink container. For example, a porcelain bowl can hold soup, or a plate can hold an entree for serving. The bowl can be placed in an insulated tray (as a container of a unit). Moreover, multiple such containers (or units) can be in the tray. Some units can have an added heat sink and/or added thickness at a part of the unit if the unit is less than 1 mm thick. The material of heat sink can be a thick ceramic bowl, metal and/or heavier parts of a thin ceramic container itself. In various embodiments, the material of the heat sink is not plastic, liquid, or ice as in chaffing dishes or ice chest because water can go through a phase change, and it expands and cracks the container. Expansion via the phase change can be so strong that most potholes on the road are created by freezing and melting of ice. There are other materials that can go through phase change without having a significant expansion or contraction, and such materials can be good candidates for heat sink.

In one experiment, with a total of 1411 grams of stainless and 220 grams of PCM, and all these inner surfaces and PCM allowed to cool from 185 degrees F. to 130 degree F., the Latent heat of PCM provided 2.7 times ATM as compared to the stainless steel. For a lighter unit made or titanium inner surfaces, weighing 370 grams and with 264 grams of PCM the latent heat of PCM provided 11.5 times ATM as compared to Titanium for the same temperature drop. Since there are limits to how hot can the unit be preheated to, to avoid cooking the food and safety, and how heavy the unit can be for transport and ease of use, the latent heat from PCM and the vacuum insulation provide unique and valuable combination. Specifically, when thinner materials and lighter metals, such as Titanium are used.

The heat sink can be ceramic, metal and/or other material (s) with high specific heat. Specific heat includes calories held in the device for each gram of material weight. It can be important to optimize the calories held for the volume and weight of the heat and/or cold sink material.

For example, restaurants often heat a plate or put it on the burner or use the plate as it comes out of the dishwasher to have the food served at the restaurant stay warm or hot for added few minutes as it is presented to the guest. On airplanes, the whole dish is put in the microwave or the oven to keep the food hot longer since the dish (or tray) is also hot. The same is true for dessert. Some places put the dessert in a dish and the dish in the refrigerator, to be ready to serve and to keep the dessert cold longer while being consumed. When food is packaged for delivery that is done currently, there are no such heat or chill sinks to go in the plastic, paper, or metal containers.

The value of the heat sinks can be to provide added thermal mass or coldness to the food, without impacting the quality of the food. In some embodiments, some chemicals have two active ingredients and, when mixed, provide chilling or heating. Such chemicals can be used for camping or taking food to remote locations where heating or cooling is not readily available. For example, for sending ice cream or seafood for delivery, the food may be packed in ice. In another example, food can be stored in a cooler for camping, for example.

The heat and/or cold sink can include a flat disc (for example, up to 10 mm thick for single service IDU but could be much thicker for catering food) or a bowl, made of metal and/or ceramic and sits as a unit in the insulated food tray that includes multiple dish-like insulated sub-units. The insulation for each of these dish-like sub-units is such that some of the sub-units can be hot, while others cold, and some at room temperature. The flat and/or bowl-shaped heat and/or chill sink sits in these insulated sub-units. The final layer above the heat/chill sink may be another layer of metal or ceramic coating, such as to give more material choices for the heat and/or chill sink. These heat and/or chill sinks, if made of food-friendly metals, can be in direct contact with the food, but in a preferred embodiment, the layer in direct contact with the food can be porcelain and/or other ceramic with an optional nonstick coating.

During the process of filling the tray with food that is to be delivered, specific compartments in the tray will be heated or chilled with steam, radiant heater, induction, or direct flame, and the chilling can be done with a shot of cryogenic liquid, dry-ice, ice pack, or ice water. This heating or chilling will be done just minutes before loading the tray with pre-planned menu items selected by the consumer.

As an alternative process, chilled discs or heated discs or bowls are loaded in the insulated tray and snap fitted in the tray. These bowls with thermal content can be pressed in with the lid on the whole tray and kept secure and leak proof for transport. Each bowl or plate may have its own cover of thin foil or metal to keep liquids from spilling out, thus creating a two-stage seal.

Insulated metal base tray expands at a different rate compared to ceramic. Thus, one can use the steam heat and/or cold to temporality shrink fit the bowl or plate in the tray. The same concept applies to the lid of each plate or bowl, which can be shrink fitted on the bowl and easy to pry open with a hand. If the lid is made of material that expands more than the ceramic, it can be heated to a temperature to allow it to become a fitted cover and when it gets a bit cooler, it makes a first seal to the food. The shape(s) and sizes of units of the container 100 can be calculated and configured so that the bowl, plate, or lid fit well. Alternatively, thin foil sealing techniques can be used to seal individual bowls or units and be leak proof as well as easy to pry open.

The features as set forth above can allow 15 to 60 minutes of added time, the typical travel and delivery time, such that the consumer does not have to reheat the food, the containers are appealing and there is no paper, plastic, or cardboard waste.

If the consumer is unable to enjoy the delivered food when it arrives, they can remove the cold or chilled item from the tray and put the whole tray in the oven to reheat. Such a capability can be important because items in various sections of the tray can be cumbersome to remove and reheat.

Exemplary Thermal Sink 105

The thermal sink 105 can include any material with a sufficiently high thermal mass, such as thick metal, to regulate temperature by absorbing, storing, and releasing energy. The container 100 can include a bowl (or plate) and a material C separating the bowl from the thermal sink. The bowl or plate may function as an additional thermal sink.

In various embodiments, the thermal sink 105 can be metal, ceramic, and/or any other suitable material. Since the specific heat of metals and ceramic can be low, the thermal sink 105 may need to have sufficient mass. A high specific heat liquid filled between two layers of metal or ceramic can optionally be used.

In some embodiments, it might be not desirable to make the heat sink and/or IDU hotter than 300 degrees Fahrenheit (F) or 350 degrees F. A higher temperature can be a safety risk and continue to cook the food more in transit.

In some embodiments, 300 degrees F. can be used as the maximum IDU temperature. Thus, there can be a temperature change within 140-to-300-degree F. (or 160 degrees F.) available to keep food warm, with only limited safety risk of burns. Relevant temperatures are also selected to ensure the food in question does not continue cooking during transit. Or, preferably, the temperature, doneness of the food, and transit time, can be selected to such that the food will finish cooking enroute.

In some embodiments, the weight of the container 100 (or the IDU) may be under a limit such that the container 100 does not become too heavy. In some embodiments, the container 100 can be too heavy if weighing more than 5-6 lbs (or 2267-2721 grams) with food in the tray. Accordingly, there can be 2-3 lbs (or 907-1360 grams) of food and drinks, and the tray can weigh 2-4 lbs (or 900-1800 grams) or less. To make the container light, titanium and/or other stiffer materials that can be thinner or lighter can be used.

In some embodiments, the container 100 (or the IDU) can have 2-3 heat sinks and thus no heat sink is more than 12 ounces or 350 grams (0.7 lbs).

With existing technology, main entree food (not soups) can get cold to 90 degrees F. from 140 degrees F. in 15-20 minutes in a dish.

The disclosed container 100 can provide sufficient heat or thermal sink(s) to keep the hot food around the acceptable temperature (for example, 120 to 150 degrees F.) to consider hot food for enjoyable consumption.

Based on the features set forth above, material(s) with a higher specific heat can provide a greater heat sinking effect as long as they are practical.

In some embodiments, water may have the highest specific heat among exemplary materials, and can be ideal if it is desirable to heat to only 200 degrees F. Beyond 200 degrees F., the water can turn into steam and build pressure. Below zero degrees C. (or 32 degrees F.), water can become ice and create pressure.

In some embodiments, ethylene glycol can be used in heat sink if leaks can be prevented. Ethylene glycols have been used in car cooling. These coolants are not edible and not suitable for the food industry or IDU, in case of damage or leaks. In some embodiments, propylene glycol, and/or a mixture of water and propylene glycol can make a good heat sink without the issue of food safety or bursting and can have high specific heat.

In one embodiment, water can achieve a temperature change within 200-to-140-degrees F. (or a change of 60 degrees F.).

Propylene glycol (or polypropylene glycol) heat sink can achieve a temperature change within 300-to-140 degrees (or 160 degrees F.).

In some embodiments, some cooking oils with half the specific heat (compared with water and/or propylene glycol) can be advantageous to provide a temperature change within 300-to-140-degrees F. (or 160 degrees F.).

In some embodiments, a temperature change within 40 degrees F. for food, and/or within 160 degrees F. for the heat sink, can be achieved with 200 grams (0.44 lbs) of heat sink material located in between two layers of metal and sealed properly.

Calculations of ATM and PCM

A typical hot entree can be 500 grams (1.1 lbs) or about 18 oz, including the protein, sauce, etc. Specific heat of exemplary food can range from 0.4 calories per gram per degree C. (or cal/gram/degree C.) to 0.95 cal/gram/degree C. The foods that are moisture-free, such as nuts, are low in specific heat, while foods high in moisture, such as tomatoes, can have the specific heat close to the specific heat of water. Leaving the outliers aside, one can safely assume that most entrees can have specific heat of about 0.7 cal/gram/ degree C., or about 0.4 cal/gram/degree F. In an hour, during typical transport, food can get cold from 150 degrees F. to 80 degrees F. Thus, the food can lose 500×0.4×70=14000 calories (59,000 joules). In the example above with 260 grams of PCM, the latent heat of PCM is 68000 joules, sufficient to compensate to provide heat for various types of losses in a vacuum insulated container, with joints seals, base, and cover. The unique part is to have sufficient PCM to bring ATM while making the other structural materials light for travel.

When the external temperature is cold, a higher reservoir of calories can be needed in the ATM. For example, the ATM can include up to 500 grams of ATM, providing 10 times of the above thermal mass to assure proper delivery temperature for at least an hour of delivery time in various cold geographies in the world. Furthermore, in some embodiments, the quantity of PCM can vary based on the size of IDU. For example, catering platters may require larger quantities of PCM to ensure proper delivery temperature.

Exemplary Container 100 to Keep Fried Food Fresh for a Longer Period

Fried food (e.g., French fries) have a short shelf life (e.g., less than 10 minutes). Afterwards, the fried food mostly gets cold and soggy. This is particularly true in a container that does not breathe. Further, the fried food gets cold because, once out of the fryer, the fried food is exposed to the atmosphere. Even in a cardboard or paper container, the fried food is good for at most 10 minutes. In some cases, a container with some ventilation can be used and fried food is often delivered in paper bags such that the food can breathe. The fried food sent in sealed plastic containers deteriorates the crispness even faster.

In various embodiments, the container 100 can provide insulation, heat sink (or a temporary source of heat for an added 10-30 minutes) and limited ventilation to keep the fried food crisp for 15-45 minutes.

In various embodiments, the insulation can be vacuum and/or other insulating materials between two layers of rigid material.

The heat sink can be metal, ceramic, stone, or liquid (between two rigid layers).

The ventilation can be via holes at the bottom and/or side or the container 100. The holes can be defined in a sieve and/or a wire mesh put into the container 100 that has insulation and/or heat sink.

Wire mesh and/or wire baskets, without being located in the container 100, can be used to serve French fries and other foods, but such an arrangement is not with a heat sink and also not with an insulation and is thus less advantageous.

Figure 6A:
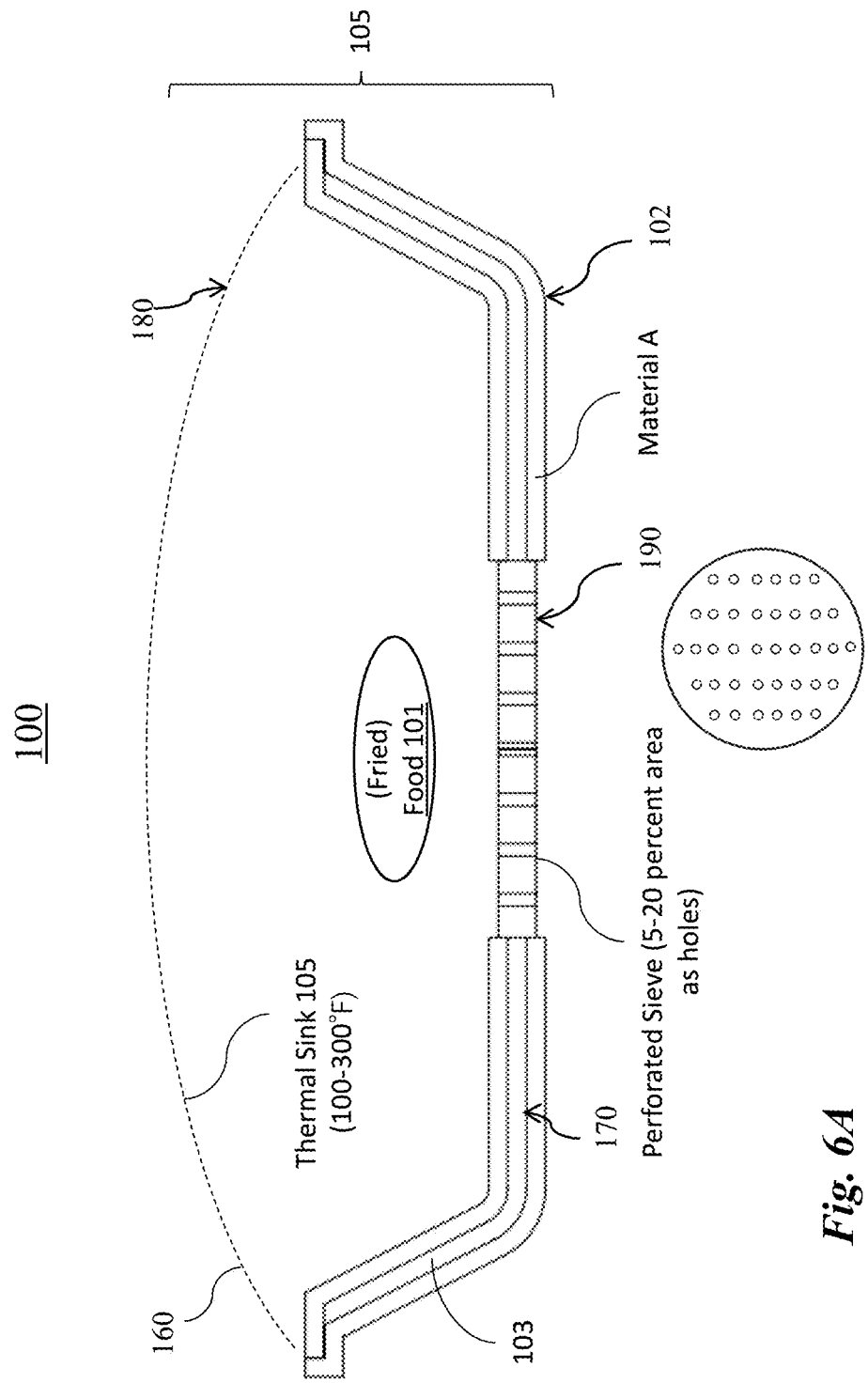
FIGS. 6A and 6B are exemplary diagrams each illustrating an alternative embodiment of the container of FIGS. 1-5, wherein the container is configured to store fried food.

FIG. 6A shows an exemplary container 100 advantageous for fried food in accordance with various embodiments. Additionally and/or alternatively, in various embodiments, the container 100 advantageous for fried food can be suitable for storing any food that may need to be kept crisp. Although all foods can lose texture, some of the foods, such as French fries and chicken tenders, can be quite unappetizing if becoming soggy.

Holes at the bottom of the container 100 can facilitate air circulation for fried food to keep it crisp and may be advantageous for those restaurants that sell a lot of fried food. However, for other restaurants that serve fish, chicken, or steak, the hole at the bottom does not necessarily work.

Figure 6B:
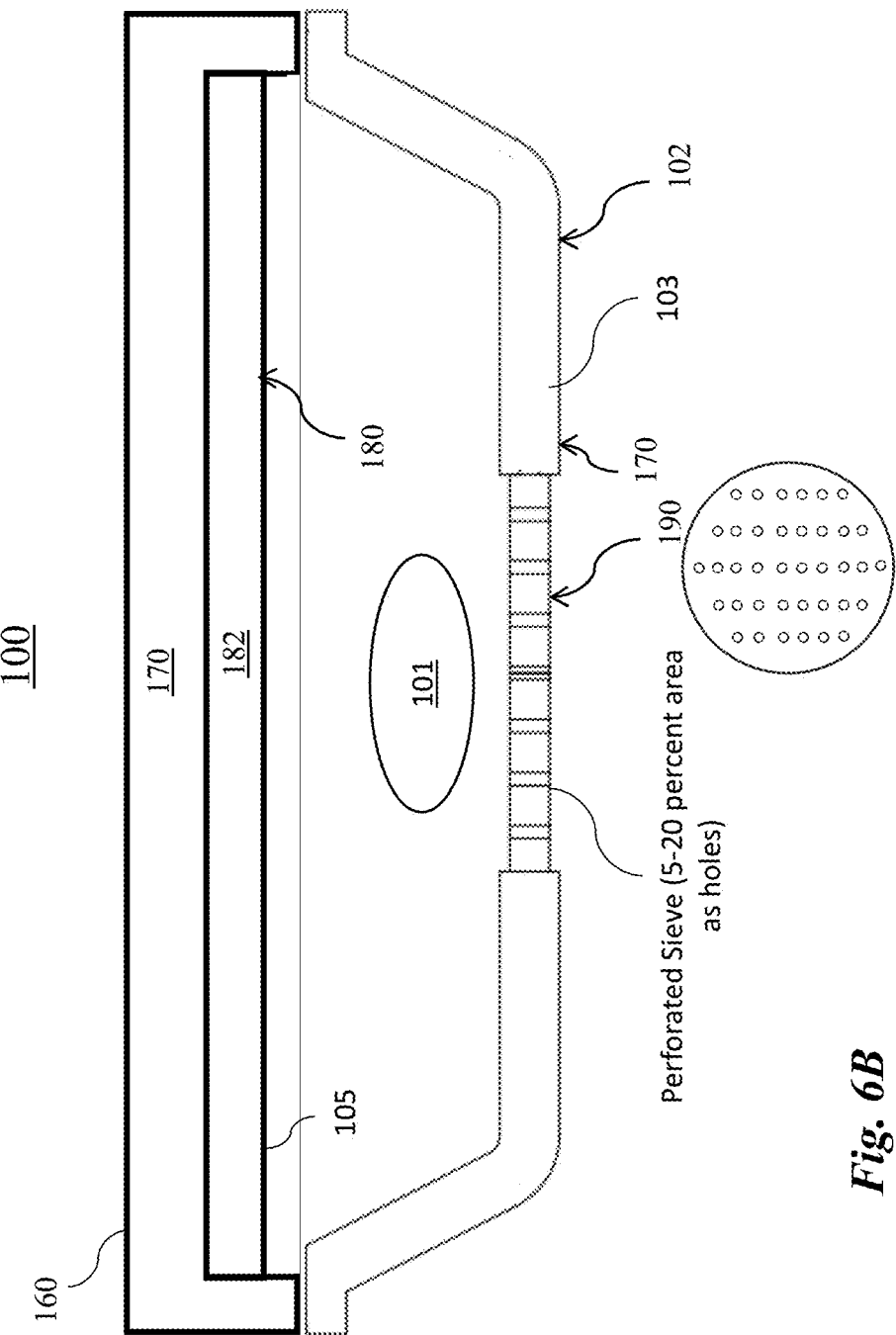

In some preferred embodiments, as shown in FIG. 6B, the container 100 can define vents at the bottom but can include vacuum insulation and thermal sink on a cover 160. Stated somewhat differently, the cover 160 can include an insulation structure 170 that is vacuum insulation, and a thermal mass layer 182 that is a thermal sink. The bottom does not necessarily include vacuum insulation. For example, the bottom can be an insulated plate with perforations.

Figure 7:
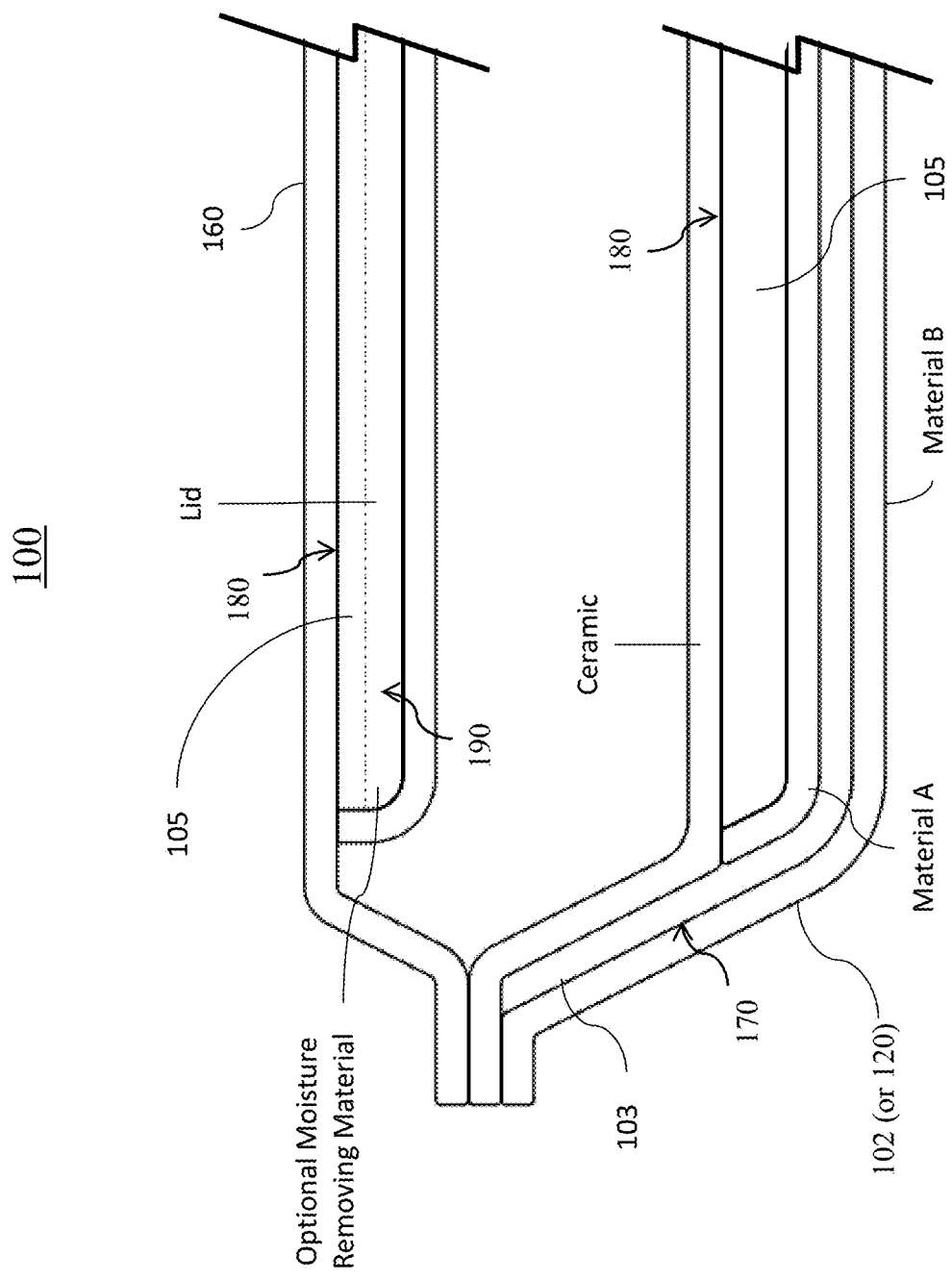
FIG. 7 is an exemplary diagram illustrating another alternative embodiment of the container of FIGS. 1-5, wherein the container includes a moisture-removing material.

Additionally and/or alternatively, the container 100 can have moisture-absorbing desiccant in the tray for one or more sub-units. The way it will work is that the desiccant can be imbedded in a pouch and/or pocket that is a part of the cover, side, and/or bottom of the sub-unit. FIG. 7 shows an exemplary container 100 with moisture-removing material in the lid. The exemplary pouch and/or pocket can be a ¼-½ inch thick and 2-3-inch diameter bubble in the lid on the food side of the overall lid and/or individual lid. Preferably, the exemplary pouch and/or pocket can be on the lid or cover because moisture can rise. When the food is placed in the unit, the desiccant can absorb the moisture.

In various embodiments, the desiccant can be reused and/or recharged while still embedded in the lid. When the desiccant is used up, and the unit goes for washing, the desiccant can also be washed and thus become full of moisture. But when the tray is heated for some time and left in an oven, the desiccant can become moisture-free and reusable. At this point, when it comes out of the oven, a paper seal, foil seal, and/or sticky seal can be placed on the desiccant pocket or pouch area. The seal can make the desiccant safe from exposer to air and moisture, and it can protect the desiccant for weeks until the tray is ready to use at the restaurant to load the food for delivery. Alternatively, the prep station with induction heat can also have a desiccant drying capability to quickly heat and dry the desiccant while being prepared. Additionally, and/or alternatively, a set of unit(s) that will be used in the next hour can automatically have the desiccant dried and be ready to go in the storage and loading area of the prep station.

In various embodiments, the sticky seal on the reusable desiccant can have sections like pizza pie. Stated somewhat differently, ⅛, ¼, and/or all, of the sticky seal can be removed to expose to the desiccant to the level and speed of moisture removal needed that is appropriate for the food type and quantity. Once the food is delivered and consumed, the tray and cover can come back for washing and sanitizing. At this place, the whole sticky seal can be removed, and the process can go on as long as needed for hundreds of uses of this reusable IDU, for example. There are no plastics to waste, pouches to throw away, in contrast to sticking a disposable pouch to the container 100.

Additionally and/or alternatively, the desiccant can be in the form of single-use moisture-removal pouch. In various embodiments, the pouch can be tucked away in the lid for each sub-unit as needed, and/or when needed. The pouch can be tailored in a size suitable for the food in the sub-unit. In a non-limiting example, the size can be level A (e.g., large) for steaks, level B (e.g., medium) for fish, and level C (e.g., small) for French fries. If the size of the pouch (and/or the moisture-absorbing capability) is not tailored well, the food can get too dry, and fries can get too hard. In some embodiments, it can be desirable to not remove more than an essential amount of moisture but remove only enough moisture. Such a feature can be different from the application of desiccant in many conventional usages such as in shoe boxes, bags, or medicine bottles. In the conventional usages, removing moisture more than necessary, or in an imprecise manner, does not negatively impact product quality or customer experience. Thus, the issue of enough moisture, or 'just right' moisture, does not arise in the conventional usages.

In various embodiments, the moisture removing material can be in the rim and/or on the top of the cover 160. The benefit of being in the rim is that more head space can be provided for the food.

Additional and/or alternative ways to remove moisture are discussed in the following. When the vapor coming off the food condenses, if the cover 160, or center part of the cover 160, has heat sink (or ATM) and is at a higher temperature than the circumference or rim, the moisture will naturally condense on the colder circumference. To capture this moisture, without the moisture dripping on the food by above temperature distribution, channel(s) can be defined in the circumference or dome of the cover 160, such that the channels can bring the moisture to a location away from food, for example, to the joint between the cover 160 and the serving base 102. If the cover 160 overlaps with the serving base 102 with micro and/or small gaps, such small amount of moisture (for example, 1-10 cubic centimeters of water) can drip out of the container 100 and/or evaporate out as the moisture is released. The moisture amount can be small and can slowly escape over the first few minutes. Although the moisture can be a small amount, removing the moisture (for example, by directing moisture away) can be critical.

Additionally and/or alternatively, where the moisture deposit starts or initiates (or nucleates) can be managed by surface texture and/or material management. Condensation processes can include nucleation and growth processes. For example, some material surfaces are catalytic with vapor and tend to nucleate water beads. Thus, having the right finish, texture, and material can allow the moisture to nucleate in the specific area(s) of the rim. Other materials or textures in the same area with channels in the rim can wick the moisture away. Selected nanotechnology materials (or nano materials) with high surface area may help in this process of nucleation. Such technology can make the use of desiccant unnecessary. Additionally, and/or alternatively, selected materials can also help in keeping the container 100 bacteria free for food use.

Additionally and/or alternatively, moisture can be managed by use of materials that allow vapor to escape but do not let water drip out. In various embodiments, the materials can be similar to materials used in athletic fabrics. Exemplary materials can include an antiwetting coating such as a material based upon polytetrafluoroethylene. For example, the materials can include, or be similar to, Gore-Tex (available from W. L. Gore & Associates, Inc., located in Newark, Delaware, United States) to allow moisture to escape but keep the surface dry in the rain. In a non-limiting example, the material can be used as a less than 5-mm-thick disc and about 1-cm-wide in the rim, for example, so that the materials can allow compression fit, and release vapor without spilling liquids out. Such materials can be washed at high temperatures to be sanitized well for food use.

Exemplary Covers of the Container 100

In some embodiments, the container 100 can include an IDU with multiple compartments for food delivery, such that each compartment can have a lip that rises above the main flat part of the IDU. The lip can be 1 mm to 1 cm high and provide separation and aesthetics as well as a function. The preferred function is to allow the cover of the IDU to flange with the lip and pressure seal when the IDU is closed. The lip may also have a vertical, as well as horizontal, flat section that can be used to place a foil or lid for the first-stage seal. The whole IDU cover that presses against each dish rim and/or lip can provide the second-stage seal. Thus, the container 100 can have a two-stage seal to be leak proof and appealing. A foil and/or lid can be left in the IDU after the food is consumed and when the IDU arrives at the central wash and re-use facility, the foil can be recycled. The lid and plate can have overlapping circumference area to provide duplicate insulation, provide a way for moisture to escape, and/or have simple fitting seal.

Although various embodiments can use the container 100 for food, and/or take-out food for illustrative purposes only, the features of the container 100 can be used for any other suitable field of applications that require storage and/or delivery of multiple items that require respective temperatures and are packaged in a single container, without limitation. Exemplary other applications can include, for example, temperature-sensitive biological and/or medical experiment sample storage and/or transportation, forensics, and/or the like.

Exemplary Reusable Single Container 100, Multi-Course Food Ordering System

Conventionally, food deliveries can come in a variety of disposable containers. If a consumer orders steak, salad, and French fries, the food comes in three separate containers. And all the condiments and sauces also come in additional separate containers. If a dessert is ordered, it comes in its own container. Some containers are biodegradable.

To put a variety of food combinations of a main entree, side dish, dessert, condiments, and a drink in one container has never been done in existing technology, because conventional food service industry has only focused on how to package what they serve rather than on matching the food and container. In various embodiments, a meal can include an entree, one or two side dishes, a dessert, and a drink. All delivered food also contains a variety of condiments. In various embodiments, a solution is to have a perfect match among the food that is cooked in the kitchen, the delivery IDU compartments, and the choices the consumer wants.

A conventional restaurant cooks based on the menu made by the restaurant and serves the food in a variety of dishes as the restaurant sees fit. The conventional food delivery industry, as it became popular, just added various types of packaging to individually package burgers, pizza, salad, pasta, entrees, side dishes, and condiments. Such conventional food delivery has significant disadvantages because a typical meal can be in 4-6 containers with wasted paper, plastic, Styrofoam, and other materials. All existing reusable and washable containers generally serve only one item. A conventional specialty salad restaurant can have its own salad bowl and give credit for bringing the salad bowl to the store for the next meal. A conventional specialty coffee house can have reusable coffee cups and give some credit too. There are a variety of conventional single-item, keep-warm and insulated containers, water bottles, single compartment containers with vacuum seal, and food containers with multiple stackable sections. None of these are user-friendly, or easy to eat from. The conventional containers are not designed to match the food being served and the food is not prepared to fit the compartments.

In various embodiments, the food container 100 can include an IDU with 3-10 compartments or sections, such that the IDU can precisely accommodate the food being selected, in a sequential manner by the consumer. The sequential choices offered, while ordering food, to the consumer become limited as the selections are made and the available compartments are filled up. The value of such a flow is that the food fits properly, does not slosh around, and there is enough variety for the consumer who gets the food all in one IDU. As the consumer opens the IDU, the consumer can see all that is ordered and there is only one IDU to use, track, return, wash, and reuse. The IDU can be expensive but can allow thousands, and/or tens of thousands of times of use before being put out of commission due to dents, breakage, and/or fit. Also such units have metals, ceramics and other materials that can be crushed, easily separated, and recycled to become a net-zero system.

In various embodiments, the food ordering system can start with one item A. Item A can include an item chosen by the consumer first, which can be meat, other protein, salad, and/or a main dish. An exemplary main dish can include a salad, burger, pizza, pasta, fish, steak, chicken, and/or vegetable. A condiment, garnish, or sauce for item A can go in a smaller sub-unit E1 in the tray. There can be a place for each item on the menu in the IDU. If a salad ordered is entree size, the salad can fill a larger compartment as opposed to a side dish compartment. Once that item is ordered, the only other choices are other dishes (or unused units in the IDU) that go in the other available compartments B, C, D, or E. There may be multiple compartments of the same size. For example, compartments C and D may be of the same size, and E can be E1 to E4 to allow 4 condiments. In some embodiments, in the ordering scheme as set forth above, if an order item goes beyond the capability of a single IDU, the item is not positioned in the IDU. For example, if someone wants to order wine and coffee and there is only one "tube" or space available to put either coffee or wine. Based on the scheme, for exceptions where one IDU is not sufficient and/or consumers may want something more, the order can lead to the start of a second IDU and/or other choices.

If a dessert is ordered first then one of the side dishes spaces is booked, and other spaces can be open. Analogously, in an airline seat system, there are only 7 seats and no more. One seat can be left empty, but 8 passengers are not allowed in the seven seats. The reason for such a streamlined system is the automation and standardizing of the food preparation, loading, heat and/or cold sinks, IDU configuration, delivery, and washing system.

The IDU consisting of heat and cold sinks can be chilled or heated as they pass the kitchen line, where segments in the kitchen load up specific items through prompts and data available at each station. The kitchen can be run like an assembly line, but with flexibility to customize thought and information about the order sharing and timing.

The IDU can have removable beverage containers that can be pre-heated, or pre-chilled, just as each unit can be. These containers can handle tea, coffee, juice, and/or water. If wine, beer, or soda, etc. are ordered, they can fit in the same type of space as tea, coffee, cocktail, juice, or water, where a tubular beverage container will fit. The ideal tubular container can be the size of a standard skinny beverage can, a soda can, etc.

Exemplary Food Ordering, Fulfilling, Delivery, Return, Wash, and Reuse System

Conventional food container systems are inefficient and costly, creates millions of tons of waste, and gives the consumer a poor experience. Conventionally, a consumer orders for convenience, pays a price for the food, and eats what is put in front of the user (the food being hot, cold, soggy, or mixed up), and packs up unused food or throws all the unused food and packaging in the garbage.

The ecosystem as set forth in the present disclosure can start with a menu such that the food prepared and offered is easy to transport and fits in the highly engineered container.

The exemplary kitchen can have sections based on the activity that the kitchen does, such as baking, sauté, sauces, condiments, grill, dessert, beverage, etc. The activities can be streamlined for order fulfilment.

A consumer can order a variety of items that can mix and match, including, e.g., tortillas, pancakes, toast with eggs, roti, naan, pita, or rice to go with chicken curry, and/or the like. All the items can fit in specific compartments. The mix-and-match is possible because all items can be available in various stations in the streamlined kitchen. In some embodiments, the consumer can order any of the 3-4 condiments from a list of 20-30, and the condiments fit in each condiment section properly.

The sections or units of the IDU can be prepared with heat and/or cold blast, based on what will go in each unit. The food can be placed as the IDU moves through the kitchen. The IDU can be closed and delivered to the consumer. As a way of tracking and return system, the IDU can have Radio Frequency Identification (or RFID), bar code, and/or quick response code (or QR code).

When the consumer opens the IDU, the consumer can see all the items in one place. The consumer does not have to rummage through various containers, lids, or cold food that needs to be reheated. Also, at the kitchen pass where food is plated/packaged and packed up, the system can see and make sure that all items ordered are in the IDU, since order accuracy is one of the largest complaints.

After eating the food, the consumer can put the lids (if any) in the tray, close the IDU and put the tray aside to return in a variety of ways. The ways to return the IDU can be to pick the IDU up on the next delivery by a delivery service person, to have a dedicated return team to bring the IDU back, to reward the consumer to bring the IDU back to a central station, to have slots in a mailbox for IDUs to be put in (like newspaper boxes), and/or to have a dedicated sanitation operator pick the IDU up, etc.

The returned IDUs can be examined manually and/or by robots. Unused and/or unspoiled food can be processed into animal feed. Additionally, and/or alternatively, the IDUs can be examined for the length of dead time and/or dried up/stale food in the IDU and can be put in a soaking tub if needed. The automatic washing systems wash the IDUs, and robots can examine the IDUs for cleanliness and/or bacteria before the IDUs are put back in the reuse queue.

The disclosed method and system can be minimum-waste, freshness-driven, flexible, and choices-focused to provide the ultimate restaurant quality or even better experience at home for the delivered food. The disclosed method and system can be transformational for the environment and health. The disclosed method and system can also provide an overall economic solution, when all the costs of the environment, car use, productivity, waste, and health implications are considered.

The IDU can have a bar code and/or QR code to track and/or deliver. The QR code can include what is in the container. A consumer can scan the QR code and load the nutrient content of the entire meal. The IDU can have a deposit system. An exemplary deposit system can be like renting a bike or taking out a book from the library. For example, the customer can pay a deposit and as the IDU is returned to the processing place, the deposit can be credited back. In some embodiments, as the robots open the IDU for automatic washing, the robot can assess the amount of food left over and adjust the food consumed and nutrients for the customer. Such a process can be advantageous for the elderly, athletes, people recovering in a hospital and/or rehabilitation center, or the like.

In some embodiments, the consumer can keep track of all the food ordered, food consumed and/or the nutritional content. Additionally, and/or alternatively, the consumer can load allergy information such that only items that are non-allergy type are offered to the consumer ordering the food for themself.

To avoid waste, each item on the menu can have a portion choice. Based on the item and the portion choice, one can adjust the heat and/or cold provided to the heat sink so that energy is not wasted, and the food arrives at the right temperature. Additionally, and/or alternatively, based upon delivery time, the level of heat sink or the heat provided to heat sink can be adjusted.

In an example as shown in FIG. 6A, the insulation can be vacuum and/or other insulating materials between two layers of rigid material.

The heat sink can be metal, ceramic, stone, and/or liquid (between two layers of rigid material).

Preparation of the Container 100 for Accepting Food

A kitchen can accommodate IDU and prepare the IDU to accept food. A conventional restaurant can be short on space and can be modified to be able to handle the IDU in an organized and effective manner.

Because the IDU is insulated with an ATM, the IDU can be prepared with radiant, convection, induction, and/or microwave type of heat.

In some embodiments, convection heat is not the most efficient and can be slow.

In some embodiments, radiant heat and/or induction can be preferred choices. Induction can be efficient and can be effective for a vacuum insulated IDU. With an IDU that has insulation and ATM, transmitting heat directly to the ATM through the vacuum and/or insulating layer can be effective and efficient. For example, for 200-300 grams of PCM, 1-5 kw of power unit is sufficient to heat the PCM from room temperature (e.g., or 70 degrees F.) to 180 degrees F. in 30 seconds to 3 minutes. Higher power units require less time if the heat input is quickly distributed, for example, with an induction coil design. The coil provides uniform heat to the dome or bowl shape within +/−10 degrees F.

In some embodiments, an IDU prep system or appliance with induction heat and/or cryogenic chill can prepare an IDU in a minute.

The timing of the preparation can be integrated with the order processing, delivery staff, and the type of food.

In some embodiments, the level of induction heat and prep temperature can be adjusted based on the food type and quantity that will go in the IDU.

In some embodiments, an appliance to prepare the IDU can be a conveyer system and/or a hopper type. The appliance can be a front, and/or top, loading system.

To allow cooking and serving on the same plate, or cooking, packing, and eating 30-60 minutes later, a cookware or plate can be configured to accomplish the objective.

The container 100 (or a plate) can have a disc of material that can be induction heated. The container 100 can be insulated on sides, the top, and/or the bottom. The cover to the container 100 can make a good seal to the container 100. When the container 100 is placed on the induction stove or induction creating surface, the plate (for example, made of iron or stainless, etc.) can generate heat. The heat can be transmitted to the larger heat sink in the container 100. The heat sink and disc can be insulated from the outside environment by vacuum or other insulating material. The heat sink has good thermal mass and conductivity. Food can be placed in such a container 100 to cook. Once cooked, the lid is placed to seal the food and insulate it from the environment.

Figure 9:
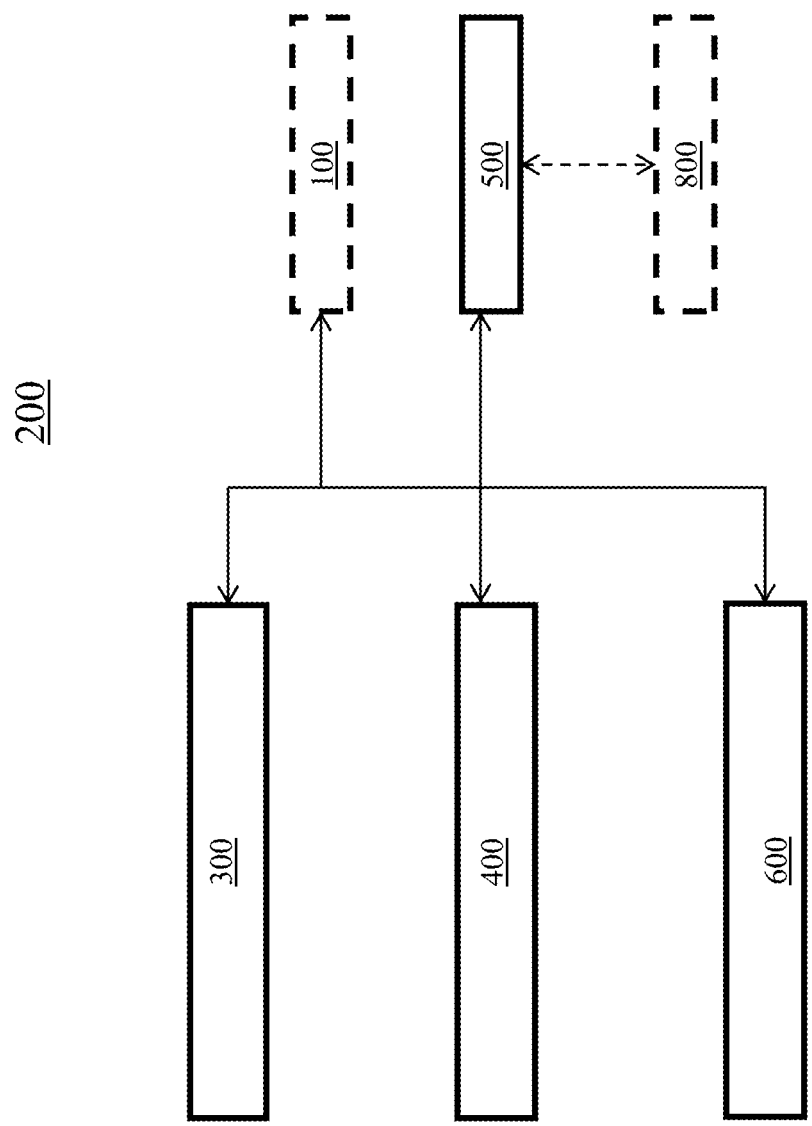
FIG. 9 is an exemplary diagram illustrating an embodiment of a system for food service based upon the container of FIGS. 1-8.

Turning to FIG. 9, an exemplary system 200 for food service is shown. The system 200 is shown as including at least one container 100 and a controller 500. The system 200 can include a kitchen unit 300, a delivery unit 400, and/or a post-processing unit 600, each being in communication with the controller 500 and/or performing one or more functions that are associated with the container 100.

The controller 500 can store menu and/or food information. The controller 500 can include one or more computers, or server computers, for taking a food order from a customer in person, and/or via wired and/or wireless communication with a customer device 800. The customer device 800 can include any computer or mobile device that sends the food order to the controller 500. The controller 500 can instruct the kitchen unit 300 to prepare food based upon the food order and/or to load the food in the container 100. The controller 500 can instruct the delivery unit 400 to implement delivery of the container 100 with the food. The controller 500 can instruct the post-processing unit 600 to collect the container 100 from the customer after food consumption and/or to clean up the used container 100.

The kitchen unit 300 can include any computer device, cooking apparatus, sensors, and/or food processing apparatus that collaboratively prepare food and/or load the food in the container 100, optionally based upon communication with the controller 500. The delivery unit 400 can include any computer device and/or transportation machines that collaboratively deliver the food in the container 100, optionally based upon communication with the controller 500. The post-processing unit 600 can include any computer device, storage apparatus, collection apparatus, sensors, and/or dishwasher that collaboratively reclaim or collect the used container 100, and prepare the container 100 for reuse, optionally based upon communication with the controller 500.

Although FIG. 9 shows the system 200 as including the controller 500, the kitchen unit 300, the delivery unit 400, and the post-processing unit 600 for illustrative purposes only, the system 200 can include none of, or one or more of, the controller 500, the kitchen unit 300, the delivery unit 400, and the post-processing unit 600, without limitation. The controller 500, the kitchen unit 300, the delivery unit 400, and/or the post-processing unit 600 each can be at least partially controlled by the controller 500 or can be operating without control by the controller 500, without limitation. Although FIG. 9 shows the system 200 as including the optional container 100 for illustrative purposes only, the system 200 can include any other types of suitable containers, without limitation.

Exemplary Containers 100 and System Functions Associated Therewith

The exemplary container 100 can include a container base 120 (shown in FIGS. 4B and 8, for example) and at least one receptacle (or plate, bowl, cup, or any other type of serve ware, or silverware, for holding food) 140 (shown in FIG. 8) coupled with, and/or fitting within, the container base 120. In one embodiment, the PCM can be installed on the plate. In another embodiment, the PCM can be installed in the container base 120.

In some embodiments, the container 100 can be picked up after food consumption. The receptacle 140 can be removed from the container base 120 and be washed.

The container 100 can include a cover 160. The container 100 can include the receptacle 140 fitted within the container base 120. Stated somewhat differently, the container 100 can be delivered to the consumer as a single integrated piece with the cover 160. The consumer can receive the entire container 100 from a delivery worker. In some embodiments, the container base 120 can be removed from the receptacle 140 when consumer consumes food. The cover 160, the receptacle 140, the container base 120, or a combination thereof, can be made of a material of high perceived value (or high-perceived-value material). For example, the material can include porcelain and/or ceramic of high perceived value. In some embodiments, at least the surface region of the receptacle 140 that interfaces with the food can be made with the high-perceived-value material.

Although various embodiments set forth the cover 160 as covering the entire container 100 for illustrative purposes only, the cover 160 can cover at least a portion of, and/or only a portion of, the container 100, without limitation. In some embodiments, the cover 160 can cover at least a portion of the container 100. The portion of the container 100 covered under the cover 160 can be partially covered by a smaller cover (for example, the cover 112 shown in FIG. 8), and thus the smaller cover can face food directly. Similarly, features of the cover 160 (for example, heat sink, insulation, moisture removal) as set forth throughout the disclosure can be included in the smaller cover in any suitable manner.

Figure 8:
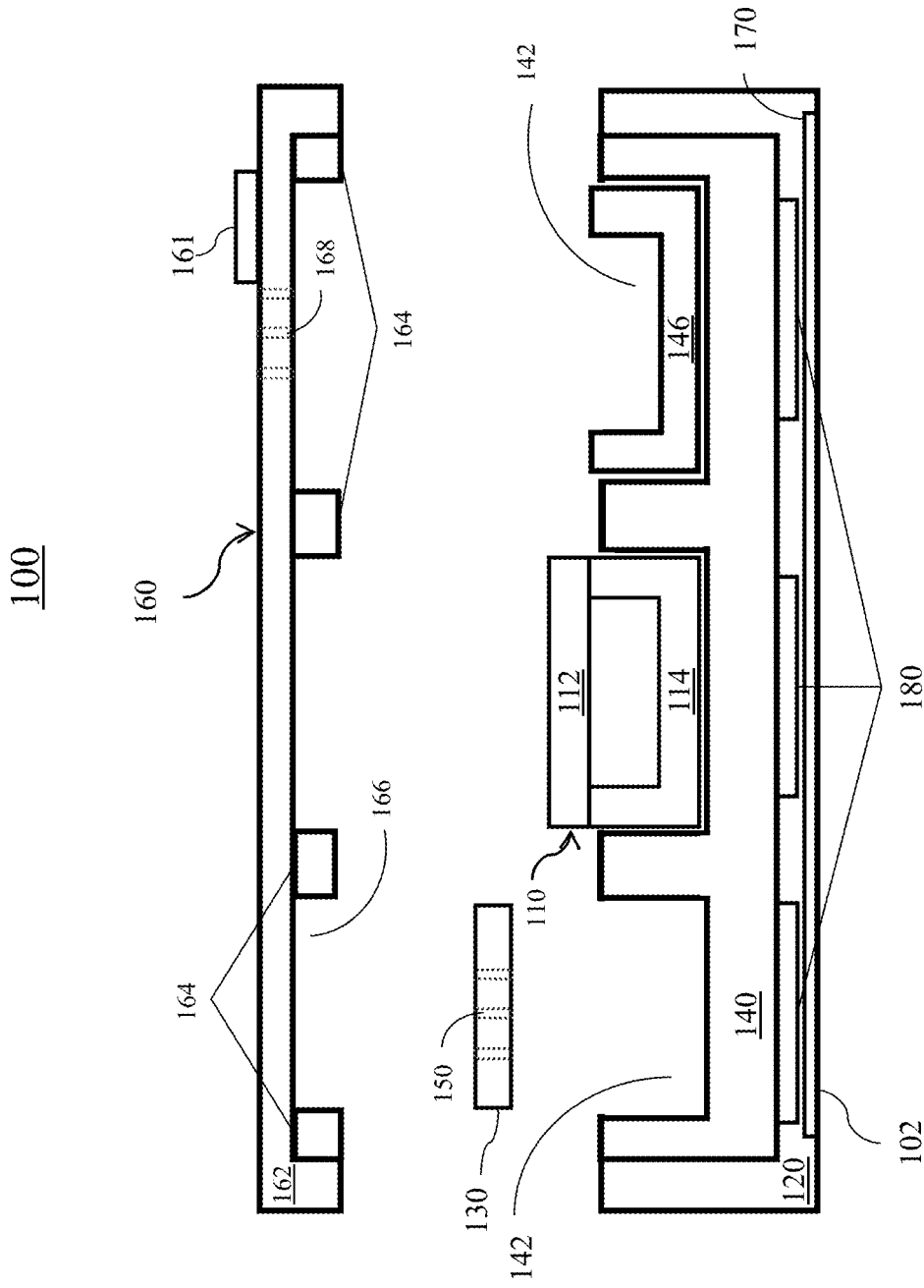
FIG. 8 is an exemplary diagram illustrating a cross-sectional view of an embodiment of the container of FIGS. 1-7.

FIG. 8 shows the container 100 as optionally including an alternative-temperature box 110 configured to fit within a selected one of the slots 142 defined in the receptacle 140. The alternative-temperature box 110 can include a cover 112 and a container 114. In various embodiments, the container 114 can be insulating or insulative. For example, the container 114 can have double-walled insulation with vacuum and/or other materials. The alternative-temperature box 110 can be used for storing food that requires a temperature different from the temperature required for food in other slots 142. For example, other slots 142 can store hot food and the alternative-temperature box 110 can store cold food.

The container base 120 is shown as including at least one thermal function piece 180. Thermal function piece 180 can include any suitable material that, when integrated in the container 100, can make the container 100 reach a desired temperature and/or maintain the temperature more easily and for longer. In one embodiment, the thermal function piece 180 can have a high thermal capacity so as to be a heat sink for the container 100. Additionally and/or alternatively, the thermal function piece 180 can have a high thermal conductivity so as to be easily and quickly charged. Additionally and/or alternatively, the thermal function piece 180 can be an inductor suitable for induction heating. Stated somewhat differently, the thermal function piece 180 can be a material with high inductance. An exemplary suitable inductor can include a ferromagnetic material. Accordingly, an exemplary thermal function piece 180 can be made of a PCM, a ferromagnetic material such as stainless steel 410, stainless steel 416, or preferably a combination thereof.

The thermal function piece 180 is shown as being in the form of a plurality of small segments of thermal function pieces 180 including, for example, three thermal function pieces 180 (or more based upon the number and/or functions of sub-units), one for each sub-unit and with insulation underneath the thermal function piece 180. In some embodiments, two or more of the sub-units can share one of the thermal function pieces 180. In various embodiments, at least some of the thermal function pieces 180 can be insulated. The thermal function pieces 180 of the sub-units are shown in FIG. 8 as being insulated as a whole by the insulation structure 170. An exemplary insulation structure 170 can include an encapsulation layer that defines a cavity for vacuum and/or other insulation materials.

In some embodiments, one or more of the thermal function pieces 180 of the sub-units can be insulated separately from other thermal function piece(s) 180 and from the outside of the container 100 (for example, one insulation structure 170 for each thermal function pieces 180). In some embodiments, the insulation structure 170 can include a portion or all of the vacuum insulation 103 and/or other insulative materials.

The cover 160, the receptacle 140, and/or the container base 120 can be charged prior to being loaded with the food. The charging can include heating and/or cooling to make the cover 160, the receptacle 140, and/or the container base 120 reach a target temperature. In some embodiments, an exemplary charging process can include induction, oven heating, refrigeration, and/or freezing.

In some embodiments, an edge region of the receptacle 140 and an edge region of container base 120 can be aligned. The charging process can include induction and/or heating in an oven. The consumer can receive the entire container 100 from a delivery worker. Additionally and/or alternatively, the consumer can receive and/or keep only the receptacle 140 (with loaded food). In that case, the delivery worker can take away the container base 120. The thermal function piece 180 is shown as being in the form of a plurality of small segments, one for each sub-unit and with insulation underneath the thermal function piece 180. The thermal function pieces 180 can be insulated as a whole by the insulation structure 170.

The shapes of the container 100, the cover 160, the receptacle 140, and/or the container base 120 can be selected in any suitable manner. The number, shape, and/or size of the slots 142 can be modified and/or customized.

In some embodiments, the container 100 can define a single slot 142. The cover 160 can be insulating. In one example, the cover 160 can have double-walled insulation with vacuum and/or other materials. In some embodiments, the receptacle (or plater, or food tray) 140, or at least the surface region thereof that interfaces with the food can be made of ceramic. Such single-item containers can be large, as large as some of the chaffing dishes, and can be loaded with food for use in the restaurant, catering, or buffet dinners at weddings. Such large platters can be used for hot as well as cold food, without the need for hot water or ice.

In some embodiments, the receptacle 140 can be shaped to wrap over the edge region of the container base 120. Stated somewhat differently, the receptacle 140 can define a lip to overlap with the edge region of the container base 120. Thus, the food can soil the receptacle 140 without making the container base 120 dirty. Accordingly, only the receptacle 140 needs to be cleaned with a dishwashing process. In contrast, the container base 120 can be wiped down with a faster and simpler cleaning process without the intensive dishwashing process. Consumption of water and energy can be reduced. Advantageously, cleanability of the container 100 can be improved and environmental impact can be improved. The cleaned container base 120 can be charged for the next food order.

Sealing and Venting

The container 100 is shown as including the receptacle 140 defining a plurality of slots 142. The slot 142 can optionally have a slot cover 130 configured to fit the slot 142. Optionally, the receptacle 140 can include one or more sub-containers 146 fitted therein for defining the slots 142. Optionally, the slot cover 130 can define one or more vent holes 150. Certain foods (for example, fried food) may need to be vented to stay fresh and crispy. The vent holes 150 can advantageously keep such food fresh and crispy for a longer time.

In some embodiments, the cover 160 can include an overall cover base 162 and an overall fitting layer 164 attached to the overall cover base 162. The overall cover base 162 and the overall fitting layer 164 can optionally be attached in a releasable manner. For example, the overall fitting layer 164 can include a gasket. Stated somewhat differently, the overall fitting layer 164 can include a lid-integrated gasket. The overall fitting layer 164 can define a plurality of slots 166 to mate with the slot covers 130. Thus, the cover 160 can form a tight, or air-tight fit with the slot covers 130. Advantageously, the slot covers 130 can be securely fixed on the slots 142 and food leakage can thus be prevented.

The overall cover base 162 can optionally define a plurality of vent holes 168 that can be opened or closed in any suitable manner. For example, the overall cover base 162 can include a toggle switch 161 for exposing or covering the vent holes 168. Thus, selected food can be vented to remain fresh longer. For example, food that needs venting can be loaded in a selected slot 142 that has the slot cover 130 with the vent holes 150 (shown in FIG. 8) ad/or exposed to the vent holes 168, and can vent via the vent holes 150 and/or the vent holes 168.

Charging of the Container 100

The container 100 can be in various configurations in accordance with various embodiments. Each configuration can be advantageous in certain applications. In one configuration, the receptacle 140 can be an integral piece. The thermal function piece 180 can be located in the container base 120. In another configuration, the receptacle 140 can include a receptacle base (not shown) and a plurality of sub-containers 146 fitted therein. The container base 120 is not always necessary. In yet another configuration, the thermal function piece 180 can be embedded in the receptacle 140. In yet another configuration, the thermal function pieces 180 can be slideably installed on the receptacle 140. In yet another configuration, the thermal function pieces 180 are not necessarily installed in the receptacle 140 or the container base 120.

The container 100 in various configurations can be charged in various manners, respectively. In one embodiment, the thermal function pieces 180 can be heated by induction (on an induction plate, for example) and/or oven. The thermal function pieces 180 can be cooled by refrigerator and/or freezer. The thermal function pieces 180 and the receptacle 140 can be charged when being separate and/or being attached. In another embodiment, the charging can be performed in a manner similar to the embodiment above, but the receptacle 140 can include the plurality of sub-containers 146 that can be charged. In yet another embodiment, the charging can be performed in a manner similar to the embodiments above, but the receptacle 140 can include an integral single piece.

Figure 10:
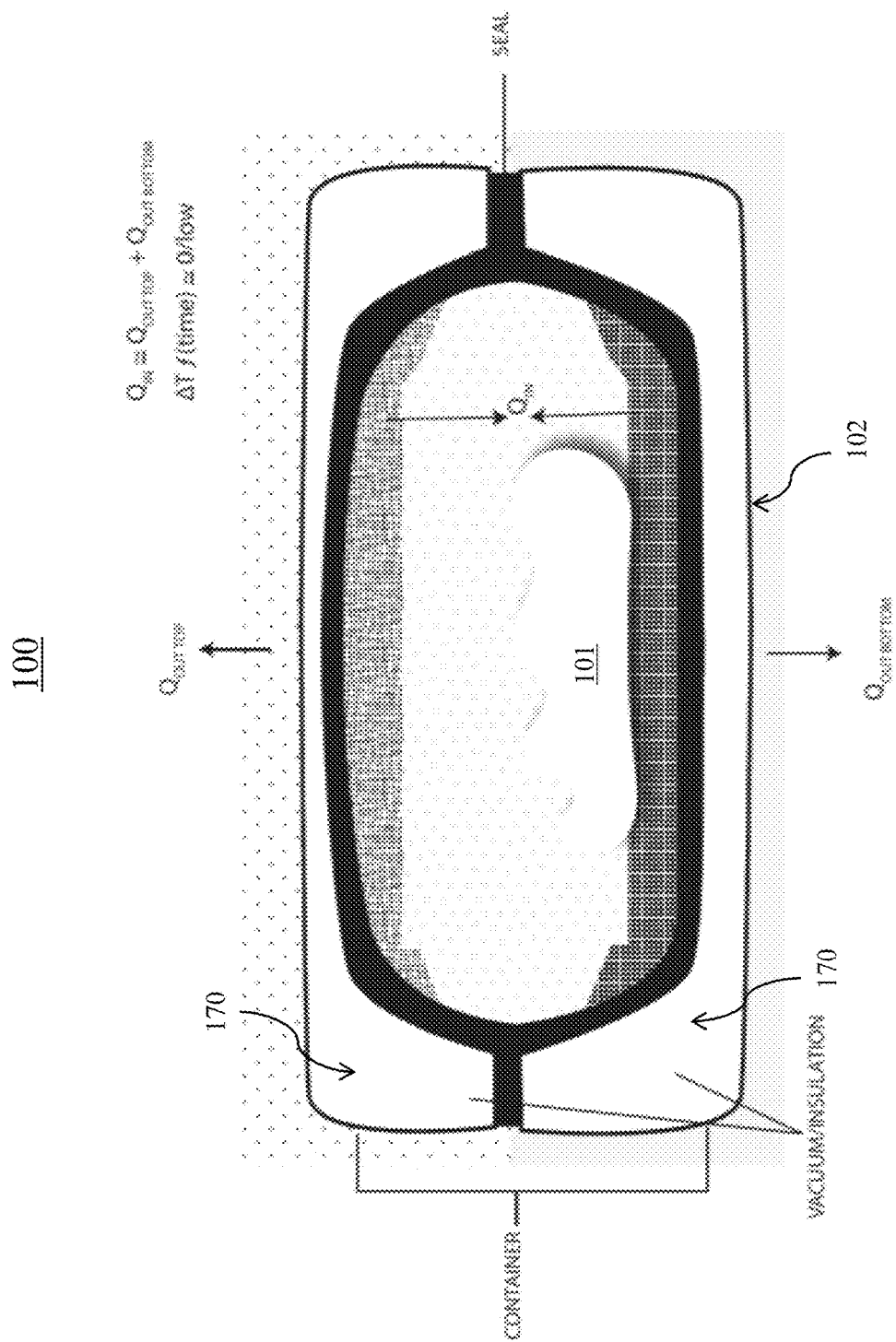
FIG. 10 is a schematic diagram illustrating an embodiment of a container, wherein the container can be used for laboratory testing.

FIG. 10 illustrates a schematic diagram of the container 100 in accordance with various embodiments. To maintain the temperature of the food, the following heat balance equation can be met: Heat loss from food through insulation or other ways=Heat added by charged material into the food via conduction. Thus, preferably, the thermal function pieces 180 and/or any other component contacting the food can have a high thermal capacity (to store thermal energy), have a high thermal conductivity (to be charged faster), being ferromagnetic (if charging is via induction), or a combination thereof.

FIG. 11 shows a table 760 illustrating properties of various materials that can have the features as set forth above for FIG. 10. A ferromagnetic material, and a high-specific-heat material, and a combination thereof, are shown. The exemplary ferromagnetic material can include stainless steel such as, for example, stainless steel (SS) 410. The exemplary high-specific-heat material can include the PCM such as, for example, PCM X70. PCM X70 can have a high latent heat capacity at 70 degrees C. (or 158 degrees F.). In some embodiments, a combination of the ferromagnetic material and the high-specific-heat material can be advantageous for making the thermal function piece 180. The high-specific-heat material can help to maintain the required temperature for a longer period. The ferromagnetic material can change temperature quickly if heated via induction.

Figure 12:
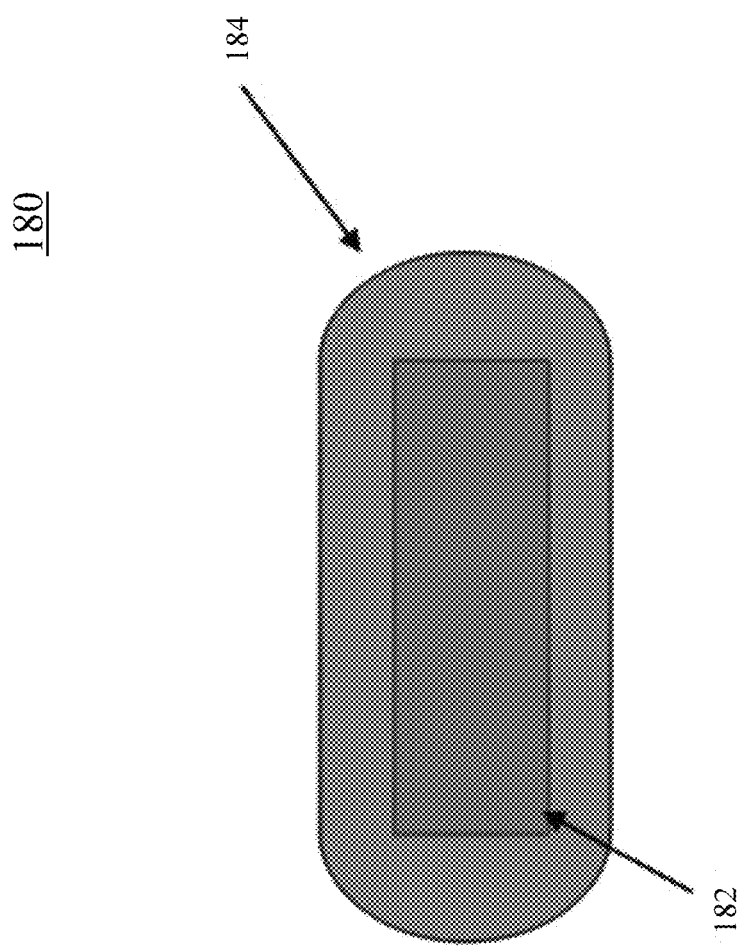
FIG. 12 is a schematic diagram illustrating an embodiment of a thermal function piece of the container.

Turning to FIG. 12, a schematic diagram of an exemplary thermal function piece 180 is shown. The thermal function piece 180 can include a center portion made of the high-specific-heat material surrounded by an edge portion made of the ferromagnetic material. Accordingly, the thermal function piece 180 can heat up fast on the edge portion. The center portion can receive heat via the entire periphery thereof.

Although FIG. 12 shows the high-specific-heat material surrounded by the ferromagnetic material for illustrative purposes only, the combination of the high-specific-heat material and the ferromagnetic material can be in any suitable form, without limitation. For example, the high-specific-heat material and the ferromagnetic material can be mixed and/or blended in a uniform and/or non-uniform manner. The specific type, form, proportion, and/or amount of material, or the combination of the materials, can be determined based upon requirements on time of charging (by induction or other methods), the time for food to maintain the desired temperature, the amount of food, or a combination thereof. In one example, the requirement can include keeping 8 counces of food to remain at a selected temperature for an hour.

Although FIGS. 11 and 12 set forth the materials applied to the thermal function piece 180 for illustrative purposes only, the materials as set forth above can be used in any other components of the container 100 in any suitable manner, without limitation.

Tracking the Container 100

The methods for tracking the container 100 in the system 200 can include an application program (or software application, application, app), barcode, QR code, RFID, Global Positioning System (GPS), Wi-Fi, Bluetooth, Near-field communication (NFC), electronic toggle, Apple AirTag, Google moto tag, or a combination thereof. The methods of tracking can be determined based upon requirements on cost, complexity of operation, and/or other factors.

In order to minimize loss of IDUs and manage the lifecycle of IDUs (from restaurant to customer, to processing facility, back to restaurant), the IDUs can incorporate a tracking system. A combination of RFID tags, GPS chips, cellular chips, Bluetooth chips, QR codes, and/or batteries can be used to track the IDU in different parts of the lifecycle. Tracking technologies can be combined on a single or multiple chips.

An RFID tag can be incorporated into the design of the IDU to track the flow of the IDU through portions of the lifecycle where having other auxiliary RFID equipment (scanner, reader, antenna, etc.) is feasible. For example, the RFID system can be used to track the IDU through a processing facility where the setup of additional auxiliary RFID equipment is practical. In some embodiments, the RFID system cannot be used to track the IDU at the customer's premises, during delivery (assuming drivers are not equipped with additional RFID equipment), etc. Either an active or passive RFID tag can be utilized. An active RFID tag would necessitate that the IDU contain a small battery, but would have the benefit of allowing for an RFID system that covers a larger area. The RFID tag on the IDU would communicate with the auxiliary RFID equipment which would then determine and transmit location information to a centralized monitoring system. The IDU would have to be within a specific coverage area for the location transmitting functionality to work. This coverage area would be determined by the type of RFID tag used as well as the type of auxiliary RFID equipment used.

To handle situations where the setup of an RFID system is not feasible (for example, at the customer's premises), the IDU can also (and/or alternatively) be equipped with a combination of a GPS and cellular chip(s) as well as a battery. Additionally and/or alternatively, the IDU can be equipped with GPS chip(s), Bluetooth chip(s), and/or a battery. These options would also allow for tracking of the IDU during portions of the lifecycle that allow for auxiliary RFID equipment (so incorporating RFID technology into the IDU is not strictly necessary, but the RFID tracking can potentially be more accurate for such portions of the lifecycle). The first option (GPS and cellular chip(s)) would allow the IDU to be tracked anywhere that GPS signal is available and the proper cellular signal is available. This option would also require the establishing of a contract with a cellular service provider. The GPS would determine the location of the IDU, and the cellular component would allow the transmission of that GPS location to a centralized monitoring system. The second option (GPS and Bluetooth chips(s)) would require a dependency on the customer's cell phone (or other compatible device). GPS would, as with the first option, be used to determine the location of the IDU, but that location information would then be transmitted to the centralized monitoring system via the customer's cell phone (or other compatible device). For this to function, the IDU would have to be paired with a customer's cell phone (via Bluetooth), the customer would have to download an app (that handles the communication to the centralized monitoring system), and the customer would need to have a working internet connection that allows for communication to the centralized monitoring system. The customer can be required to download the app as a condition to receive the IDU or as part of the food delivery process. A variant on the second option, could be to omit the GPS component, and have only a Bluetooth chip (with a battery). In this case, the location information of the phone could be utilized as a proxy for the location of the IDU. For this to function, in addition to the previously stated requirements, the customer would have to grant location permissions to the downloaded application, and would have to have location services enabled for the phone. A combination of options one and two (that is an IDU equipped with GPS, cellular, Bluetooth, and a battery) can alternatively be utilized for the purpose of redundancy and increased location accuracy. In this setup, there would be multiple mechanisms to transmit location information (redundancy) and additional logic could determine what source is likely to provide the most accurate location (increased location accuracy).

Finally, for portions of the lifecycle where a machine or human can be instructed (and trusted) to scan the IDU, a simple QR code sticker on the IDU device can be utilized. A standard QR code reader (for example a phone equipped with software capable of scanning a QR code) can be used to scan the QR code sticker on the IDU. The QR code sticker would encode a uniform resource locator (URL), that when accessed by the QR code reader would transmit data about the location of the QR code reader to the centralized monitoring system (the location of the QR code reader would be a proxy for the location of the IDU). Since the location information would be determined by and transmitted from the QR code reader, this device would have to be capable of determining its location and would have to be set up with the appropriate security settings to allow it to share this information when the URL (encoded by the QR code sticker) is visited.

Security of Food Delivery

Figure 13:
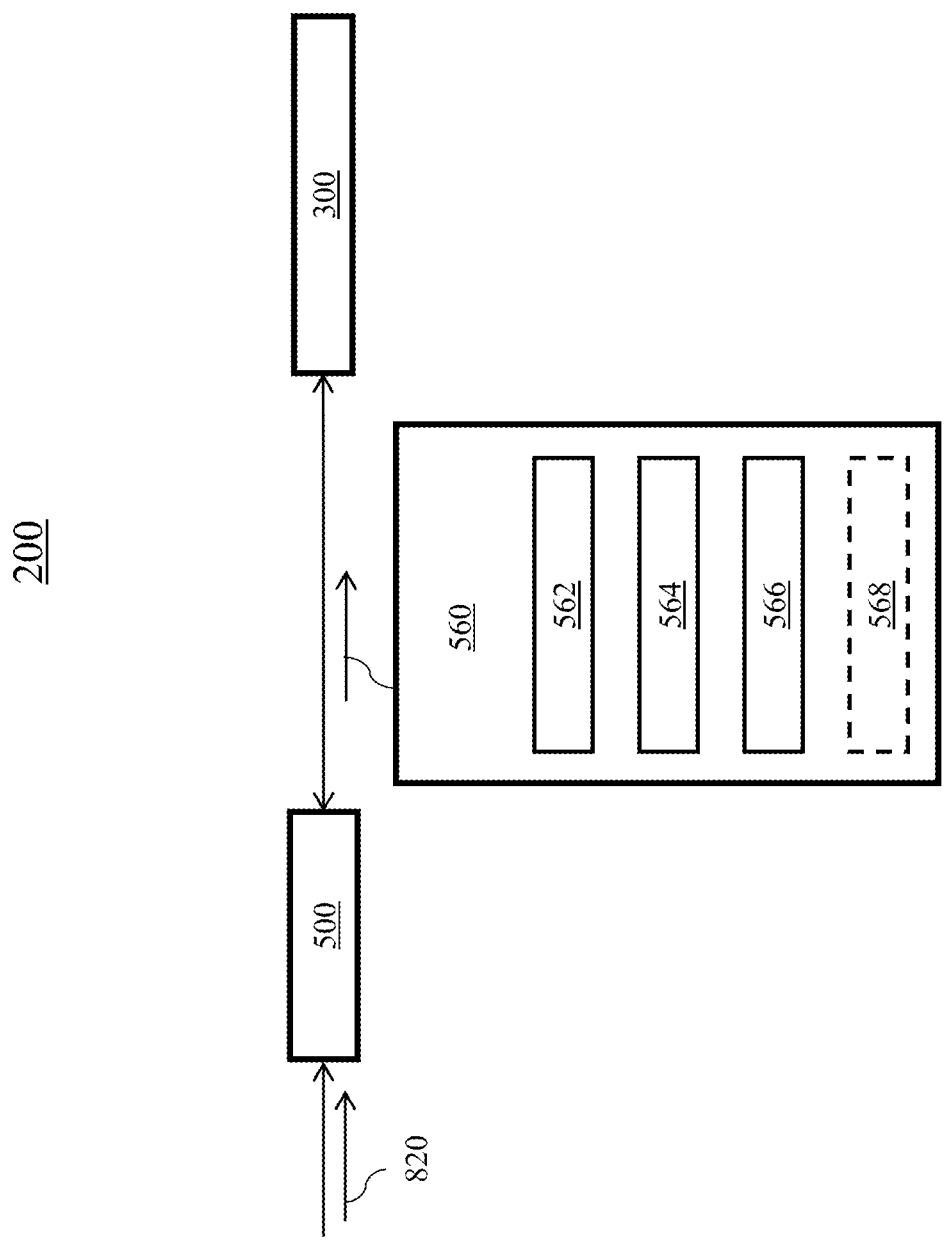
FIG. 13 is an exemplary diagram illustrating an alternative embodiment of the system of FIG. 9.

Turning to FIG. 13, an exemplary diagram illustrating an embodiment of the system 200 is shown. The controller 500 is shown as receiving an order 820. In one embodiment, the order 820 can be received from the customer device 800 (shown in FIG. 9) via wired and/or wireless communication. In another embodiment, the order 820 can be inputted into the controller 500 by an operator (for example, a waiter taking an order from a customer in person or by phone). An exemplary order 820 can include selection of food from a menu. The order 820 can be associated with one or more plates (or tray) of food to be prepared.

Method and System for Processing Food Order

The controller 500 can be programmed so as to be capable of determining instruction 560 based upon the order 820. Exemplary instruction 560 can optionally include cost (or price) 562 of the order 820. The instruction 560 can include material instruction (or food instruction) 564, and/or container instruction 566 that indicate specific containers needed for each plate. The container instruction 566 can specify the container 100 (not shown) to be used. Additionally and/or alternatively, the instruction 560 can include sub-unit instruction 568 specifying the type of sub-unit to be used to fulfill the order 820. Optionally, the instruction 560 can include workflow instruction (not shown) to specify the sequence of preparing and/or filling the container 100 and/or the sub-units.

The controller 500 can send the instruction 560 to the kitchen unit 300. For example, the controller 500 can send the instruction 560 to the prep station of the kitchen unit 300 to instruct the human operator and/or machine at the prep station on how to prepare the plate, load the ordered food, and/or pack up the ordered food. For example, when the order 820 is received at the controller 500 associated with a restaurant, the controller 500 can break down the order 820 into the process needed to fulfill the order 820. As an example, if the order 820 is for a plate with a fried item, a soup, a drink, a steak, and a side, the controller 500 can determine that the packaging needs to include a fried insulation container, a drink container, a hot food item with a side, and/or the like. In some cases, an anti-moisture desiccant can be needed for the fried food. The instruction 560, that includes the information as set forth above, can be sent to the operator preparing and/or packing up the ordered food at the kitchen unit 300.

Although FIG. 13 shows the controller 500 as collectively providing the cost 562, the material instruction 564, the container instruction 566, and/or the sub-unit instruction 568 to the kitchen unit 300 for illustrative purposes only, the controller 500 can determine and/or send any part of the instruction 560 at uniform and/or different times, without limitation. In some embodiments, the controller 500 can determine the cost 562 (or the material instruction 564, the container instruction 566, and/or the sub-unit instruction 568) before, during, and/or after determination of the order 820 by the customer device 800. For example, the customer device 800 can display cost for various choices of menu items, the cost 562 of the order 820 that is being previewed while not yet formally submitted, and/or the cost 562 upon formal submission of the order 820.

Figure 14:
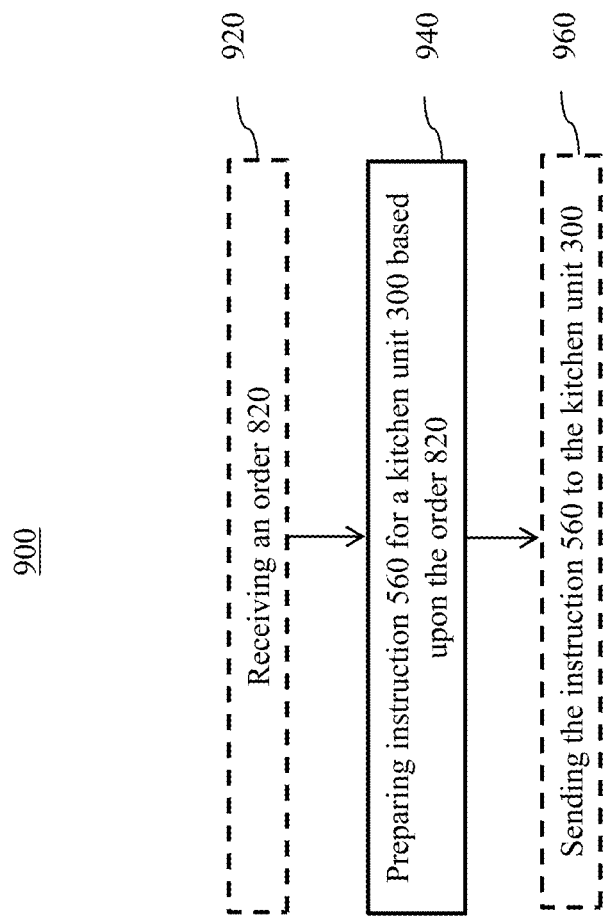
FIG. 14 is an exemplary method for providing food service based upon the system of FIG. 13.

Turning to FIG. 14, an exemplary method 900 for providing food service is shown. An exemplary method 900 can be implemented by the controller 500. The order 820 can be received at 920. The controller 500 can prepare, at 940, the instruction 560 for the kitchen unit 300 based upon the order 820. The controller 500 can send, at 960, the instruction 560 to the kitchen unit 300. In one embodiment, the kitchen unit 300 can include a computer (not shown) receiving the instruction 560 via wired and/or wireless communication. The computer can display the instruction 560 to the operator. Additionally and/or alternatively, the computer can instruct any suitable automated food preparation equipment to implement at least part of the instruction 560. Additionally and/or alternatively, the computer can be used by the operator to send feedback information, such as questions and/or status updates, to the controller 500. Additionally and/or alternatively, the kitchen unit 300 can include a display only (without necessarily including a computer), such that the display shows the instruction 560.

Figure 15:
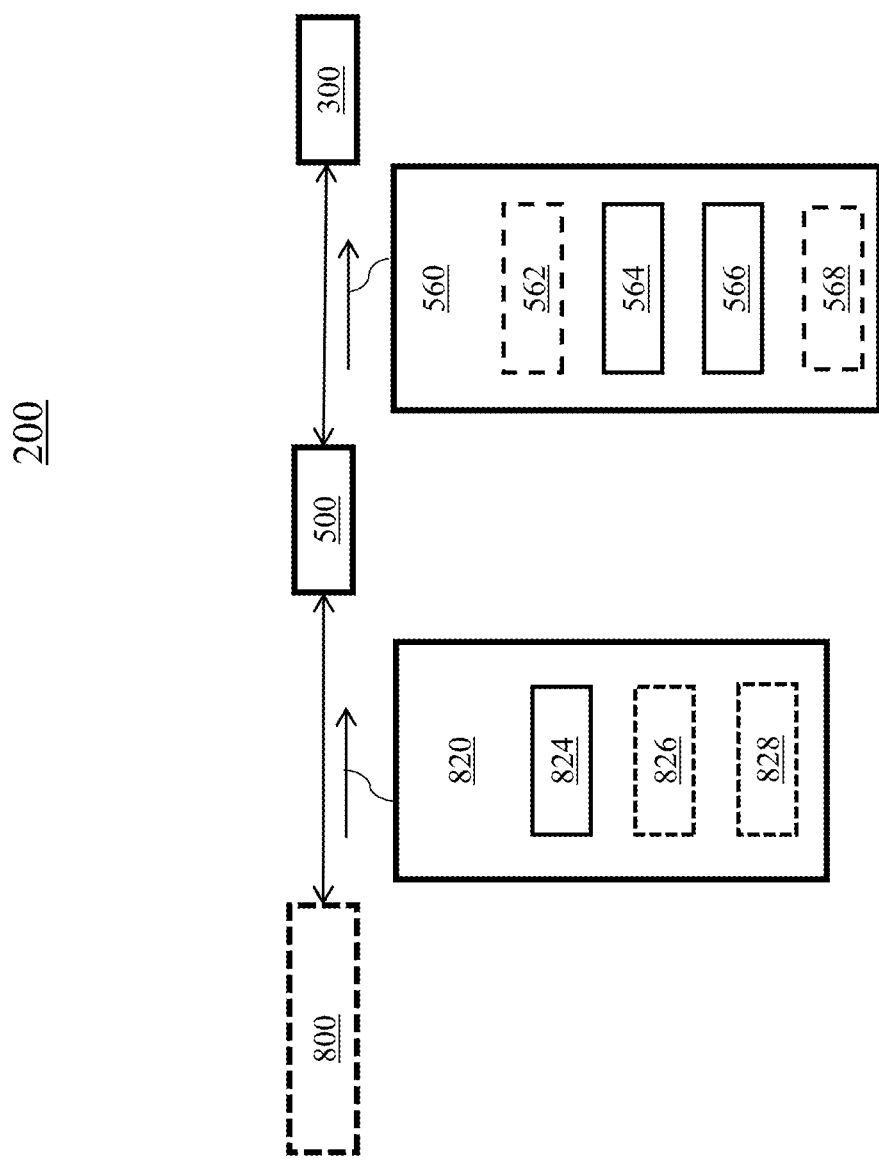
FIG. 15 is an exemplary diagram illustrating another alternative embodiment of the system of FIG. 9.

Turning to FIG. 15, an exemplary diagram illustrating an alternative embodiment of the system 200 is shown. The systems in FIGS. 13 and 15 can be similar except that, in the system 200 of FIG. 15, the customer device 800 can provide a user with at least some capabilities of choosing how the food can be packaged. The order 820 is shown as including a food selection 822, an optional container selection 824, and/or an optional sub-unit selection 826. The food selection 822 can include selection of the food from the menu. The container selection 824 and the sub-unit selection 826 can include choice of the type of container(s) 100 and sub-unit (s), respectively. In various embodiments, to achieve equivalent functionalities of holding food, there can be multiple choices of container(s) 100 and/or sub-unit(s), with a plurality of color, shape, texture, artistic features, or the like. In that case, the container selection 824 and the sub-unit selection 826 can customize the overall appearance of the food as delivered.

In one embodiment, when the user only wants to choose the food and have the controller 500 (or the food service provider) to determine how to implement the order, the user can send the order 820 including only the food selection 822 and skip the process of making other choices. The system 200 can thus operate in the same manner as FIG. 13.

However, in some embodiments, the user may prefer to participate in the process of choosing how the food is packaged. In some embodiments, the customer device 800 can provide a user interface via which the user can go through steps of making the order. In a non-limiting example, the user can first determine the food selection 822 at the first interface, determine the container selection 824 from a list of options as limited by the food selection 822, and then determine the sub-unit selection 826 from a list of options as limited by the food selection 822 and/or the container selection 824. The user interface can optionally be attractive and engaging to improve user ordering experience.

In various embodiments, the controller 500 can prepare the material instruction 564, the container instruction 566 and the sub-unit instruction 568 based upon the food selection 822, the container selection 824 and the sub-unit selection 826, respectively. In some embodiments, the controller 500 can analyze the food selection 822, the container selection 824, and/or the sub-unit selection 826, to make edits, supplement missing information, and make any necessary revisions, to convert the order 820 into the material instruction 564, the container instruction 566, and the sub-unit instruction 568 that the kitchen unit 300 can implement.

Security of Food Delivery

Conventional food containers fail to provide proper security (e.g., they are not tamper-proof). In various embodiments, the container 100 includes a tamper proof seal, such as a tape that must be broken to open the container 100. Additionally, the container 100 can be sealed with foil before the lid covers the container 100. When a delivery worker steals the food from the container 100, the container 100 does not necessarily prevent the delivery worker from stealing the food. However, the consumer can know whether the food has, after leaving the restaurant, been tampered with due to the seal.

Social Aspects of the System 200

In various embodiments, the system 200 can provide advantages in social aspects of eating at a bar and/or in a restaurant. In various embodiments, a lot of single individuals go to a bar to chat with the bartenders and other patrons. If someone does not want to do that, the app associated with food delivery process can allow the person, dining at home on the food from a particular restaurant, to tap a button on the app while ordering and/or while eating, and talk to the bartender to chat for example, about what is fresh in the kitchen today. The person can also chat with others at the restaurant and/or others who ordered from the same place, and dining around the same time, to compare the food and experience and have conversations as if they were in the restaurant.

Such features can advantageously give as close to a restaurant experience as possible, without the consumer dressing up, driving, or waiting, noise, reservation issues, and being away from kids, pets, work, or the home that the consumer may live in, or the view the consumer may have.

Embodiments for Achieving Desired Materials Properties of the Container 100

In various embodiments, nano-coatings, zirconia, and/or other tougher ceramics can be used for making at least part of the container 100. Conventional porcelain and stoneware are not necessarily as strong as needed for being used in the container 100. For example, the porcelain and stoneware can chip and is not always easy to coat as a thin layer.

In some embodiments, a coating can be applied on a substrate in the container 100 in novel ways such that the container 100 can be used for a significant number of times (for example, thousands of times), does not wear out, and looks appealing. For example, the substrate can be made with plastic and/or metal, and can be a part (for example, sub-unit, insulator and/or heat sink) of the container 100. Because container 100 may need to be used in travel, return, wash, use, and/or abuse, such coatings can be of great value.

The coating for the food side can be porcelain, ceramic of a selected type, and/or a selected type of stone, that does not scratch with multiple uses, specifically when a consumer cuts the entree with a knife. In some embodiments, the coating can include alumina, silica and/or glass. Additionally and/or alternatively, the coating can include zirconia because zirconia can be even stronger, tougher, and scratch-resistant compared with other materials. Additionally and/or alternatively, the coating can include yttria-stabilized Zirconia, and can thus have excellent surface finishing, superior wear resistance, and outstanding corrosion resistance. In one embodiment, a coating as set forth above, of 0.1 mm to 2 mm thick, can be formed on a substrate. The substrate can be, for example, stainless, copper and/or polymer that makes up the insulated part of a sub-unit. The coating can provide advantages including, but not limited to, great aesthetic, long life, and moderate cost.

Controller 500

Figure 16:
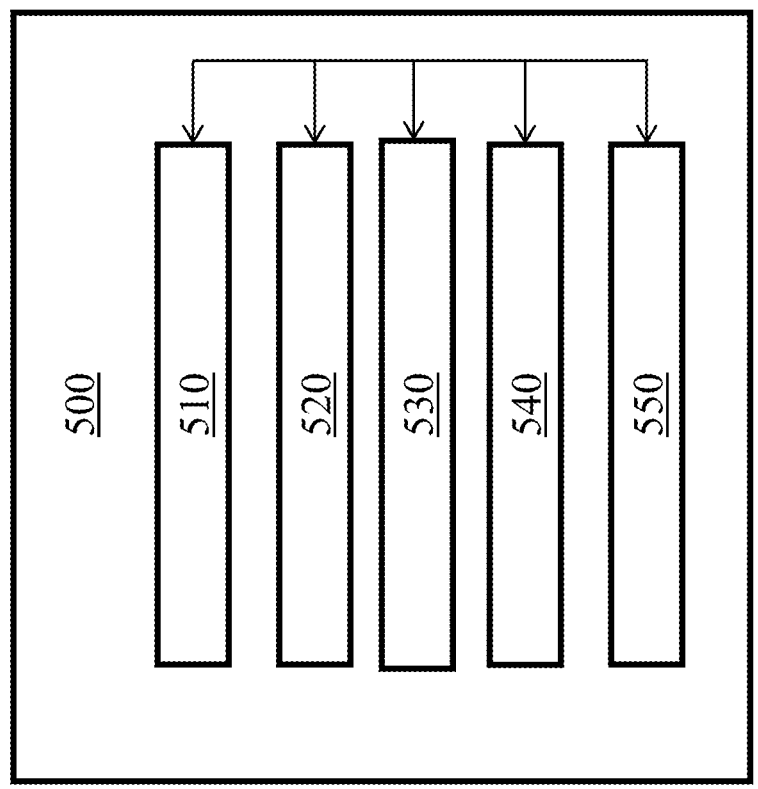
FIG. 16 is an exemplary diagram illustrating a controller of the system of FIG. 9.

Turning to FIG. 16, an exemplary controller 500 is shown. The controller 500 can include a processor 510. The processor 510 can include one or more general-purpose and/or special-purpose microprocessors (for example, single or multi-core processors), application-specific integrated circuits, application-specific instruction-set processors, graphics processing units, physics processing units, digital signal processing units, coprocessors, network processing units, encryption processing units, and the like. The controller 500 can be configured to function as a server for communicating with consumer devices 800 (shown in FIG. 9). Additionally and/or alternatively, the controller 500 can be configured to execute specialized program instruction to implement functions set forth above.

As shown in FIG. 16, the controller 500 can include one or more additional hardware components as desired. Exemplary additional hardware components include, but are not limited to, a memory 520 (alternatively referred to herein as a non-transitory computer readable medium). Exemplary memory 520 can include, for example, random access memory (RAM), static RAM, dynamic RAM, read-only memory (ROM), programmable ROM, erasable programmable ROM, electrically erasable programmable ROM, flash memory, secure digital (SD) card, and/or the like. Specialized instructions for implementing functions of the controller 500 can be stored on the memory 520 to be executed by the processor 510.

Additionally and/or alternatively, the controller 500 can include a communication module 530. The communication module 530 can include any conventional hardware and software that operates to exchange data and/or instruction among the controller 500, the customer device 800, the kitchen unit 300, the delivery unit 400, and/or the post-processing unit 600 using any wired and/or wireless communication methods. Exemplary communication methods include, for example, radio, Wireless Fidelity (Wi-Fi), cellular, satellite, broadcasting, or a combination thereof.

Additionally and/or alternatively, the controller 500 can include a display device 540. The display device 540 can include any device that operates to present programming instructions for operating the controller 500. For example, the display device 540 can display graphics illustrating status of filling the container 100 (shown in FIG. 9), video image of the container 100 during the process of loading food, post-processing the container 100 after food consumption. The display device 540 can display numerical sensor measurement values and/or heatmaps showing temperature of each area and/or component of the container 100 during pre-heat, pre-chilling, before loading food, and/or after loading food. Additionally and/or alternatively, the controller 500 can include one or more input/output devices 550 (for example, buttons, a keyboard, keypad, trackball), as desired.

The processor 510, the memory 520, the communication module 530, the display device 540, and/or the input/output device 550 can be configured to communicate, for example, using hardware connectors and buses and/or in a wireless manner.

Examples of PCMs

Figure 18:
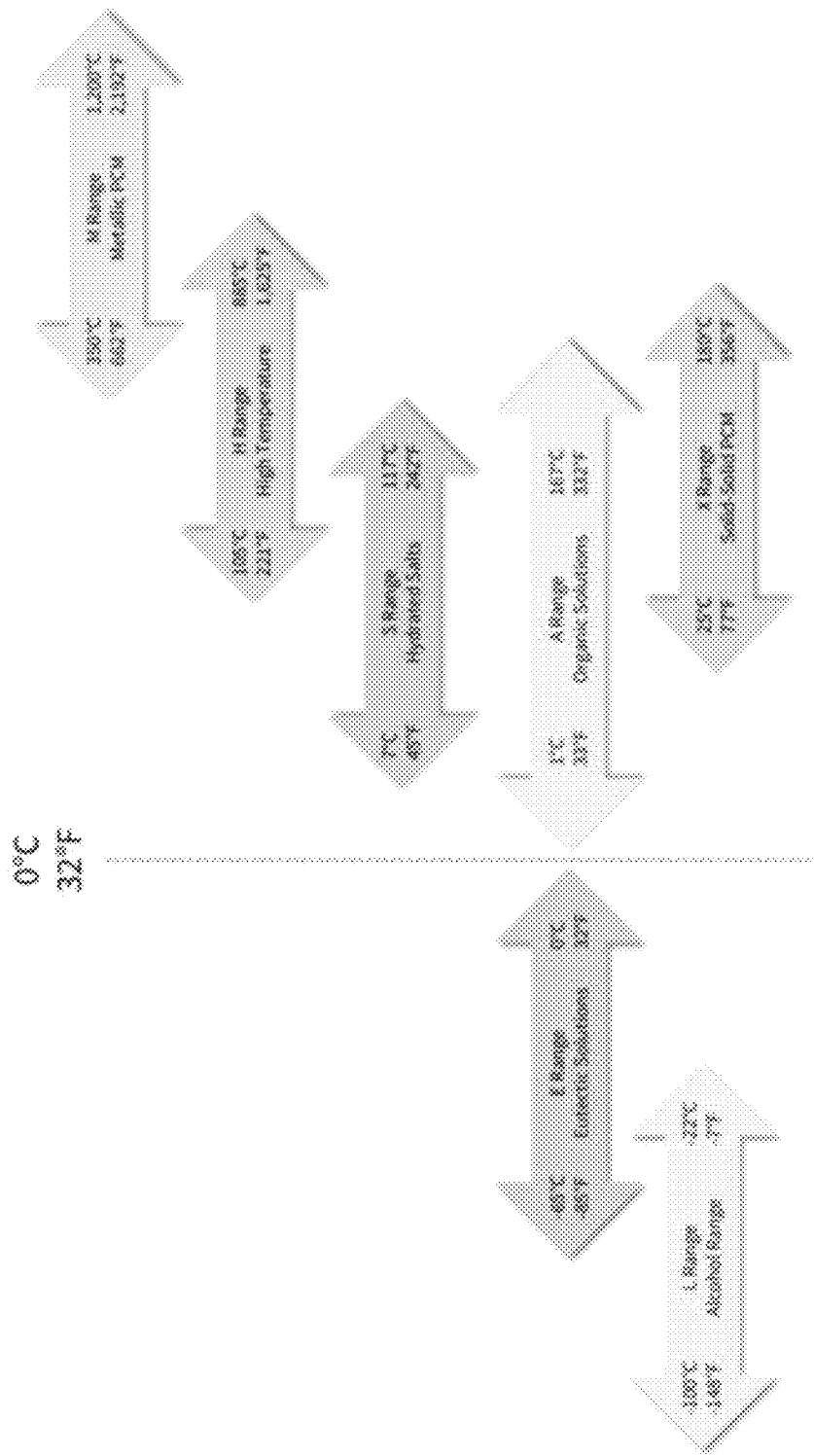
FIG. 18 shows a diagram illustrating exemplary ranges of operating temperatures of various phase change materials including those shown in FIG. 17.

The selection of a particular PCM depends on the application details of the food delivery. Factors that can affect the desired PCM include duration of heating required, type of food, desired temperature of food, and configuration of container 100. For example, the desired temperature range of the food to be delivered affects the desired melting point of the PCM, whether the type of PCM should be organic or inorganic, and the product class (e.g., pure PCM, encapsulated, or bound). A melting point below 0° C. can allow a delivery of fresh ice creme in the container 100. FIG. 17 shows a table comparing various organic PCMs available from Rubitherm Technologies GmbH in Berlin, which data is available at rubitherm.eu. FIG. 18 shows a diagram illustrating various ranges of operating temperatures of various PCMs, such as those shown in FIG. 17. Depending on the functions needed from the PCMs (for example, keeping food warm or cold), and the specific desired temperature range of the food, the range can be chosen from the diagram. Thus, the suitable PCM materials can be chosen based upon the chosen range.

Examples of Container 100

Figure 19:
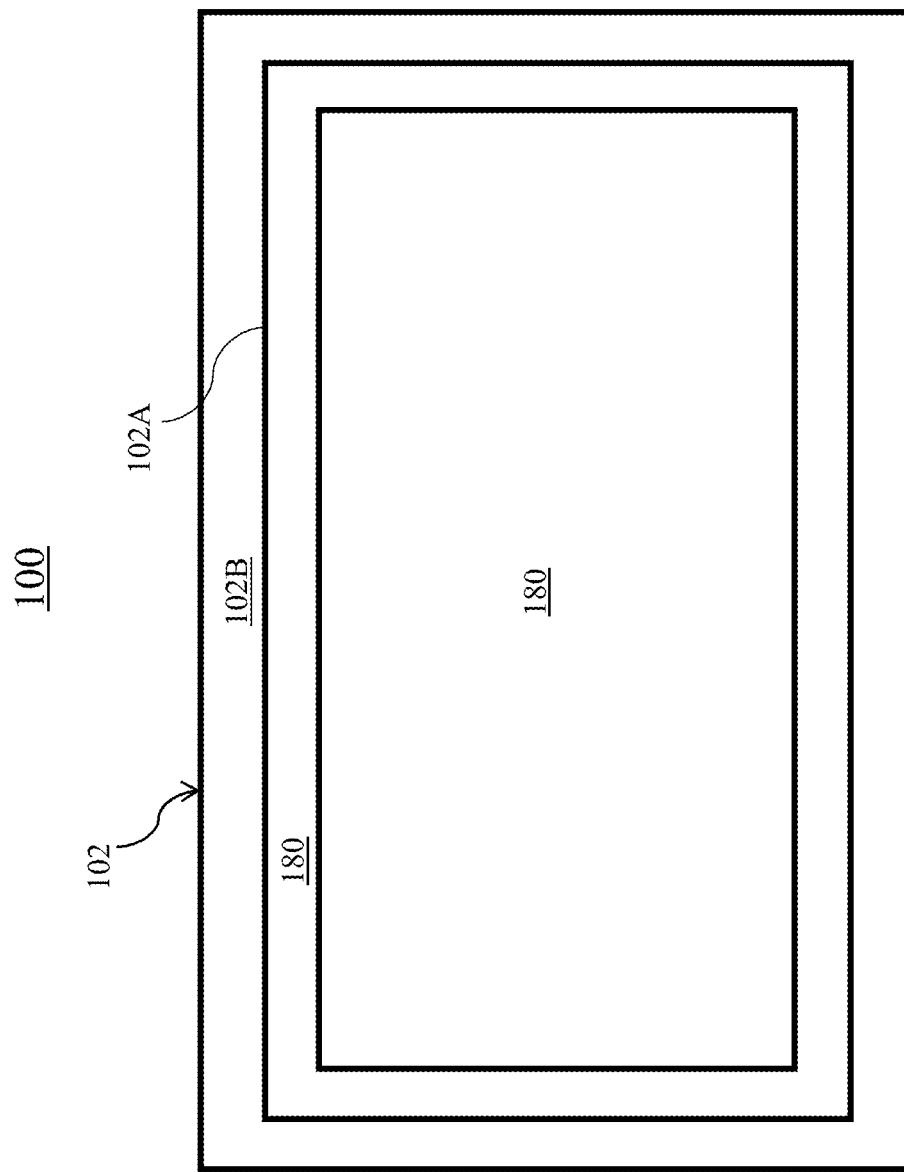
FIGS. 19 and 20 are exemplary diagrams illustrating a bottom view and a cross-sectional view, respectively, of a serving base of a container in accordance with various embodiments.
Figure 20:
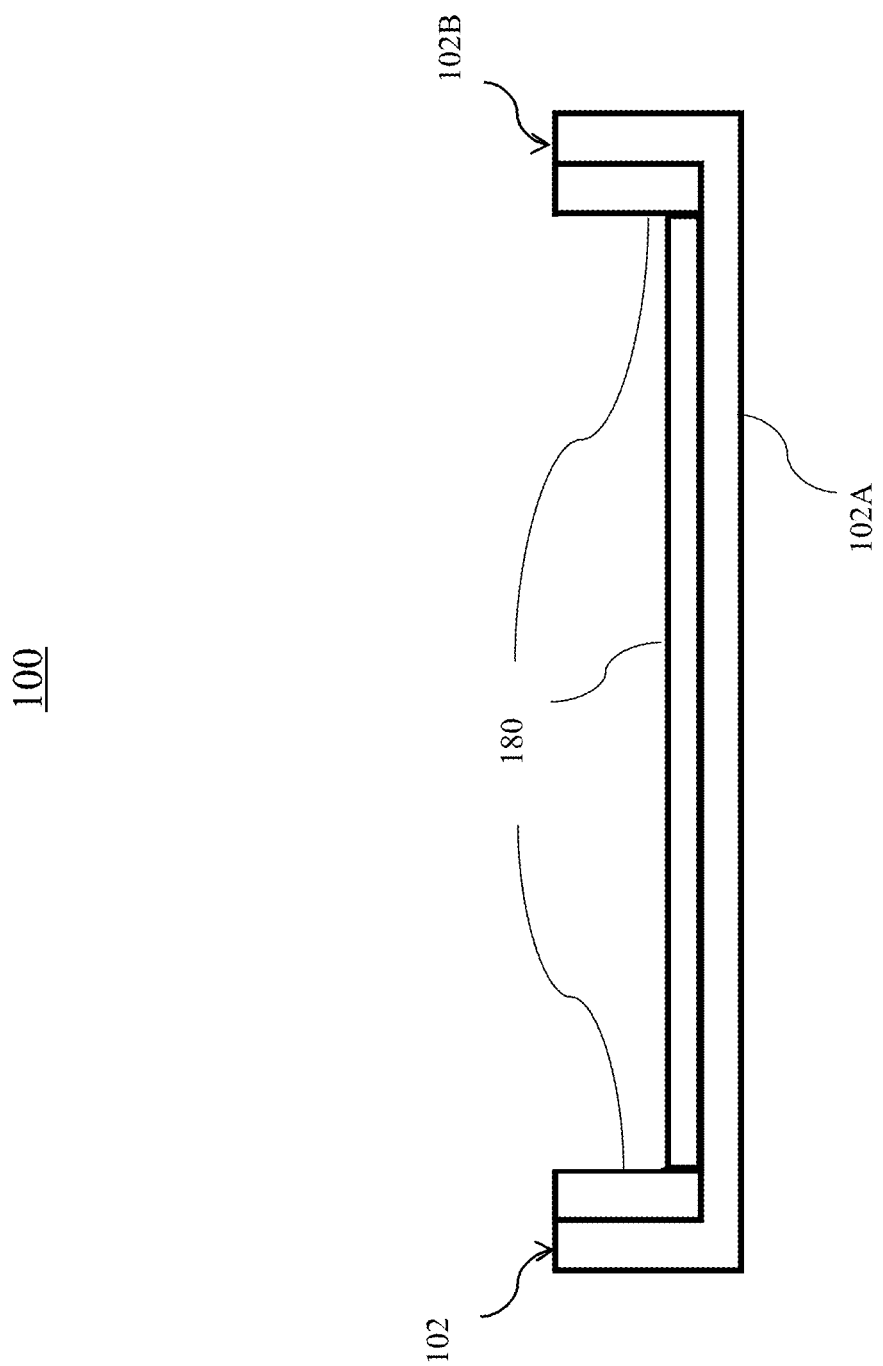

FIGS. 19 and 20 show bottom and cross-sectional views of the serving base 102 of the container 100, respectively. The serving base 102 can include a component of the container 100 that the food is disposed on. Stated somewhat differently, the serving base 102 can include the receptacle 140 (shown in FIG. 8, for example) and/or the container base 120 (shown in FIG. 8, for example). The thermal function piece 180 (for example, including the PCM can be used in a bowl and/or plate with a rim region (or rim, lip, circumference, edge and/or vertical section) 102B of the serving base 102. In some embodiments, a greater quantity of PCM can be put in the circumference of the bowl or plate than below the plate. The unique advantage is that the PCM in the rim can support a larger surface area of PCM to compensate for the heat loss from rim and joints as well as providing an easier medium to return/recycle. The smaller quantity of PCM in the serving base 102 can be used to compensate for heat loss from the bottom of food. Thus, the heat from the bottom PCM does not travel from below the hot food and through the food to the rim (such as in hot plate, skillet, or chaffing dishes). Thus, the thermal function piece 180 can avoid moisture loss, avoid further and undesirable overcooking of the food, and avoid changing the texture of the food. In this innovative and creative way to preserve the food, the thermal function piece 180 can provide the heat reservoir. In some embodiments, at least 40 percent of PCM can be in the rim, and the rest of the PCM can be in base side (or bottom side) 102A of the serving base 102. This can make the container 100 thinner at the serving base 102, thus making the serving base 102 look and feel more like a plate than a fat or high-at-the-bottom bowl. A fat-at-the-bottom bowl is not convenient to eat from as compared to standard thin serving plates.

Figure 21:
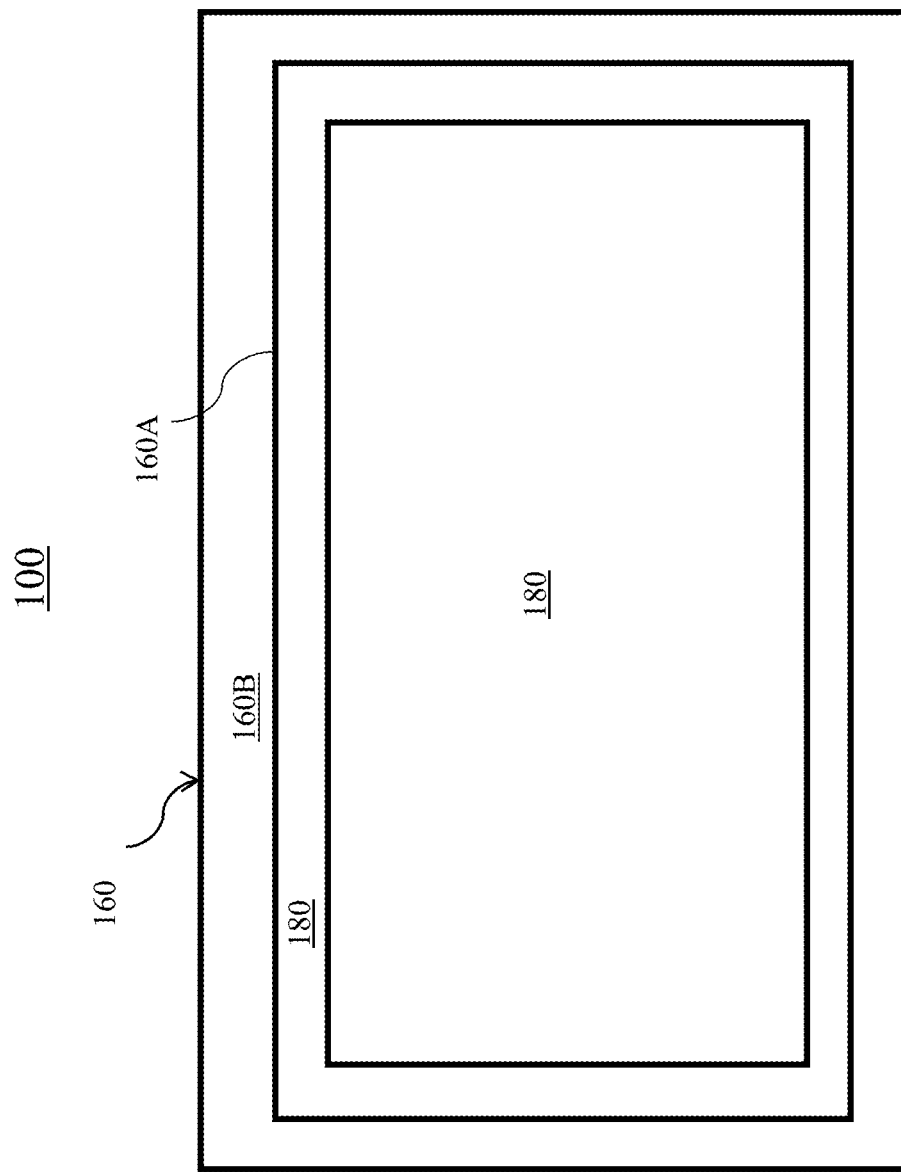
FIGS. 21 and 22 are exemplary diagrams illustrating a bottom and a cross-sectional view, respectively, of a cover of a container in accordance with various embodiments.
Figure 22:
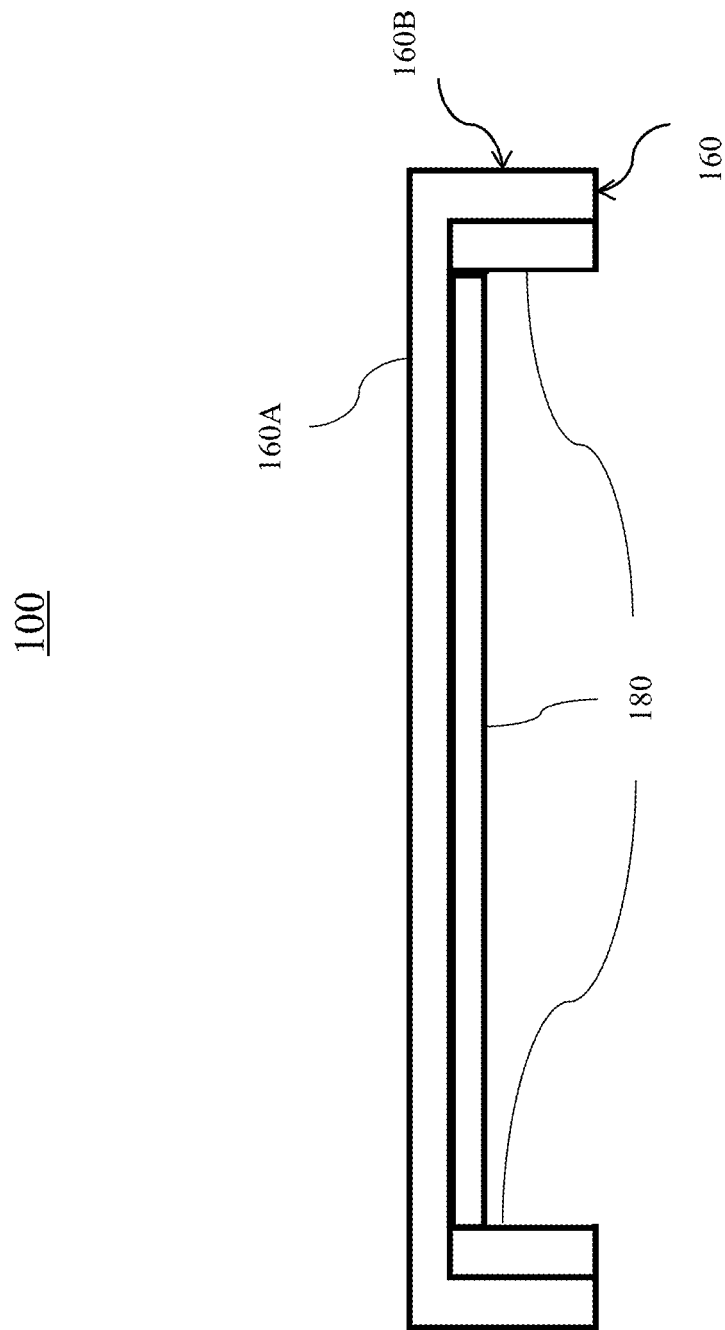

FIGS. 21 and 22 show bottom and cross-sectional views of the cover 160, respectively. The thermal function piece 180 (including the PCM, for example) can be placed in a rim region 160B of the cover 160, and/or within a base side (or top side) 160A of the cover 160 that faces the food. The cover 160 can have a rim sufficiently tall to accommodate the thermal function piece 180.

The PCM in the cover 160 and the serving base 102 can together provide sufficient heat reservoir to maintain the food at temperature and/or texture for an hour or more. With the PCM in the cover 160, the container 100 can function as a cocoon, and can further allow the serving base 102 to be more like a plate or a high-quality presentation plate.

Figure 23:
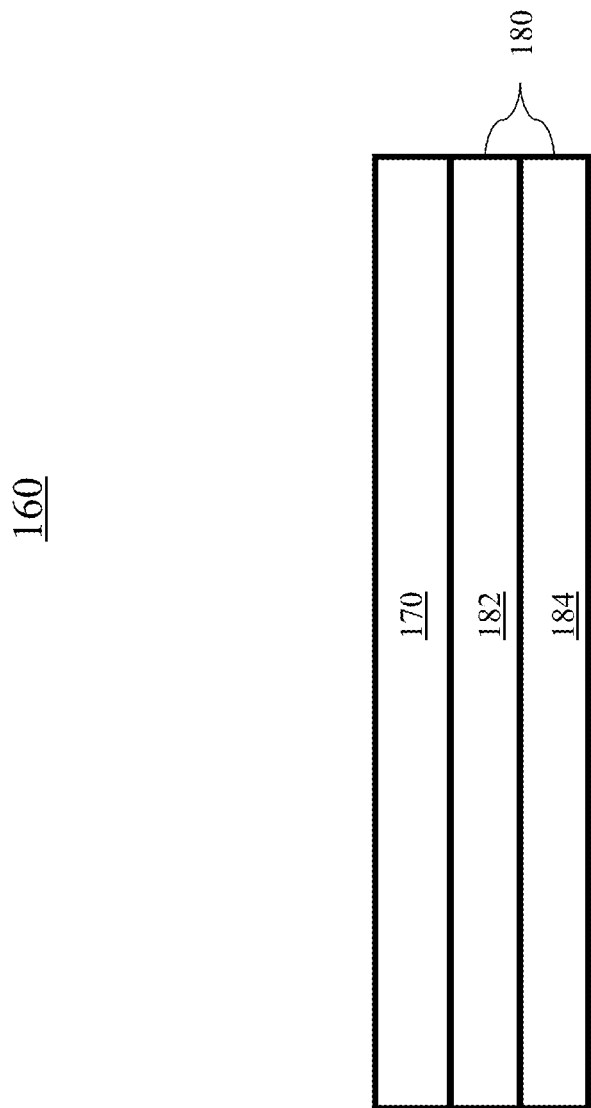
FIG. 23 is an exemplary diagram illustrating a cross-sectional view of the cover of FIGS. 21 and 22 in accordance with various embodiments.

FIG. 23 shows a cross-sectional view of the cover 160. The cover 160 can be a lid to be placed on the serving base 102 (shown in FIG. 20, including a ceramic plate, for example), such that the cover 160 can work like a heat lamp to keep the food hot in the commercial kitchen but can fit snug on the serving base 102. The cover 160 can include PCM, heat reservoir, a vent and/or vacuum insulation. In various embodiments, location of the vent can be based upon specific application of the container 100. For example, when the container 100 is for solid food only, the vent may be in the serving base 102 (shown in FIG. 19) or bottom plate. When the container 100 is for other types, or all kinds, of food, the vent may be in the rim. The cover 160 can be a three-layered lid that includes an induction layer 184. The induction layer 184 can be an inner layer (proximal to the food) made of metal that can engage with induction, and can be put on the similar-shaped the serving base 102 that is counterpart to the cover 160. The middle layer can be a thermal mass layer 182. The thermal mass layer 182 can include the PCM. In some embodiments, the thermal mass layer 182 and the induction layer 184 can collectively form the thermal function piece 180. In other embodiments, the thermal mass layer 182 can include the thermal (or heat) sink 105. It should also be noted that although described as a "layer", each of the thermal mass layer 182 and the induction layer 184 can include modular pieces that do not form a multi-layer structure.

Figure 24:
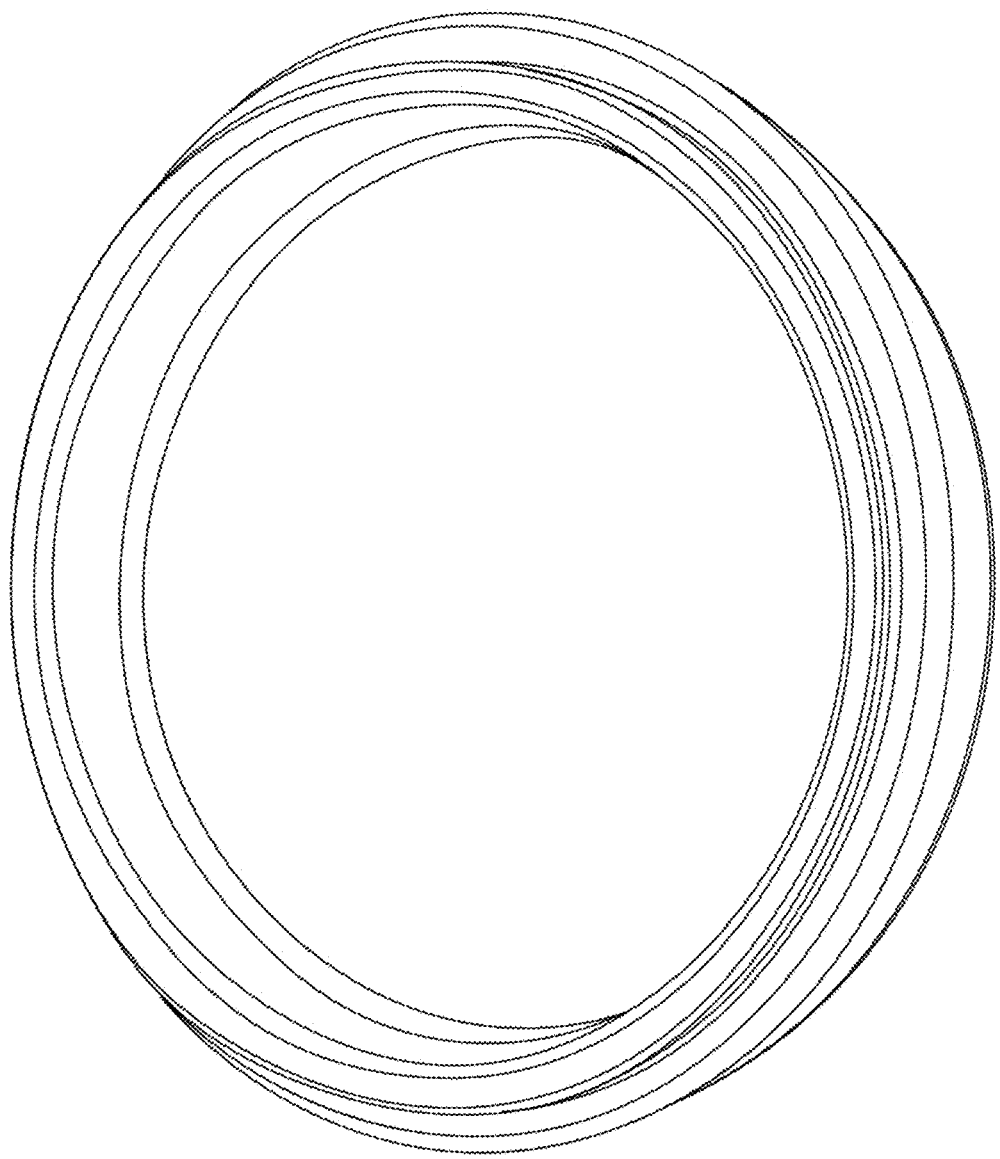
FIG. 24 is an exemplary detail drawing illustrating the cover of FIGS. 21 and 22.

In the cover 160 that is like a cloche, the rim can hold a greater amount of the heat sink and/or PCM. The outer layer can include the insulation structure 170. The insulation structure 170 can be vacuum-insulated and double-walled, and/or can include an insulating solid material. The induction can heat the PCM and/or the inner layer. Because the double walled vacuum insulated material can be away from the induction coil (for example, by more than ¼ inch), the two parallel plates of the double wall, even if made of metal, can avoid being heated up. The cover 160, when placed on the serving base 102 or a plate, can provide heat to the food to compensate for at least some of the heat loss and insulate the food from heat loss with double-walled vacuum. Preparing the cover 160 can include charging with induction and such preparation can take less than two minutes. FIG. 24 shows a detailed image of an exemplary cover 160.

Figure 25:
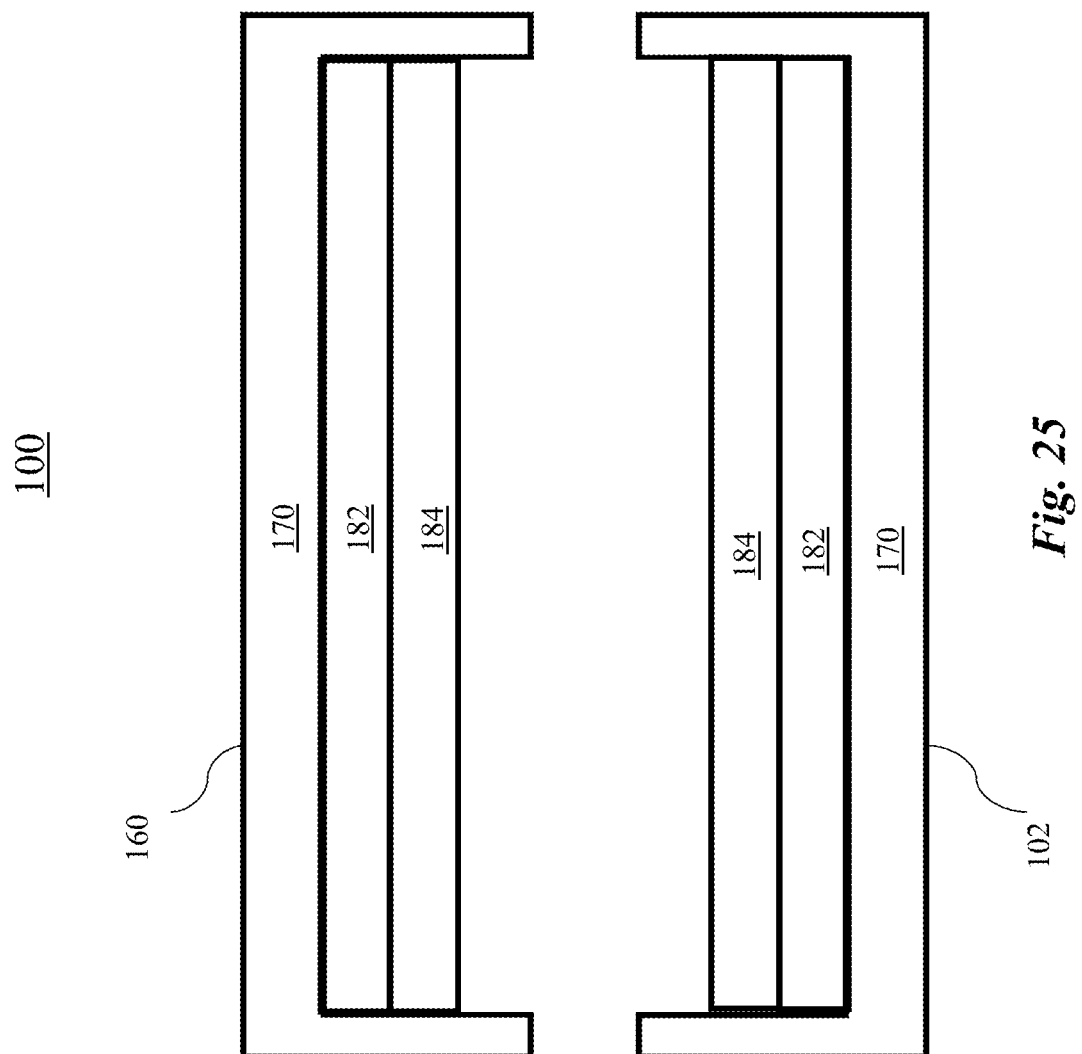
FIG. 25 is an exemplary diagram illustrating a cross-sectional view of an embodiment of a container in accordance with various embodiments.
Figure 26:
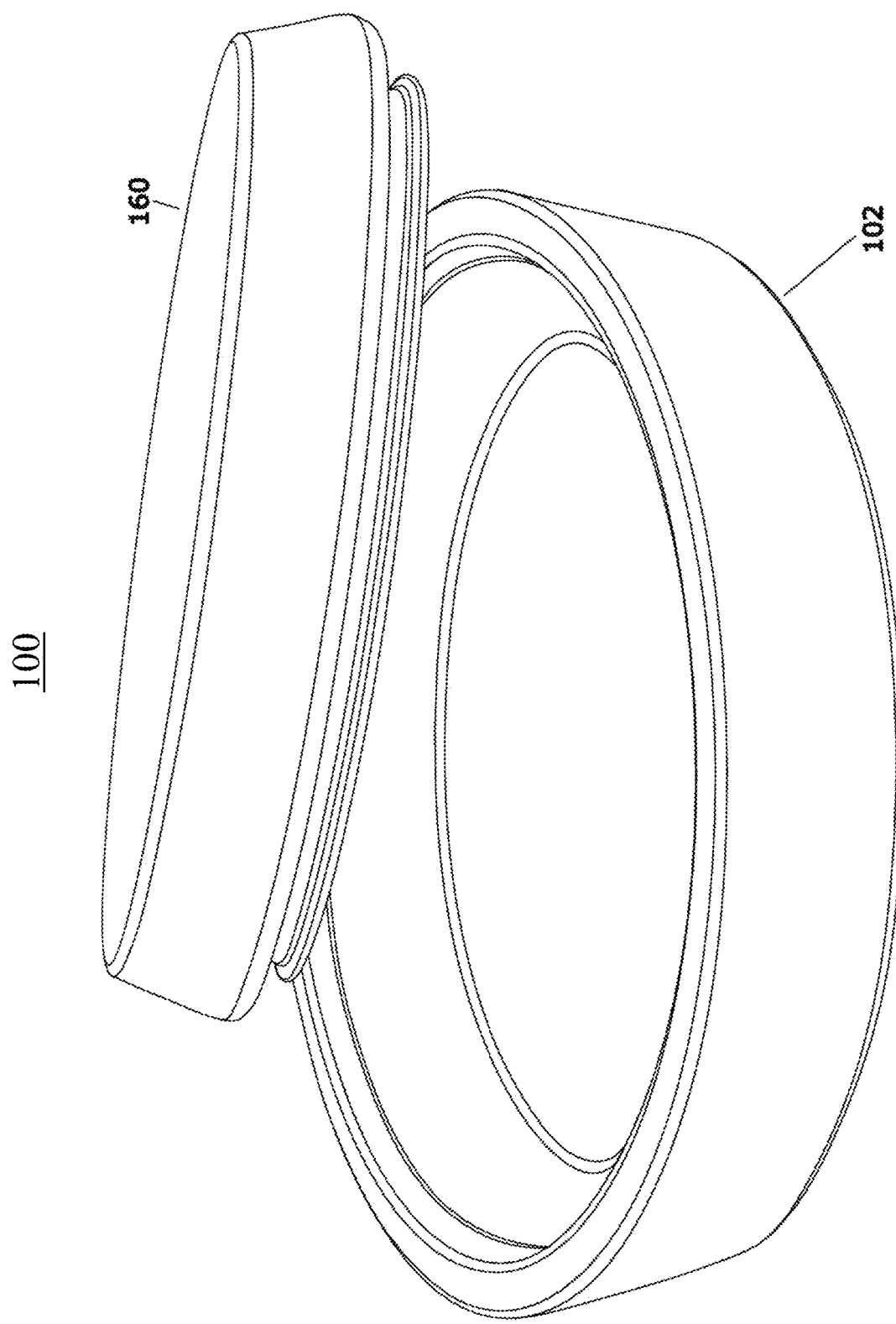
FIGS. 26 and 27 are exemplary detail drawings illustrating the container of FIG. 25, wherein the container is opened and closed, respectively.
Figure 27:
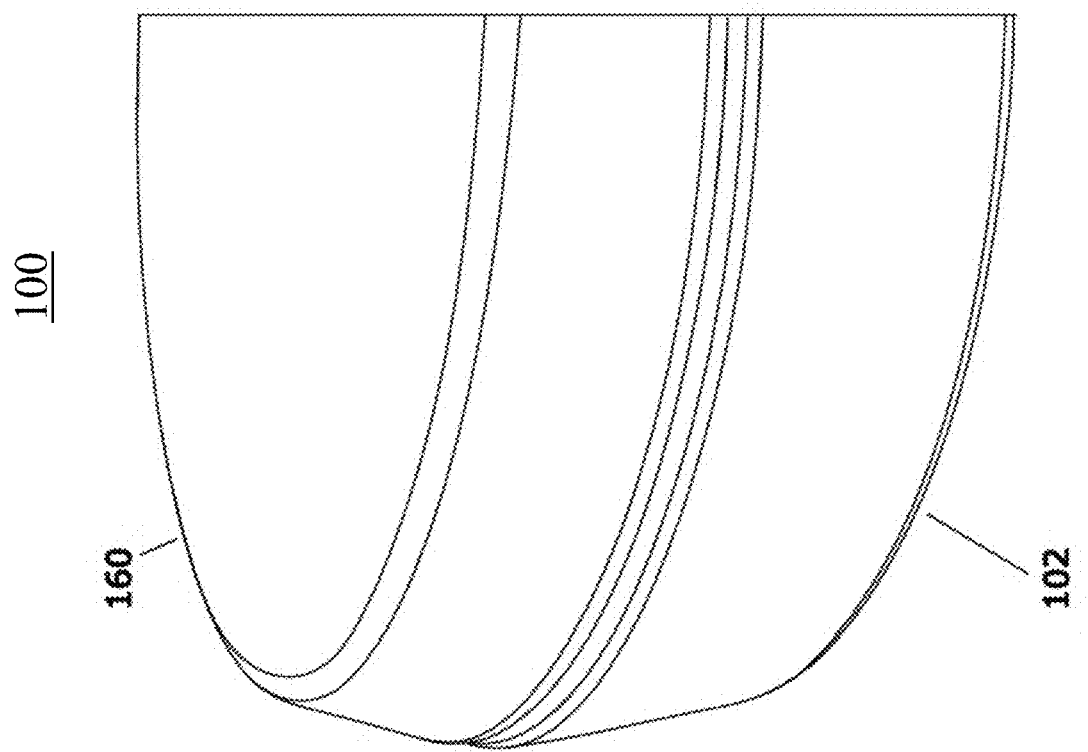

FIG. 25 shows a cross-sectional view of an exemplary container 100. The container 100 is shown as including the cover 160 and the serving base 102 for collectively enclose the food (not shown). The serving base 102 can have a layered structure similar to a layered structure of the cover 160. In various embodiments, the container 100 can be a vacuum insulated container made of metal and/or other materials. The inner surface or inner layer (the layer or surface proximal to food) can be made of steel. The middle layer (the layer between the inner and outer layers) and outer layer (the layer distal to the food) can be made of materials that do not get hot with induction heating, exemplary materials including titanium, copper, and/or aluminum. FIGS. 26 and 27 show detailed images of an exemplary cover 160.

Many types of materials can get hot and melt at very high frequency induction systems. Thus, the container 100 can be heated with moderate level of induction frequency to prevent aluminum and/or copper from getting too hot, and ensure that the steel can get hot. The container 100 can be charged with induction heating such that the inner surface(s) of the container 100 (functioning like a cocoon) can become hot, while the outer materials do not heat up. An exemplary container 100 can have PCM and vacuum, such that the PCM can face the inner layer. The inner layer can engage with induction magnetically and eddy current-wise to become hot and hold the heat. The vacuum double wall can be outside the PCM so as to avoid heat loss.

In some embodiments, the materials for the outer layer can also be stainless steel but may have a coating of copper, aluminum, and/or other metals, that can stop the outer steel material from coupling with induction.

Figure 28:
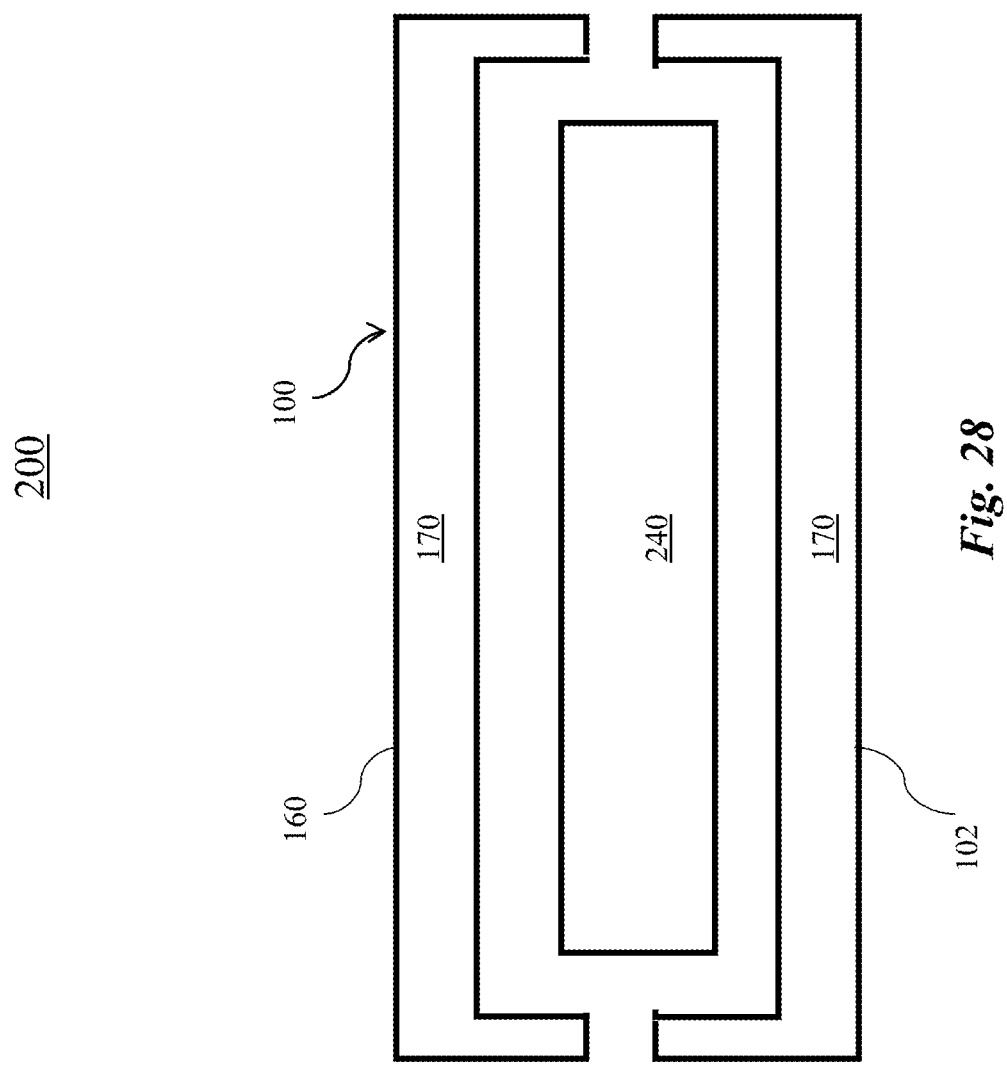
FIG. 28 is an exemplary diagram illustrating a cross-sectional view of an embodiment of a container being prepared in a system of FIG. 9.

FIG. 28 shows a cross-sectional view illustrating the container 100 being prepared in the system 200. The container 100 is shown as being charged (or heated) by an induction device 240 via induction heating. The induction device 240 can include an induction coil. During the induction charging, the induction coil can be sandwiched between top and bottom parts that need to be heated. Stated somewhat differently, the induction device 240 can be located between the cover 160 and the serving base 102.

Figure 29:
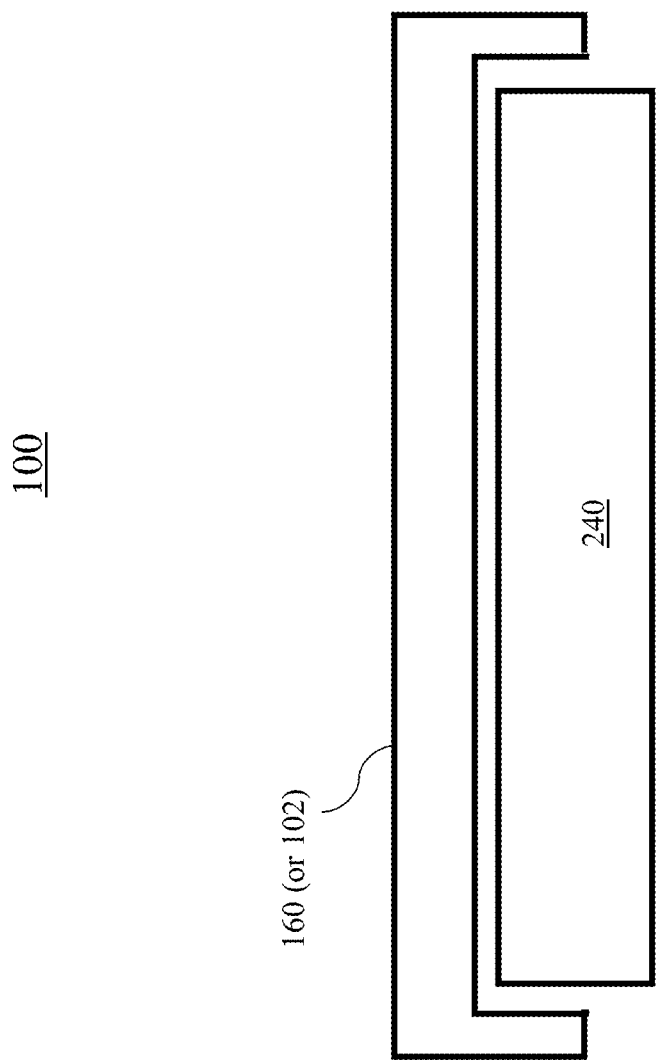
FIG. 29 is an exemplary diagram illustrating a cross-sectional view of the overall cover, or the serving base, of an embodiment of a container being prepared in the system of FIG. 9.

FIG. 29 shows a cross-sectional view illustrating the cover 160, or the serving base 102, being prepared in the system 200. In some cases, the induction charging of the serving base 102 is not always possible, or not effective, by placing the serving base 102 in a normal orientation (or oriented in a manner for holding food), and above (or on) the induction device 240, because the induction device 240 can first engage with the outermost material (or the outer layer, which is distal to food) of the serving base 102. The outermost material is most likely to be a metal (or the insulation structure 170), so the induction device 240 can heat the metal first. Such heating is not desired. An innovative way to heat the inside of the container 100, the serving base 102 and/or inside of the cover 160, can include having the induction device 240 that comes down inside the belly (or inside) of the container 100, of the serving base 102 and/or inside of the cover 160.

Figure 30:
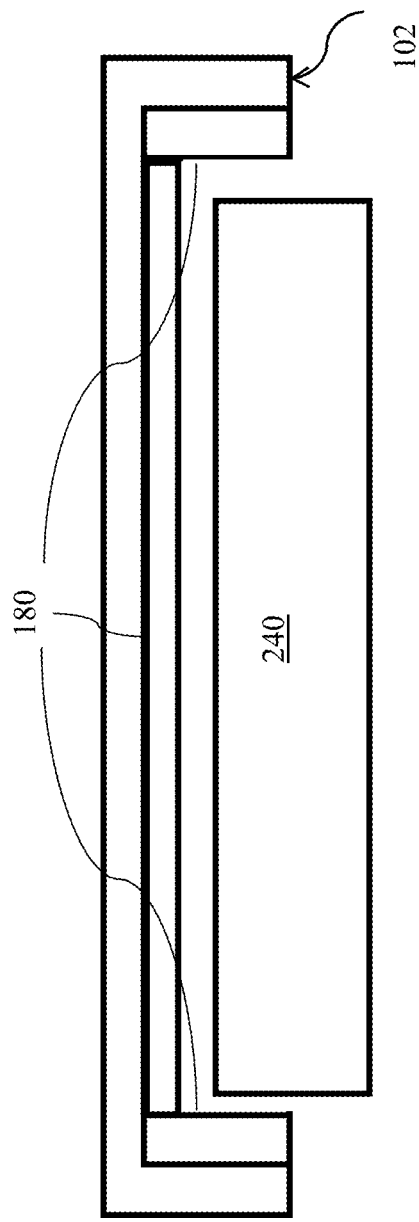
FIG. 30 is an exemplary diagram illustrating a cross-sectional view of the cover, or the serving base, of an embodiment of a container being prepared in the system of FIG. 9, wherein the cover, or the serving base, includes one or more thermal function piece in a rim thereof.

In one embodiment, the serving base 102 can be flipped (to be upside down relative to the normal orientation) and be placed on the induction device 240, as shown in FIG. 29. For some induction devices 240 (for example, large planar coil that does not fit in the serving base 102), if the serving base 102 is flipped and placed, the metal inner layer can be too far from the induction devices 240 (or the coil). As shown in FIG. 29, the induction devices 240 can be properly shaped and/or scaled to conform better with the shape of inside of the serving base 102. In some embodiments, the induction devices 240 can include a dome shaped burner with coil therein. The coil can thus be close to the inner layer so the coil can engage and heat the inner layer properly. FIG. 30 shows the serving base 102 (or the cover 160, like a cloche in a non-limiting example) that includes the thermal function pieces 180 (or PCM) in the rim. The induction devices 240 can include coil configured such that the coil heats the annulus and the rim as effectively as the rest of the serving base 102.

Although FIGS. 29 and 30 show the serving base 102 as being placed above the induction device 240 for illustrative purposes only, the cover 160 can be heated in various ways similar to the manner that the serving base 102 can be heated. For example, the cover 160 can be heated when placed below the induction device 240. The serving base 102 and the cover 160 can be heated simultaneously and/or at different times by uniform and/or different induction devices 240 (shown in FIG. 28).

In various embodiments, the induction device 240 can include a tongue and/or disc type induction coil device inserted between the serving base 102 and the cover 160 so that the inner surfaces can be quickly heated to the desired temperature, without heating the outer layers that functions as the vacuum insulated cocoon. In other words, both the top and bottom of the container 100 can be heated simultaneously. The PCM or ATM of the serving base 102 and the cover 160 can function like a skillet bottom and skillet top, at a desired temperature, with vacuum insulation to preserve the heat dissipation to the outside.

In various embodiments, the cover 160 can include ferromagnetic materials in the PCM. For example, as used through this description, the ferromagnetic materials can include ferritic powder, metal with eddy currents, and/or micro balls. In other words, although various embodiments rely on ferromagnetic materials for induction heating, any suitable materials that have eddy current capability can be used, regardless of whether the material is metallic and/or ferromagnetic. Exemplary powder and/or balls can have a diameter of less than 2 millimeters. These particles can be uniformly distributed. Accordingly, uniform and quick heating of PCM can be possible without PCM boiling over or creating localized heat and pressure.

In various embodiments, the cover 160 can include double-wall glass. Optionally, the cover 160 can define a vent so that the moisture or condensation can be visible and to allow the vent to be open for the first few minutes and then closed so that there is no more condensation. The heat loss can be eliminated by closing the vent. The cover 160 with the glass top can be see-through (or transparent, or semi-transparent). Advantageously, during delivery, the delivery person can see the food and can handle the container 100 more carefully than the delivery person would do with a closed bag or dark container. With the see-thought top, in a case of multiple orders, the see-through top can allow various consumers to see which container 100 has their food order.

In various embodiments, the cover 160 can include the double wall glass with vacuum. The inner layer of the glass can include ferromagnetic materials therein. Exemplary ferromagnetic materials can include ferritic steel in the form of balls, rings, wire and/or other form(s), to allow the inner layer of the cover 160 to be heated. Stated somewhat differently, even though the insulation structure 170 and the thermal function piece 180 are shown as separate elements in some embodiments for illustrative purposes only, the insulation structure 170 and the thermal function piece 180 can be at least partially integrated in some cases, without limitation.

Moisture Control for Food in Container 100

In various embodiments, moisture management can be important in the container 100. The container 100 can use desiccant and/or other moisture-soaking pouches to soak in the vapors from food. The desiccant or pouches can appear unattractive in the container 100, similar to a wet rag or diaper after soaking in the moisture. In one embodiment, the moisture can be moved from one area of the container 100 to another area. Because the container 100 can have cold and/or room temperature food, a canal or duct can naturally create a way for the moisture to move toward to colder area and remain there as condensation. In various embodiments, the container 100 can generate a small amount of vapor. For example, for an exemplary container 100 with food, 3-10 grams of such vapor can become liquid. Accordingly, the liquid can be managed without adding the desiccant or pouch.

Figure 31:
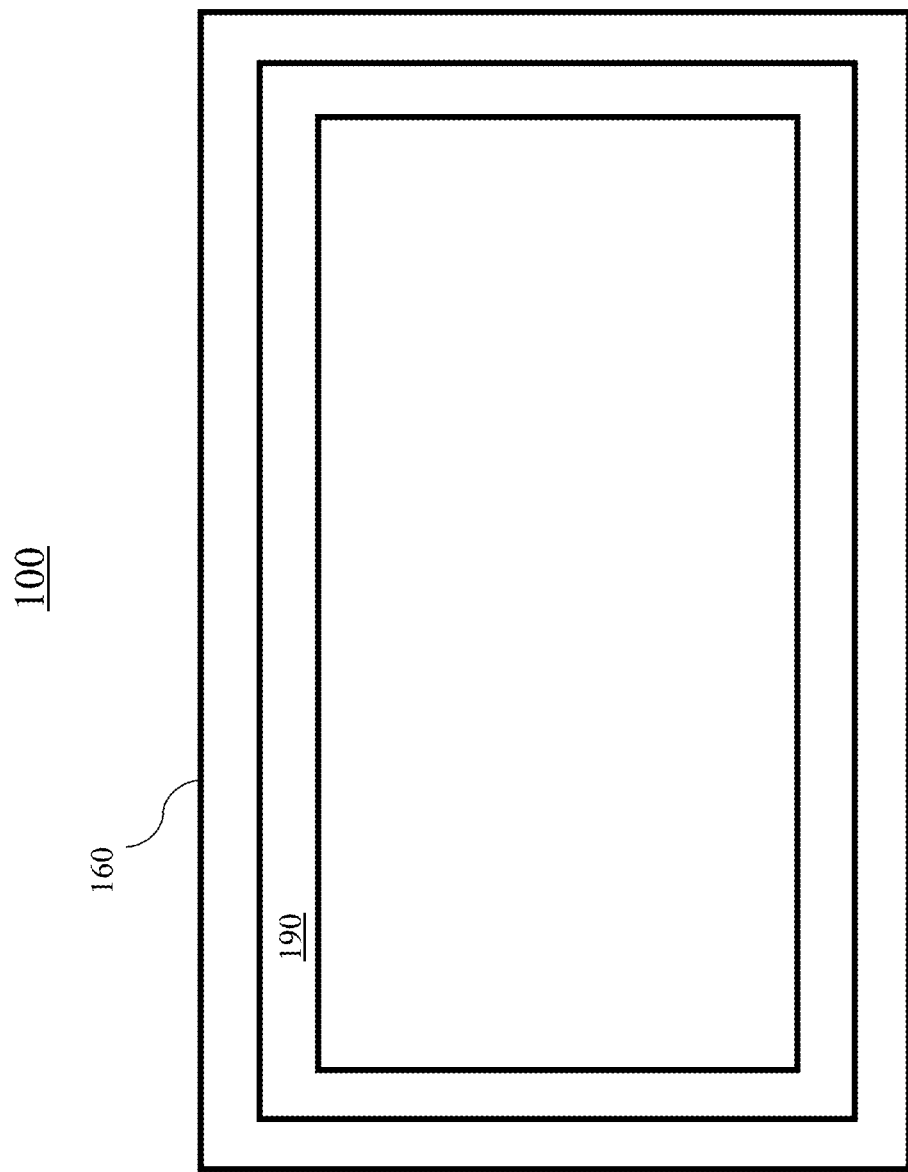
FIGS. 31 and 32 are exemplary diagrams respectively illustrating bottom and cross-sectional views of an exemplary cover of an embodiment of a container, wherein the cover includes a moisture controlling unit therein.
Figure 32:
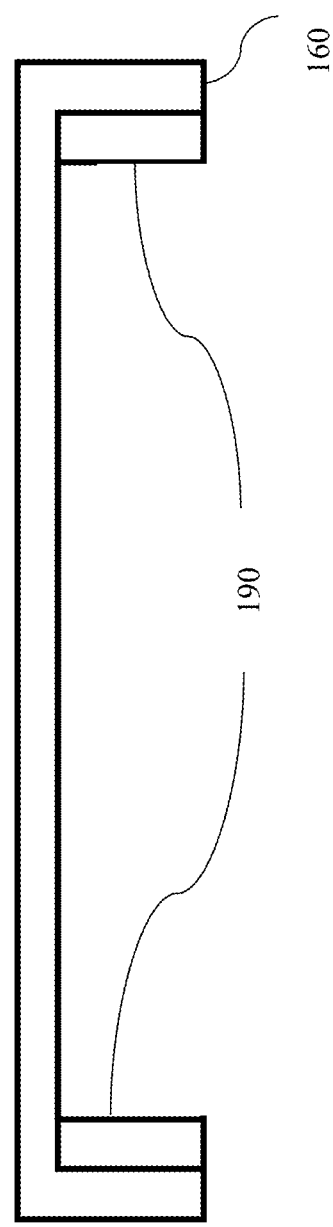
Figure 33:
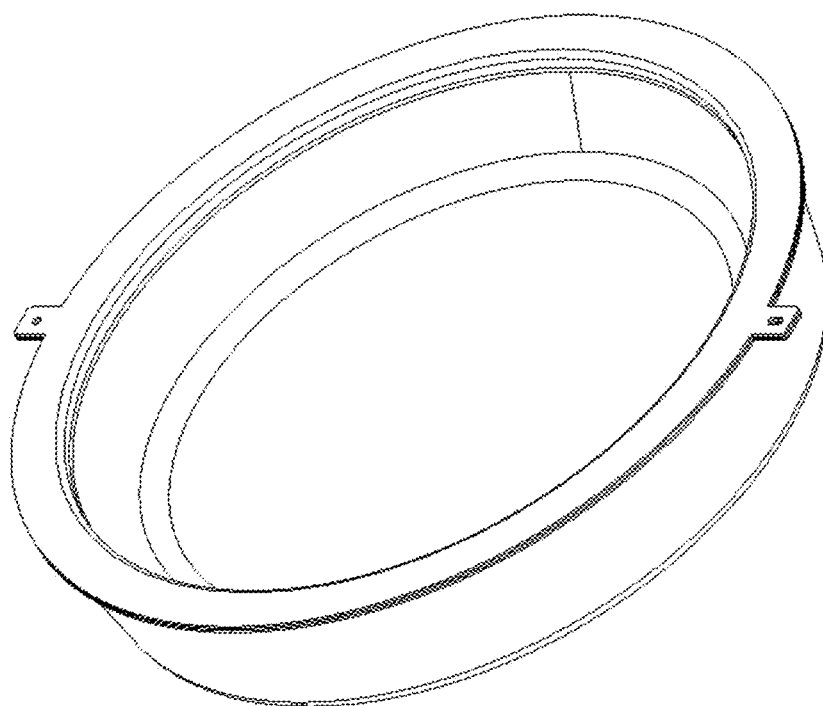
FIGS. 33-38 are exemplary detail drawings of the container of FIGS. 31 and 32.
Figure 34:
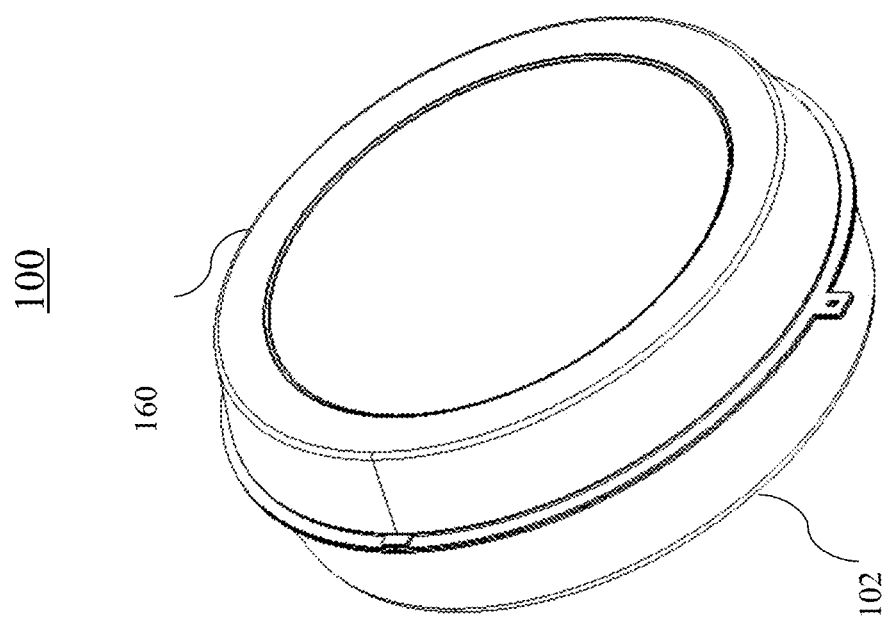
Figure 35:
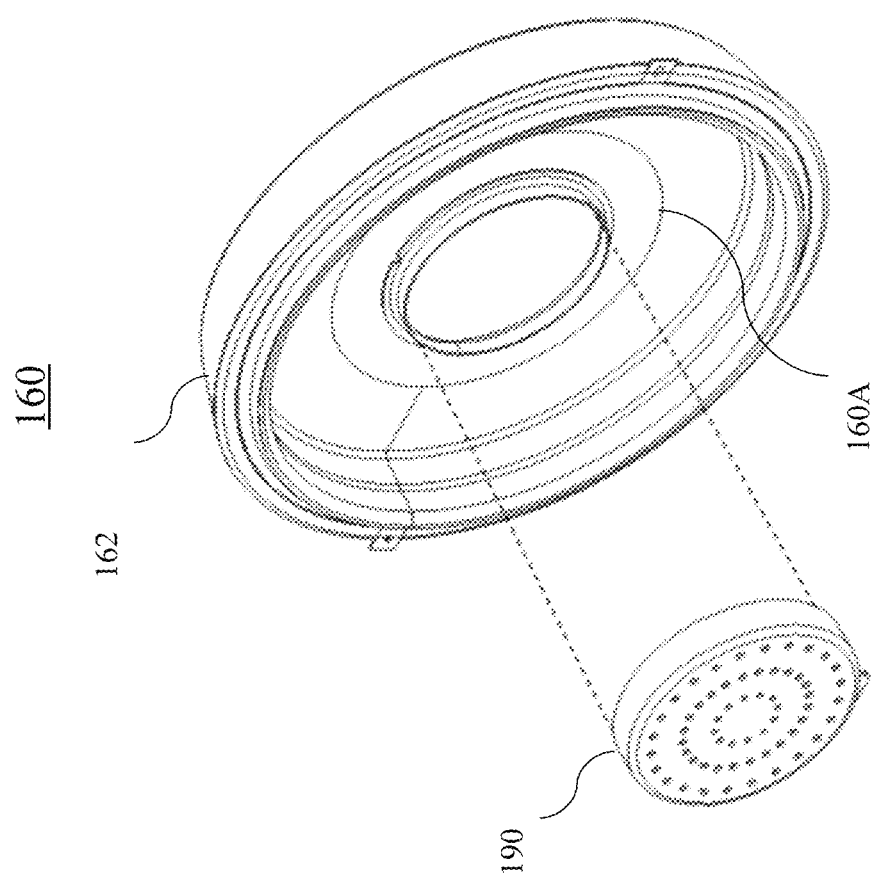
Figure 36:
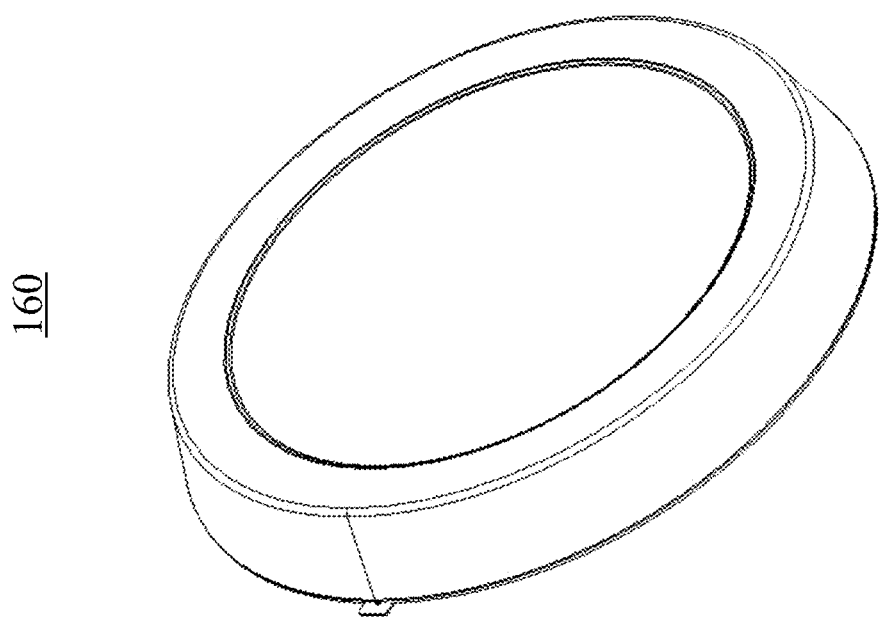
Figure 37:
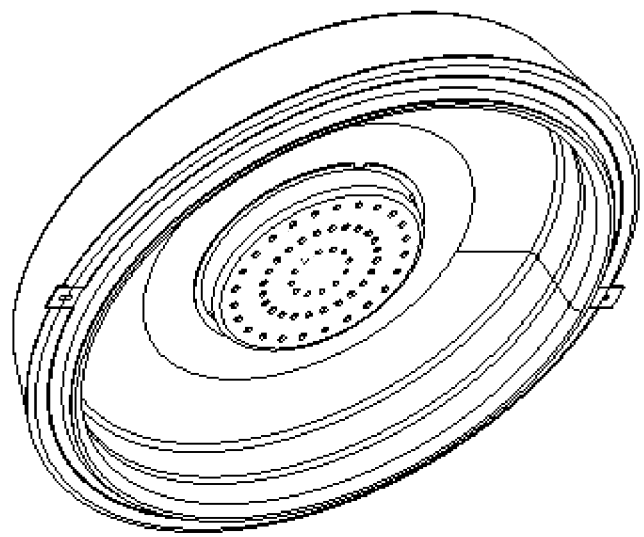
Figure 38:
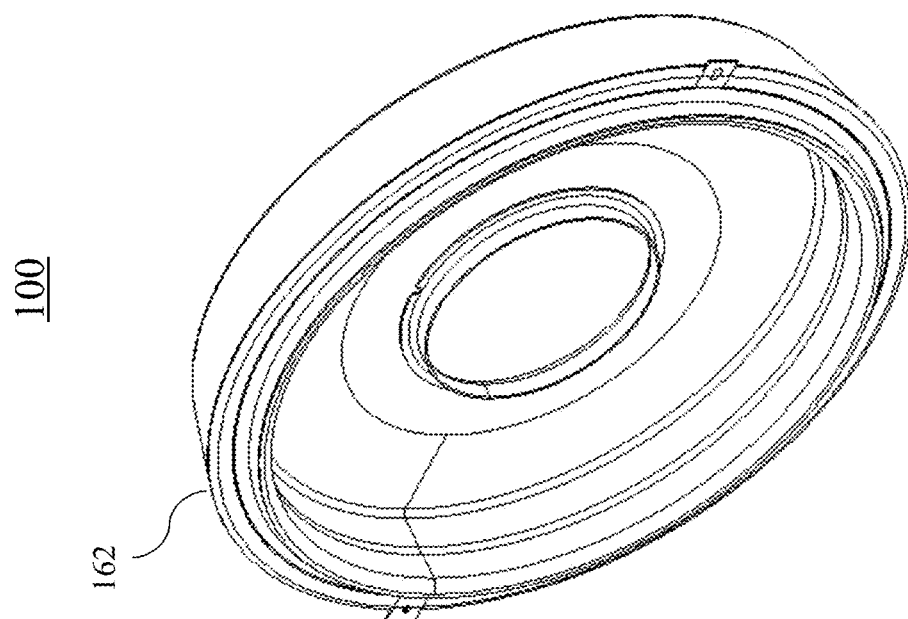

FIGS. 31 and 32 show bottom and cross-sectional views of an exemplary cover 160. The cover 160 can include a moisture controlling unit (moisture absorbing material unit, or vapor absorbing material unit) 190 disposed at an edge area. Stated somewhat differently, the moisture controlling unit 190 can be positioned in the rim of the cover 160. The moisture controlling unit 190 can include one or more desiccant or desiccant units for absorbing moisture, and/or a material (and/or structure) that provide a channel for moisture to escape from the internal cavity of the container 100 and away from the food. An exemplary desiccant can include any container, compartment, pouch and/or packet that contains desiccant materials and configured for properly exposing the desiccant materials to food. Accordingly, the moisture controlling unit 190 can remove the vapor (and/or water drops) away from the food and to maintain the texture so that the moisture condensing does not drip on the food, and/or float in the dish as liquid.

In various embodiments, the container 100 (for example, for steak, seafood, and/or other entrée) can have the serving base 102 less than 1.5 inch tall. Preferably, the serving base 102 can be 1 inch tall, to look like a plate. The cover 160 can have a height of greater than 1.5 inches. Preferably, the cover 160 can be 2 inches tall. Thus, more PCM can be placed in the rim of the cover 160.

FIGS. 33-38 shows detail drawings of an exemplary container 100. The cover 160 is shown as including the moisture controlling unit 190 installed thereon. The moisture controlling unit 190 is shown as being positioned on the base side 160A of the cover 160 and facing food (not shown).

For illustrative purposes only, some diagrams of FIGS. 19-38 show various configurations of positioning of the moisture controlling unit 190 and/or the thermal function pieces 180. For example, some diagrams show the moisture controlling unit 190 and/or the thermal function pieces 180 being in the flat base side 102A or in the rim region 102B of the serving base 102. Some diagrams show the moisture controlling unit 190 and/or the thermal function pieces being in the rim region 160B of the cover 160. However, regardless of the cover 160 or the serving base 102, the moisture controlling unit 190 and/or the thermal function pieces 180 can be in the food base side and/or the rim, without limitation. The configuration can be selected based on the specific application.

Although, in some examples, the moisture controlling unit 190 and/or the thermal function pieces 180 are shown exposed to the environment for illustrative purposes only, the moisture controlling unit 190 and/or the thermal function pieces 180 can be embedded in the container 100 in any suitable manner.

In various embodiments, the insulation structure 170 can include double walled metal structure with vacuum. Based on finite element analysis, a small amount of curvature in the flat part of the double-walled metal structure can create stiffness to avoid the two parallel surfaces of the flat portion from collapsing on each other when vacuum is applied to the insulation cavity within the container 100. In some embodiments, the serving base 102 and/or the cover 160 can use molded plastic or a second or outer layer of the container. The inner layer of the serving base 102 can be flat, so the serving bases 102 can be stacked together. The inner layer of the serving base 102 being flat can allow the PCM to be placed in the gap between the curved double wall shell. The cover 160 having dome or curvature can be advantageous because the dome can provide head room for the food to allow steak or chicken with bones to be properly placed in the container 100, without being pressed with the lid.

In various embodiments, the container 100 can be a reusable food delivery container and can be retrieved with one or more tracking devices. The tracking device can be installed on the container 100. Data and/or any suitable data visualization techniques can be used for tracking the container 100. For example, a human operator and/or device (for example, robots or drones) can use a heat map to identify and/or retrieve the container 100 with the tracking device in an efficient manner. The heat map illustrates the intensity of used containers that are available for pick up. If one walks down a block, they may see a hot spot with 8 containers in one building, a mild spot with 3 containers in another building, and a cold spot for no containers in a building or neighborhood.

Figure 41:
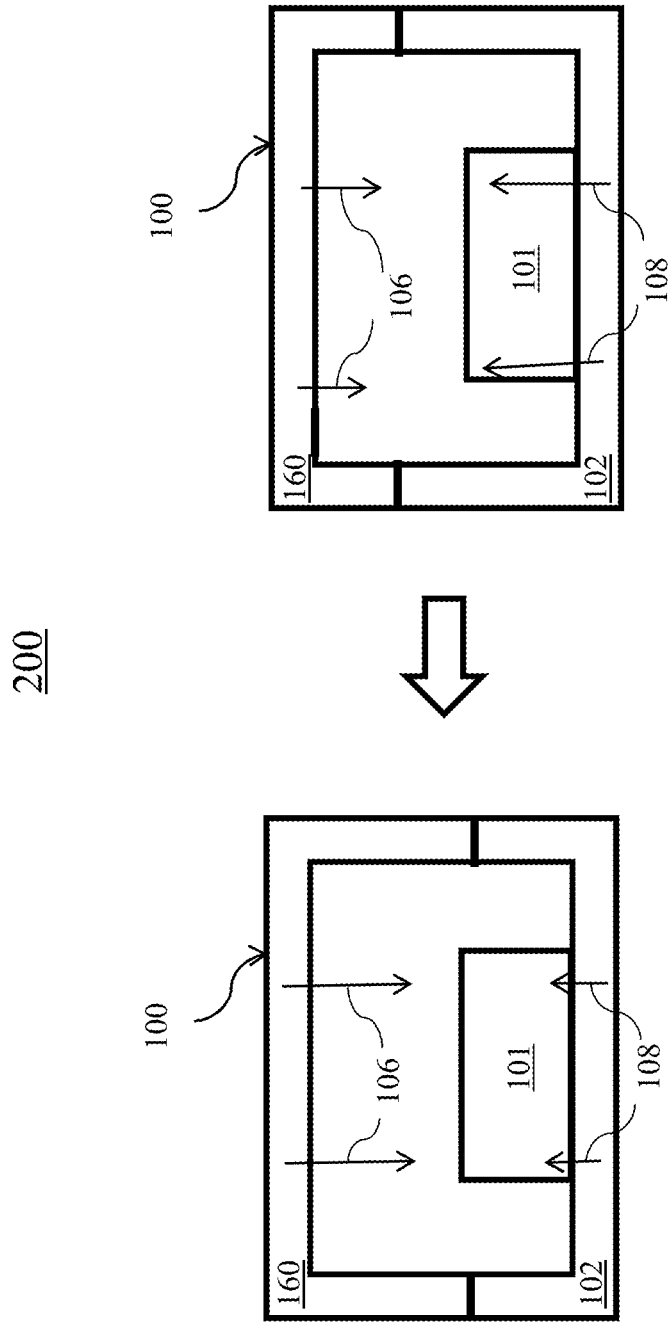
FIG. 41 is an exemplary diagram illustrating an alternative embodiment of the container of FIG. 40, wherein the container is configured for controlling the moisture in the food.

Additionally and/or alternatively, condensation of moisture in the container 100 can be prevented or reduced by heat management. For example, when all the PCM or a significant portion of the thermal mass is disposed in the cover as opposed to the base, condensation can be greatly reduced. In some embodiments, optionally, the cover 160 and the serving base 102 can be made such that thermal mass can be related to sizes of the cover 160 and the serving base 102. For example, a greater size can be associated with a greater thermal mass. For example, in FIG. 41, in the container 100 on the right side, the size of the cover 160 can be smaller than the size of the serving base 102, and the heat 106 can be smaller than the heat 108. In contrast, as shown in FIG. 41, in the container 100 on the left side, when heat available from the heat 106 is greater that the heat available from the heat 108, there is a warmer area at the top and moisture formation occurs on the rim and moisture does not flood on the food causing it to be soggy. The size of the cover 160 can be greater than the size of the serving base 102. In contrast, in FIG. 41, in the container 100 on the right side. The size of the cover 160 can be smaller than the size of the serving base 102, and the heat 106 can be smaller than the heat 108. Stated in another way, bubbles resulting from the heat source are driven away from the heat source and the PCM helps with the flow away from the food. In various embodiments, the container 100 can include the cover 160 that includes at least the thermal mass layer 182 (for example, a PCM). Stated somewhat differently, in a nearly closed container 100 having food to be kept warm or hot, more heat can be provided to the cover 160 (used as a roof of the food), as compared to the plate (or the serving base 102), and lead to unique and unobvious benefits. The heat can be provided to the cover 160 by turning the container 100 upside down, and/or directly heating the cover 160 without turning the container 100 upside down.

Devices for heating food or maintaining temperature often provide heat from the bottom of the food, because that is how cooking is performed in many cases. Although food may be heated in the oven or food lamps at chef outpost, and thus not necessarily from the bottom of the food, such methods are limited to food located in open spaces and not during transport. Food in open spaces do not have moisture issue to make food soggy. Thus, the container 100 as set forth above are not provided in conventional methods or containers, and can solve problems not solved by conventional methods or containers.

Figure 40:
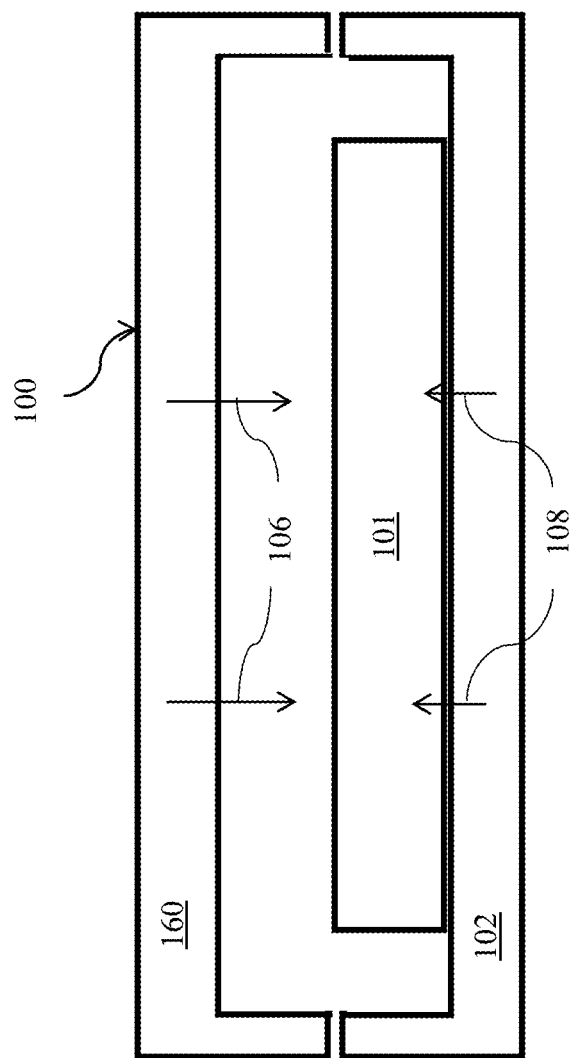
FIG. 40 is an exemplary diagram illustrating an embodiment of the container for reducing moisture in food.

Various embodiments disclose a substantially closed food delivery container 100 that has more than half of the heat and thermal source (total reservoir of energy) coming from above the food and rim, and the rest from bottom of the food. Stated somewhat differently, when there is more heat received from the container 100 above the food (e.g., more ATM in the lid) than heat received from the container 100 below the food, moisture can be maintained in vapor form, and thus prevent the moisture from forming water drops that make food soggy. FIG. 40 shows an exemplary container 100 loaded with food 101. Heat 106 can include heat received by the food 101 from the container 100 above the food 101. Heat 108 can include heat received by the food 101 from the container 100 below the food 101. In various embodiments, the heat 106 can include heat from the cover 160, and the heat 108 can include heat from the serving base 102. Notably, as shown, the heat 106 is greater than the heat 108.

In various embodiments, the container 100, or at least the cover 160, can be heated such that the initial temperature of the cover 160 can be greater than the initial temperature of the serving base 102 prior to loading of the food 101. Stated somewhat differently, different portions of the container 100 can function as one or more heat reservoirs each providing heat to the food, and the heat from the heat reservoirs can be uniform and/or different. For example, the cover 160 and the serving base 102 can each function as first and second heat reservoirs, respectively. The container 100, or at least the cover 160, can be heated such that a first heat reservoir can be greater than a second heat reservoir of the serving base prior to loading the food, or the heat provided to the food 101 from the first heat reservoir can be greater than the heat provided to the food 101 from the second heat reservoir.

Additionally and/or alternatively, FIG. 41 shows an exemplary process that can achieve the heat 106 that is greater than the heat 108. For example, when the container 100 of the right side is initially available, the container 100 can be flipped and be used as a container 100 on the left hand side. The food 101 can optionally be loaded into the container 100 (on the right side), with the container 100 in a normal configuration where the cover 160 and the serving base 102 are above and below the food 101, respectively. Upon closing of the container 100, the container 100 can be turned upside down to become the container 100 on the left side. The cover 160 and the serving base 102 are below and above the food 101, respectively, and become a new serving base 102 and a new cover 160. Accordingly, the heat 106 can include heat received from the old serving base 102 (which can function as the new cover 160), and the heat 108 can include heat from the old cover 160 (which can function as the new serving base 102). At least partly because the old serving base 102 is heated by the food 101, and/or the old serving base 102 is configured to preserve heat (with the heat sink, for example), the heat 106 can be greater than the heat 108. The method shown in FIG. 41 can be advantageous when food layout is not crucial, and/or the cover 160 is not configured to have a high temperature and/or is not capable to be kept at a high temperature. For example, the thermal function pieces 180 can be in the serving base 102 but not in the cover 160, so the serving base 102 can be kept at a high temperature better than the cover 160. Upon delivery, the food 101 can be consumed from the cover 160. Optionally, the container 100 can optionally be turned to the normal configuration, and the food 101 can be consumed from the serving base 102.

Maintaining Food Layout in Container 100

Figure 39:
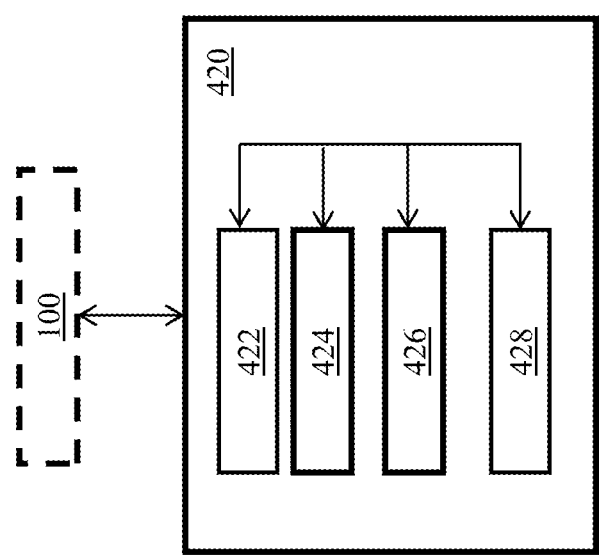
FIG. 39 is an exemplary diagram illustrating an embodiment of a system for supporting a container during transportation.

FIG. 39 shows an exemplary system 420 for supporting the container 100 during transportation of food in the container 100. The system 420 is shown as including a chassis 422, at least one actuator 424, at least one accelerometer 426 and a controller 428. An organized, artful physical layout of the food within the container 100 as arranged by restaurant chefs is an important factor in providing a luxurious fine dining experience after the container 100 is delivered to the recipient's home. Accordingly, maintaining the intended physical layout of the food is critical to the container 100. In the system 420, the container 100 can be mounted to the chassis 422. The chassis 422 can include an active suspension and foundation chassis. The chassis 422 can be coupled to the actuator 424. The actuator 424 can move the container 100 in directions opposite to external vibration. Motions of the actuator 424 can be controlled using the controller 428 and the accelerometer 426. The controller 428 can include a computer control unit. Structure of the controller 428 can be similar to at least part of the structure of the controller 500 (shown in FIG. 16) and can include at least a processor and memory. By implementing suitable instruction, the controller 428 can invert the signal from the accelerometer 426 to determine the motion of the actuator 424. The net result is that the external vibrations can be cancelled by suspension effected generated by the actuator 424. Vibration experienced by the food inside the container 100 can be minimized. Advantageously, the food can be ensured to arrive at the final customer with minimum disruption.

Although, for illustrative purposes only, FIG. 39 shows the chassis 422, the actuator 424, the accelerometer 426 and the controller 428 as being individual components that are coupled, any of the chassis 422, the actuator 424, the accelerometer 426 and the controller 428 can be at least partially integrated and/or combined into a whole component, without limitation. In one example, the chassis 422 can include the actuator 424.

In accordance with a first aspect disclosed herein, there is set forth a container, comprising:
a container base; and
a receptacle fitting in the container base, the container base including one or more thermal function pieces therein for maintaining a temperature of the receptacle.

In accordance with another aspect disclosed herein, there is set forth a container, comprising:
a receptacle; and
one or more sub-containers fitting in the receptacle and each including a thermal function piece.

The shapes, and sizes, of the container 100 as shown throughout the present disclosure are for illustrative purposes only, without limitation.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A container for storing, serving, and presenting a set of one or more food items, comprising:
   a serving base defining one or more slots for holding the food items, respectively; and
   a cover configured to cooperate with the serving base, wherein at least the serving base, or at least the cover, includes a thermal function piece, the thermal function piece including a phase-change material that has a phase change temperature ranging from −30 degrees Centigrade (C) to 130 degrees C., wherein at least the serving base, or at least the cover, includes an insulation structure, wherein the insulation structure includes:
   double walls defining a vacuum therebetween; and
   a vacuum support structure between the double walls,
   wherein at least the serving base, or at least the cover, is configured to remove moisture away from the food in the container,
   wherein at least the serving base, or at least the cover, includes a moisture controlling unit therein, and
   wherein:
   the serving base includes the moisture controlling unit and defines a rim region, the moisture controlling unit of the serving base being at least partially in the rim region of the serving base;
   the cover includes the moisture controlling unit and defines a rim region, the moisture controlling unit of the cover being at least partially in the rim region of the cover; or
   a combination thereof.

2. The container of claim 1, wherein the vacuum support structure between the double walls further defines at least one of ridges, ribs, dimples, veins, and a self-balancing stress management shape to prevent the double walls from collapsing over each other due to vacuum forces.

3. The container of claim 1, wherein the double walls defining the vacuum therebetween are formed from at least one of stainless-steel plates and titanium.

4. The container of claim 1, wherein the phase-change material has a specific latent heat capacity of at least 10 calories/gram.

5. The container of claim 1, wherein:
   the serving base includes the thermal function piece and defines a rim region, the thermal function piece of the serving base being at least partially in the rim region of the serving base;
   the cover includes the thermal function piece and defines a rim region, the thermal function piece of the cover being at least partially in the rim region of the cover; or
   a combination thereof.

6. The container of claim 5, wherein:
   the thermal function piece of the serving base being at least partially in the rim region of the serving base;
   the thermal function piece of the cover being at least partially in the rim region of the cover; and
   the thermal function piece in the rim region of the serving base at least partially overlaps with the thermal function piece in the rim region of the cover.

7. The container of claim 5, wherein in at least the serving base, or at least in the cover, the thermal function piece is located in both of a base side and the rim region.

8. The container of claim 1, wherein the thermal function piece is configured for induction heating.

9. The container of claim 1, wherein the moisture controlling unit includes a desiccant unit for absorbing the moisture, an anti-wetting fabric for discharging the moisture, or a combination thereof.

10. The container of claim 1, wherein the serving base, the cover, or a combination thereof, defines one or more outlets for discharging the moisture from the container.

11. Container of claim 1, wherein the serving base has a shape of a plate, bowl, a food tray, or a combination thereof.

12. The container of claim 1, wherein the serving base has a surface region made of ceramic, porcelain, stone, or a combination thereof.

13. A method for using a container to store and present a set of one or more food items, the container comprising:
   a serving base defining one or more slots respectively for holding the food items; and
   a cover configured to cooperate with the serving base, wherein at least the serving base, or at least the cover, includes a thermal function piece, the thermal function piece including a phase-change material that has a phase change temperature ranging from −30 degrees Centigrade (C) to 130 degrees C., wherein at least the serving base, or at least the cover, includes an insulation structure, wherein the insulation structure includes:
   double walls defining a vacuum therebetween; and
   a vacuum support structure between the double walls,
   the method comprising:

treating the phase-change material to an initial temperature;

loading the food items in the serving base; and closing the serving base with the cover, wherein said treating includes:

heating the serving base, the cover, or a combination thereof, such that the initial temperature is greater than the temperature of the food items to be loaded;

cooling the serving base, the cover, or a combination thereof, such that the initial temperature is lower than the temperature of the food items to be loaded; or a combination thereof.

14. The method of claim 13, wherein said treating includes heating the serving base, the cover, or a combination thereof, via induction heating.

15. The method of claim 13, wherein the heating includes heating at least the cover such that a first heat reservoir of the cover is greater than a second heat reservoir of the serving base prior to said loading.

16. A method for using a container to store and present a set of one or more food items, the container comprising:

a serving base defining one or more slots respectively for holding the food items; and a cover configured to cooperate with the serving base, wherein at least the serving base, or at least the cover, includes a thermal function piece, the thermal function piece including a phase-change material that has a phase change temperature ranging from −30 degrees Centigrade (C) to 130 degrees C., wherein at least the serving base, or at least the cover, includes an insulation structure, wherein the insulation structure includes:

double walls defining a vacuum therebetween; and a vacuum support structure between the double walls;

double walls defining a vacuum therebetween; and a vacuum support structure between the double walls, wherein at least the serving base, or at least the cover, is configured to remove moisture away from the food in the container, wherein at least the serving base, or at least the cover, includes a moisture controlling unit therein, and wherein:

the serving base includes the moisture controlling unit and defines a rim region, the moisture controlling unit of the serving base being at least partially in the rim region of the serving base;

the cover includes the moisture controlling unit and defines a rim region, the moisture controlling unit of the cover being at least partially in the rim region of the cover; or a combination thereof, the method comprising:

treating the phase-change material to an initial temperature;

loading the food items in the serving base; and closing the serving base with the cover.

17. The method of claim 16, wherein said treating includes:

heating the serving base, the cover, or a combination thereof, such that the initial temperature is greater than the temperature of the food items to be loaded;

cooling the serving base, the cover, or a combination thereof, such that the initial temperature is lower than the temperature of the food items to be loaded; or a combination thereof.

18. The method of claim 16, wherein said treating includes heating the serving base, the cover, or a combination thereof, via induction heating.

19. The method of claim 16, wherein said treating includes heating at least the cover such that a first heat reservoir of the cover is greater than a second heat reservoir of the serving base prior to said loading.

* * * * *